United States Patent
Yamagami et al.

(10) Patent No.: US 8,934,176 B2
(45) Date of Patent: Jan. 13, 2015

(54) OPTICAL SYSTEM, OPTICAL APPARATUS AND METHOD FOR MANUFACTURING OPTICAL SYSTEM

(75) Inventors: Akira Yamagami, Kawasaki (JP); Toshinori Take, Yokohama (JP)

(73) Assignee: Nikon Corporation, Tokyo (JP)

( * ) Notice: Subject to any disclaimer, the term of this patent is extended or adjusted under 35 U.S.C. 154(b) by 736 days.

(21) Appl. No.: 12/917,778

(22) Filed: Nov. 2, 2010

(65) Prior Publication Data

US 2011/0116172 A1    May 19, 2011

(30) Foreign Application Priority Data

Nov. 13, 2009  (JP) ................ 2009-260135
Nov. 13, 2009  (JP) ................ 2009-260145

(51) Int. Cl.
*G02B 15/14*   (2006.01)
*G02B 15/177*  (2006.01)
*G02B 27/64*   (2006.01)

(52) U.S. Cl.
CPC ............ *G02B 15/177* (2013.01); *G02B 27/646* (2013.01)
USPC ........................... 359/684; 359/691; 359/685

(58) Field of Classification Search
USPC .................. 359/684, 685, 682, 676, 677, 691
See application file for complete search history.

(56) References Cited

U.S. PATENT DOCUMENTS

| | | |
|---|---|---|
| 5,715,097 A | 2/1998 | Shibayama et al. |
| 5,737,129 A | 4/1998 | Ohtake et al. |
| 5,867,325 A | 2/1999 | Ohtake et al. |
| 5,875,060 A | 2/1999 | Umeda |
| 6,940,655 B2 | 9/2005 | Sato |
| 7,417,800 B2 | 8/2008 | Saori |
| 7,724,447 B2 | 5/2010 | Miyazaki |
| 7,961,409 B2 | 6/2011 | Yamamoto et al. |
| 2003/0234985 A1 | 12/2003 | Sato |
| 2007/0127136 A1 | 6/2007 | Saori |
| 2009/0002841 A1 | 1/2009 | Yamamoto et al. |
| 2009/0251793 A1 | 10/2009 | Miyazaki |

FOREIGN PATENT DOCUMENTS

| | | |
|---|---|---|
| EP | 2 009 478 A2 | 12/2008 |
| JP | 08-179205 A | 7/1996 |
| JP | 08-220437 A | 8/1996 |

(Continued)

OTHER PUBLICATIONS

Partial European Search Report from European Patent Application No. 10190749.1, May 13, 2011.

*Primary Examiner* — Alicia M Harrington
(74) *Attorney, Agent, or Firm* — Miles & Stockbridge P.C.

(57) ABSTRACT

An optical system includes, in order from an object side: a first lens group G1 having negative refractive power; and a second lens group G2 having positive refractive power; upon zooming from a wide-angle end state W to a telephoto end state T, a distance between the first lens group G1 and the second lens group G2 varying, and the second lens group G2 moving, and the second lens group G2 including a focusing lens group Gf that carries out focusing from an infinity object to a close object, and a decentering lens group Gs that is movable in a direction having a component perpendicular to an optical axis, thereby providing an optical system capable of establishing both of internal focusing and a decentering lens group with obtaining compactness and excellent optical performance, an optical apparatus equipped with the optical system, and a method for manufacturing the optical system.

54 Claims, 63 Drawing Sheets

(56) References Cited

FOREIGN PATENT DOCUMENTS

| | | |
|---|---|---|
| JP | 8-234102 A | 9/1996 |
| JP | 08-234102 A | 9/1996 |
| JP | 08-327907 A | 12/1996 |
| JP | 2004-021223 A | 1/2004 |
| JP | 2004-333572 A | 11/2004 |
| JP | 2007-156078 A | 6/2007 |
| JP | 2007-279232 A | 10/2007 |
| JP | 2008-107478 A | 5/2008 |
| JP | 2009-014761 A | 1/2009 |
| JP | 2009-014767 A | 1/2009 |
| WO | WO 2007/010862 A1 | 1/2007 |

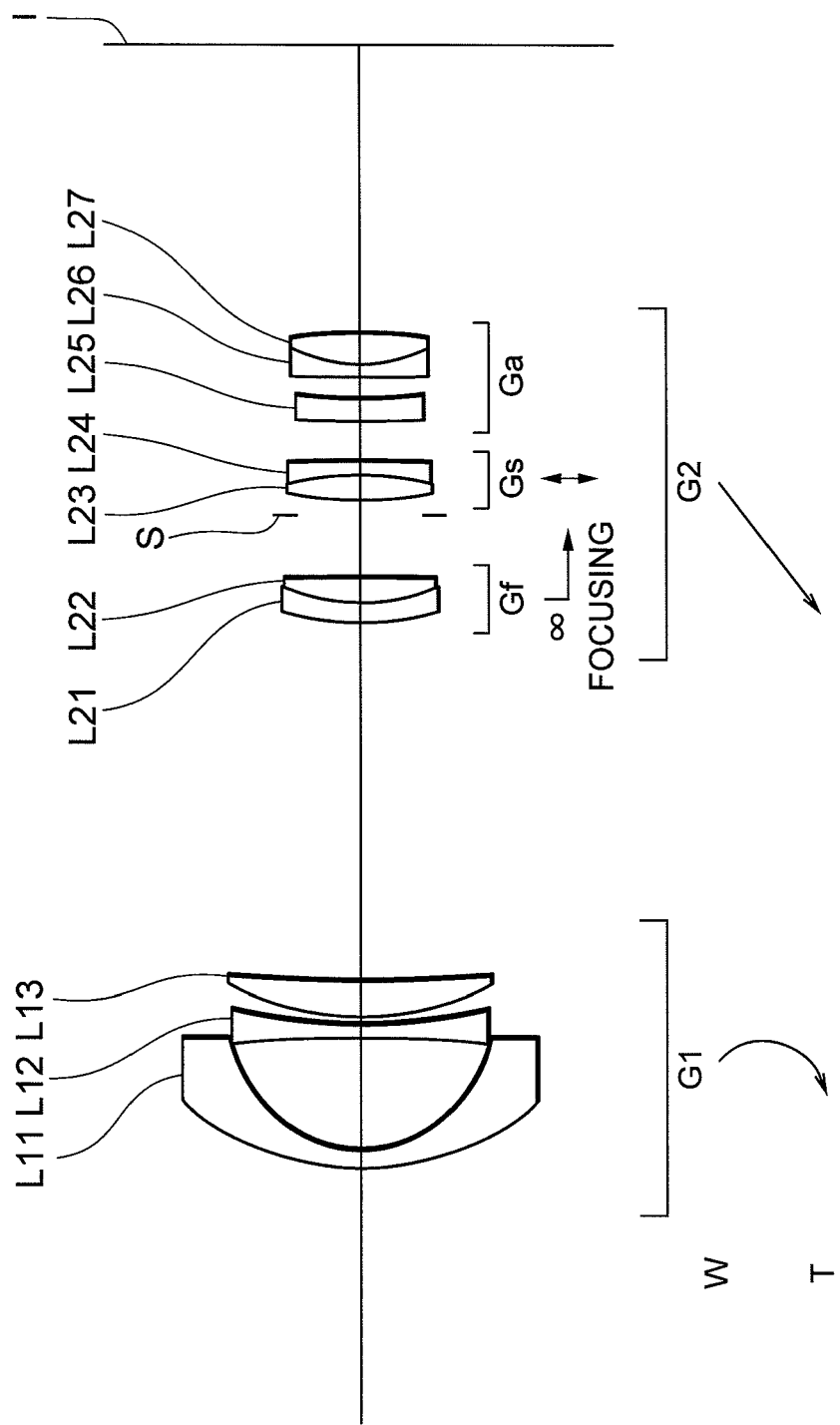

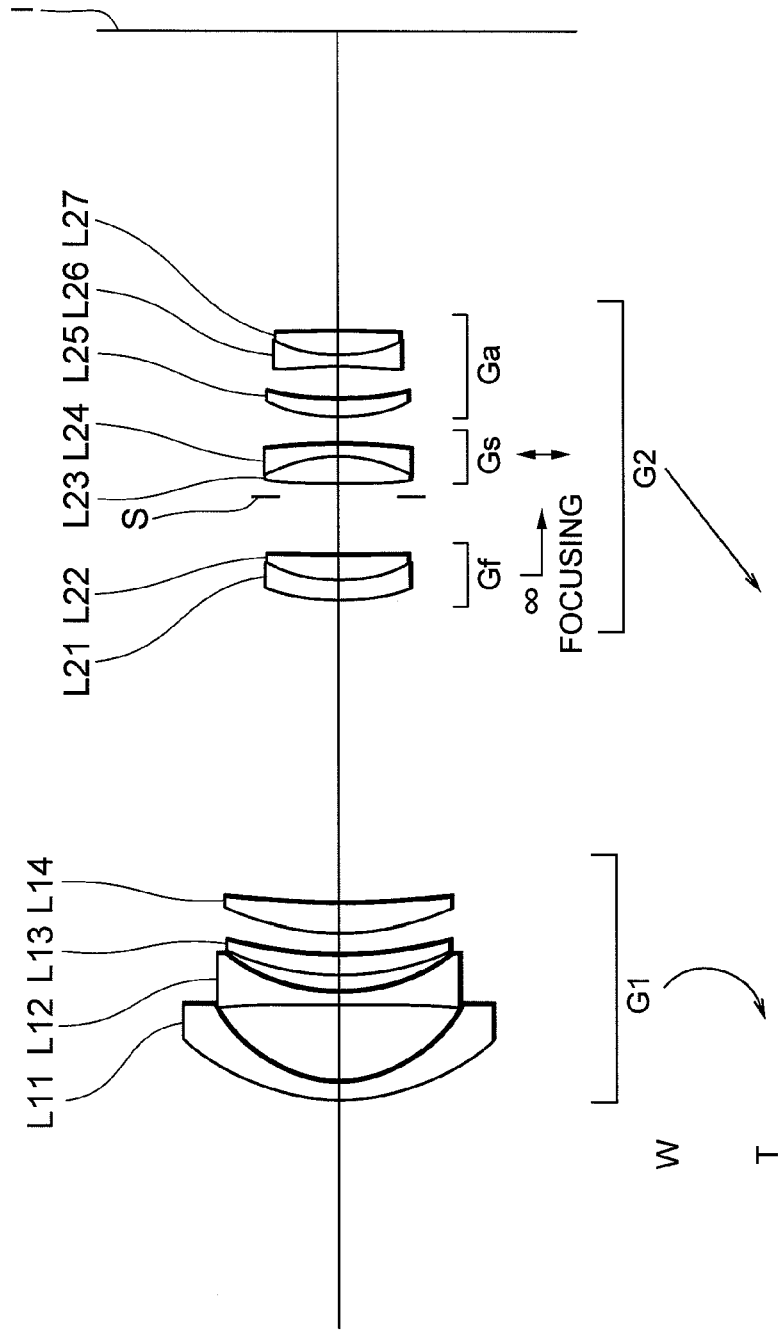

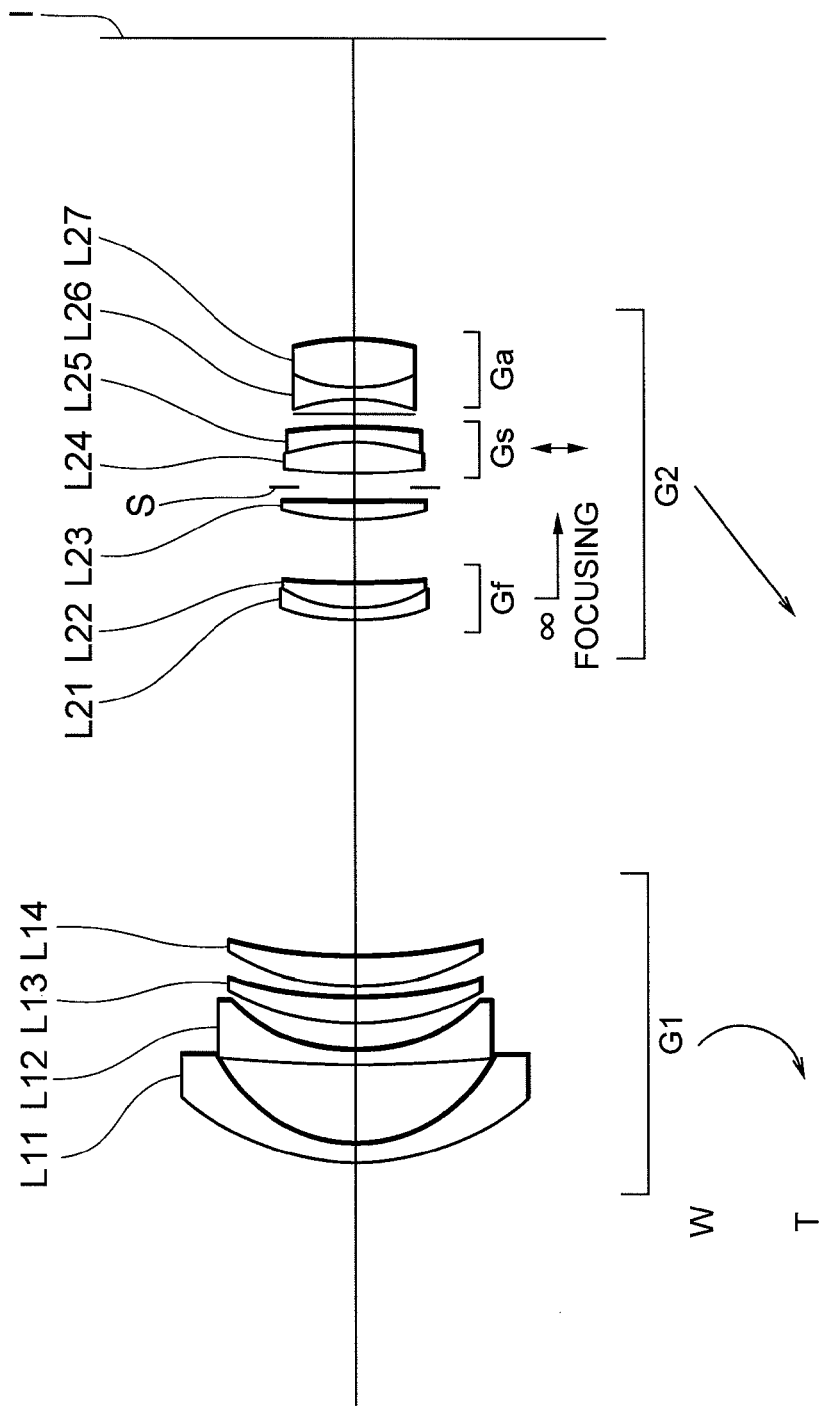

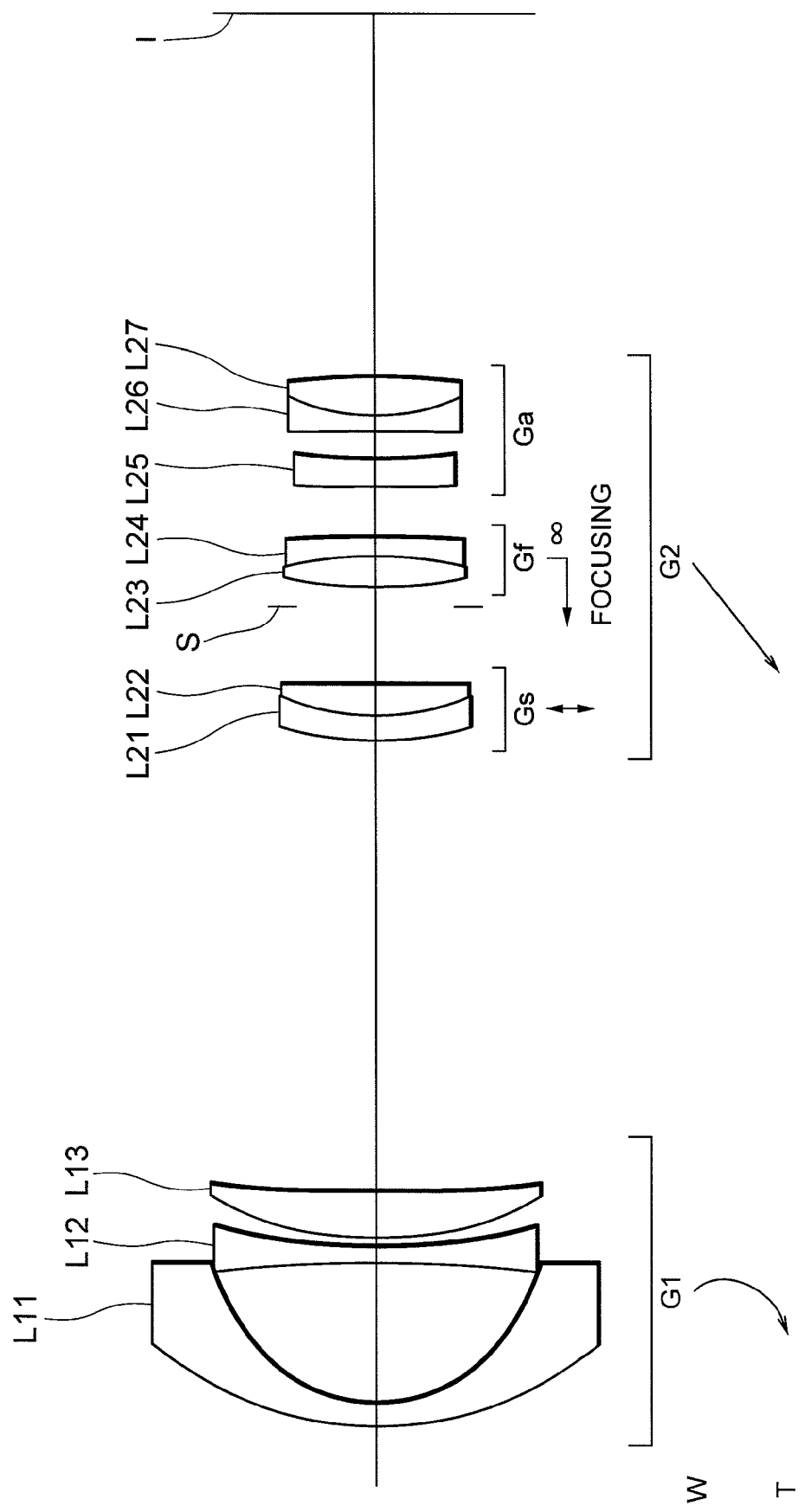

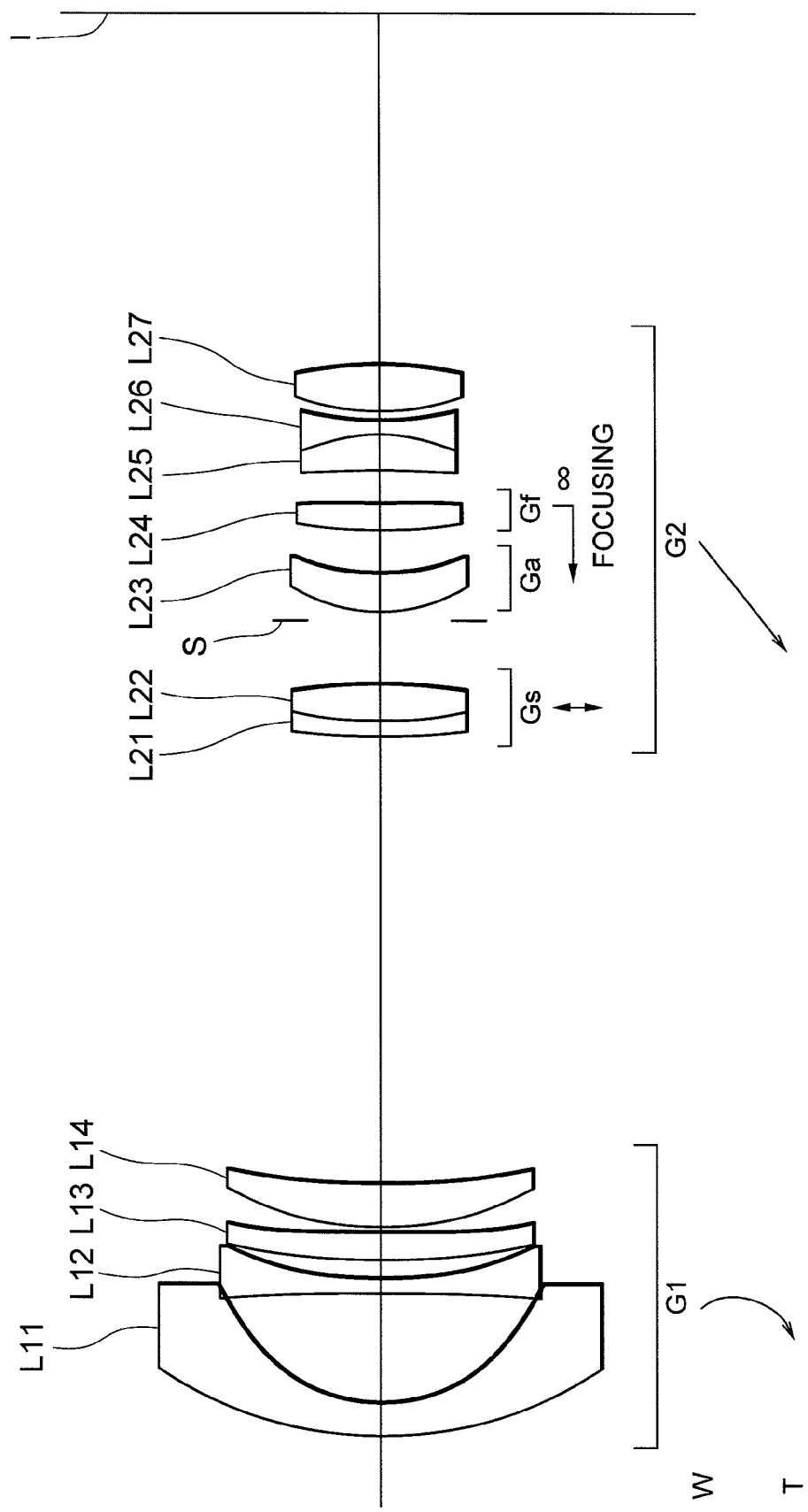

OPTICAL SYSTEM, OPTICAL APPARATUS AND METHOD FOR MANUFACTURING OPTICAL SYSTEM

The disclosure of the following priority applications are herein incorporated by reference:
Japanese Patent Application No. 2009-260135 filed on Nov. 13, 2009, and
Japanese Patent Application No. 2009-260145 filed on Nov. 13, 2009.

BACKGROUND OF THE INVENTION

1. Field of the Invention

The present invention relates to an optical system, an optical apparatus equipped with the optical system, and a method for manufacturing the optical system.

2. Related Background Art

There have been proposed optical systems suitable for a digital still camera, a video camera, and the like disclosed in such as a Japanese Patent Application Laid-Open No. 8-234102. However, the conventional optical system has had a problem that the optical system becomes large upon zooming with a lens group disposed to the most object side.

SUMMARY OF THE INVENTION

The present invention is made in view of the above described problem, and has an object to provide an optical system capable of establishing both of an internal focusing system and a decentering lens group with obtaining compactness and excellent optical performance, an optical apparatus equipped with the optical system, and a method for manufacturing the optical system.

According to a first aspect of the present invention, there is provided an optical system composed of a plurality of lens groups comprising: a most object side lens group; and a lens group having positive refractive power disposed to an image side of the most object side lens group; the lens group disposed to the image side of the most object side lens group including a focusing lens group that carries out focusing from an infinity object to a close object, and a decentering lens group that is movable in a direction having a component perpendicular to an optical axis.

According to a second aspect of the present invention, there is provided an optical apparatus equipped with the optical system according to the first aspect.

According to a third aspect of the present invention, there is provided a method for manufacturing an optical system including a most object side lens group and a lens group disposed to an image side of the most object side lens group having positive refractive power, the method comprising steps of: disposing a focusing lens group that carries out focusing from an infinity object to a close object in the lens group disposed to the image side of the most object side lens group; and disposing a decentering lens group that is movable in a direction having a component perpendicular to the optical axis in the lens group disposed to the image side of the most object side lens group.

The present invention makes it possible to provide an optical system capable of establishing both of an internal focusing system and a decentering lens group with obtaining compactness and excellent optical performance, an optical apparatus equipped with the optical system, and a method for manufacturing the optical system.

BRIEF DESCRIPTION OF THE DRAWINGS

FIG. 1 is a sectional view showing a lens configuration of an optical system according to Example 1.

FIGS. 2A, 2B, and 2C are graphs showing various aberrations of the optical system according to Example 1 focusing on infinity, in which FIG. 2A is in a wide-angle end state, FIG. 2B is in an intermediate focal length state, and FIG. 2C is in a telephoto end state.

FIGS. 3A, 3B, and 3C are graphs showing various aberrations of the optical system according to Example 1 focusing on a close object (shooting magnification is −0.01), in which FIG. 3A is in the wide-angle end state, FIG. 3B is in the intermediate focal length state, and FIG. 3C is in the telephoto end state.

FIGS. 4A, and 4B are graphs showing coma of the optical system according to Example 1 upon shifting a decentering lens group (0.1 mm) focusing on infinity, in which FIG. 4A is in the wide-angle end state, and FIG. 4B is in the telephoto end state.

FIG. 5 is a sectional view showing a lens configuration of an optical system according to Example 2.

FIGS. 6A, 6B, and 6C are graphs showing various aberrations of the optical system according to Example 2 focusing on infinity, in which FIG. 6A is in a wide-angle end state, FIG. 6B is in an intermediate focal length state, and FIG. 6C is in a telephoto end state.

FIGS. 7A, 7B, and 7C are graphs showing various aberrations of the optical system according to Example 2 focusing on a close object (shooting magnification: −0.01), in which FIG. 7A is in the wide-angle end state, FIG. 7B is in the intermediate focal length state, and FIG. 7C is in the telephoto end state.

FIGS. 8A, and 8B are graphs showing coma of the optical system according to Example 2 upon shifting a decentering lens group (0.1 mm) focusing on infinity, in which FIG. 8A is in the wide-angle end state, and FIG. 8B is in the telephoto end state.

FIG. 9 is a sectional view showing a lens configuration of an optical system according to Example 3.

FIGS. 10A, 10B, and 10C are graphs showing various aberrations of the optical system according to Example 3 focusing on infinity, in which FIG. 10A is in a wide-angle end state, FIG. 10B is in an intermediate focal length state, and FIG. 10C is in a telephoto end state.

FIGS. 11A, 11B, and 11C are graphs showing various aberrations of the optical system according to Example 3 focusing on a close object (shooting magnification is −0.01), in which FIG. 11A is in the wide-angle end state, FIG. 11B is in the intermediate focal length state, and FIG. 11C is in the telephoto end state.

FIGS. 12A, and 12B are graphs showing coma of the optical system according to Example 3 upon shifting a decentering lens group (0.1 mm) focusing on infinity, in which FIG. 12A is in the wide-angle end state, and FIG. 12B is in the telephoto end state.

FIGS. 14A, 14B, and 14C are graphs showing various aberrations of the optical system according to Example 4 focusing on infinity, in which FIG. 14A is in a wide-angle end state, FIG. 14B is in an intermediate focal length state, and FIG. 14C is in a telephoto end state.

FIGS. 15A, 15B, and 15C are graphs showing various aberrations of the optical system according to Example 4 focusing on a close object (shooting magnification is −0.01), in which FIG. 15A is in the wide-angle end state, FIG. 15B is in the intermediate focal length state, and FIG. 15C is in the telephoto end state.

FIGS. 16A, and 16B are graphs showing coma of the optical system according to Example 4 upon shifting a decentering lens group (0.1 mm) focusing on infinity, in which FIG. 16A is in the wide-angle end state, and FIG. 16B is in the telephoto end state.

FIGS. 18A, 18B, and 18C are graphs showing various aberrations of the optical system according to Example 5 focusing on infinity, in which FIG. 18A is in a wide-angle end state, FIG. 18B is in an intermediate focal length state, and FIG. 18O is in a telephoto end state.

FIGS. 19A, 19B, and 19C are graphs showing various aberrations of the optical system according to Example 5 focusing on a close object (shooting magnification is −0.01), in which FIG. 19A is in the wide-angle end state, FIG. 19B is in the intermediate focal length state, and FIG. 19C is in the telephoto end state.

FIGS. 20A, and 20B are graphs showing coma of the optical system according to Example 5 upon shifting a decentering lens group (0.1 mm) focusing on infinity, in which FIG. 20A is in the wide-angle end state, and FIG. 20B is in the telephoto end state.

FIGS. 22A, 22B, and 22C are graphs showing various aberrations of the optical system according to Example 6 focusing on infinity, in which FIG. 22A is in a wide-angle end state, FIG. 22B is in an intermediate focal length state, and FIG. 22C is in a telephoto end state.

FIGS. 23A, 23B, and 23C are graphs showing various aberrations of the optical system according to Example 6 focusing on a close object (shooting magnification is −0.01), in which FIG. 23A is in the wide-angle end state, FIG. 23B is in the intermediate focal length state, and FIG. 23C is in the telephoto end state.

FIGS. 24A, and 24B are graphs showing coma of the optical system according to Example 6 upon shifting a decentering lens group (0.1 mm) focusing on infinity, in which FIG. 24A is in the wide-angle end state, and FIG. 24B is in the telephoto end state.

FIGS. 26A, 26B, and 26C are graphs showing various aberrations of the optical system according to Example 7 focusing on infinity, in which FIG. 26A is in a wide-angle end state, FIG. 26B is in an intermediate focal length state, and FIG. 26C is in a telephoto end state.

FIGS. 27A, 27B, and 27C are graphs showing various aberrations of the optical system according to Example 7 focusing on a close object (shooting magnification is −0.01), in which FIG. 27A is in the wide-angle end state, FIG. 27B is in the intermediate focal length state, and FIG. 27C is in the telephoto end state.

FIGS. 28A, and 28B are graphs showing coma of the optical system according to Example 7 upon shifting a decentering lens group (0.1 mm) focusing on infinity, in which FIG. 28A is in the wide-angle end state, and FIG. 28B is in the telephoto end state.

FIG. 29 is a sectional view showing a lens configuration of an optical system according to Example 8.

FIGS. 30A, 30B, and 30C are graphs showing various aberrations of the optical system according to Example 8 focusing on infinity, in which FIG. 30A is in a wide-angle end state, FIG. 30B is in an intermediate focal length state, and FIG. 30C is in a telephoto end state.

FIGS. 31A, 31B, and 31C are graphs showing various aberrations of the optical system according to Example 8 focusing on a close object (shooting magnification is −0.01), in which FIG. 31A is in the wide-angle end state, FIG. 31B is in the intermediate focal length state, and FIG. 31C is in the telephoto end state.

FIGS. 32A, 32B, and 32C are graphs showing coma of the optical system according to Example 8 upon shifting a decentering lens group (0.2 mm) focusing on infinity, in which FIG. 32A is in the wide-angle end state, FIG. 32B is in the intermediate focal length state, and FIG. 32C is in the telephoto end state.

FIGS. 34A, 34B, and 34C are graphs showing various aberrations of the optical system according to Example 9 focusing on infinity, in which FIG. 34A is in a wide-angle end state, FIG. 34B is in an intermediate focal length state, and FIG. 34C is in a telephoto end state.

FIGS. 35A, 35B, and 35C are graphs showing various aberrations of the optical system according to Example 9 focusing on a close object (shooting magnification is −0.01), in which FIG. 35A is in the wide-angle end state, FIG. 35B is in the intermediate focal length state, and FIG. 35C is in the telephoto end state.

FIGS. 36A, 36B, and 36C are graphs showing coma of the optical system according to Example 9 upon shifting a decentering lens group (0.2 mm) focusing on infinity, in which FIG. 36A is in the wide-angle end state, FIG. 36B is in the intermediate focal length state, and FIG. 36C is in the telephoto end state.

FIGS. 38A, 38B, and 38C are graphs showing various aberrations of the optical system according to Example 10 focusing on infinity, in which FIG. 38A is in a wide-angle end state, FIG. 38B is in an intermediate focal length state, and FIG. 38C is in a telephoto end state.

FIGS. 39A, 39B, and 39C are graphs showing various aberrations of the optical system according to Example 10 focusing on a close object (shooting magnification is −0.01), in which FIG. 39A is in the wide-angle end state, FIG. 39B is in the intermediate focal length state, and FIG. 39C is in the telephoto end state.

FIGS. 40A, 40B, and 40C are graphs showing coma of the optical system according to Example 10 upon shifting a decentering lens group (0.2 mm) focusing on infinity, in which FIG. 40A is in the wide-angle end state, FIG. 40B is in the intermediate focal length state, and FIG. 40C is in the telephoto end state.

FIGS. 42A, 42B, and 42C are graphs showing various aberrations of the optical system according to Example 11 focusing on infinity, in which FIG. 42A is in a wide-angle end state, FIG. 42B is in an intermediate focal length state, and FIG. 42C is in a telephoto end state.

FIGS. 43A, 43B, and 43C are graphs showing various aberrations of the optical system according to Example 11 focusing on a close object (shooting magnification is −0.01), in which FIG. 43A is in the wide-angle end state, FIG. 43B is in the intermediate focal length state, and FIG. 43C is in the telephoto end state.

FIGS. 44A, 44B, and 44C are graphs showing coma of the optical system according to Example 11 upon shifting a decentering lens group (0.2 mm) focusing on infinity, in which FIG. 44A is in the wide-angle end state, FIG. 44B is in the intermediate focal length state, and FIG. 44C is in the telephoto end state.

FIGS. 46A, 46B, and 46C are graphs showing various aberrations of the optical system according to Example 12 focusing on infinity, in which FIG. 46A is in a wide-angle end state, FIG. 46B is in an intermediate focal length state, and FIG. 46C is in a telephoto end state.

FIGS. 47A, 47B, and 47C are graphs showing various aberrations of the optical system according to Example 12 focusing on a close object (shooting magnification is −0.01), in which FIG. 47A is in the wide-angle end state, FIG. 47B is in the intermediate focal length state, and FIG. 47C is in the telephoto end state.

FIGS. 48A, 48B, and 48C are graphs showing coma of the optical system according to Example 12 upon shifting a decentering lens group (0.2 mm) focusing on infinity, in which FIG. 48A is in the wide-angle end state, FIG. 48B is in the intermediate focal length state, and FIG. 48C is in the telephoto end state.

FIG. 49 is a sectional view showing a lens configuration of an optical system according to Example 13.

FIGS. 50A, 50B, and 50C are graphs showing various aberrations of the optical system according to Example 13 focusing on infinity, in which FIG. 50A is in a wide-angle end state, FIG. 50B is in an intermediate focal length state, and FIG. 50C is in a telephoto end state.

FIGS. 51A, 51B, and 51O are graphs showing various aberrations of the optical system according to Example 13 focusing on a close object (shooting magnification is −0.01), in which FIG. 51A is in the wide-angle end state, FIG. 51B is in the intermediate focal length state.

FIGS. 52A, 52B, and 52C are graphs showing coma of the optical system according to Example 13 upon shifting a decentering lens group (0.2 mm) focusing on infinity, in which FIG. 52A is in the wide-angle end state, FIG. 52B is in the intermediate focal length state, and FIG. 52C is in the telephoto end state.

FIGS. 54A, 54B, and 54C are graphs showing various aberrations of the optical system according to Example 14 focusing on infinity, in which FIG. 54A is in a wide-angle end state, FIG. 54B is in an intermediate focal length state, and FIG. 54C is in a telephoto end state.

FIGS. 55A, 55B, and 55C are graphs showing various aberrations of the optical system according to Example 14 focusing on a close object (shooting magnification is −0.01), in which FIG. 55A is in the wide-angle end state, FIG. 55B is in the intermediate focal length state, and FIG. 55C is in the telephoto end state.

FIGS. 56A, 56B, and 56C are graphs showing coma of the optical system according to Example 14 upon shifting a decentering lens group (0.2 mm) focusing on infinity, in which FIG. 56A is in the wide-angle end state, FIG. 56B is in the intermediate focal length state, and FIG. 56C is in the telephoto end state.

DESCRIPTION OF THE MOST PREFERRED EMBODIMENT

Figure 2A:
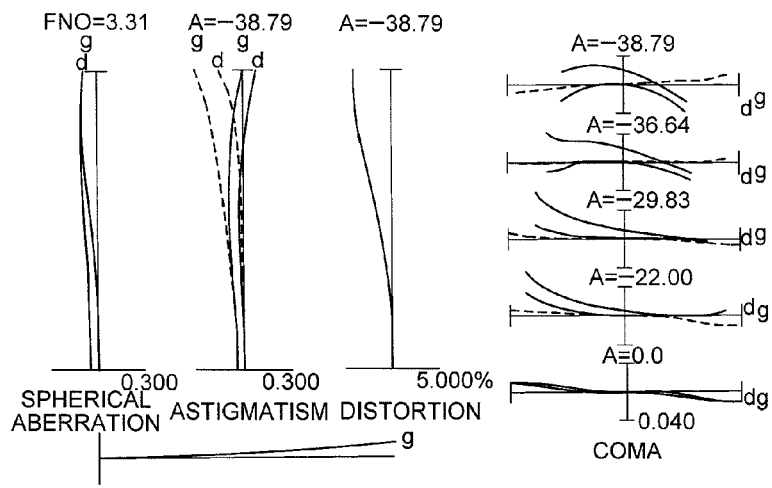

A preferred embodiment according to an embodiment of the present application is explained.

An optical system according to the present embodiment includes, in order from an object side, a first lens group having negative refractive power, and a second lens group having positive refractive power. Upon zooming from a wide-angle end state to a telephoto end state, a distance between the first lens group and the second lens group varies, and the second lens group moves. The second lens group includes a focusing lens group carrying out focusing from an infinity object to a close object and a decentering lens group movable in a direction including a component perpendicular to an optical axis. Incidentally, the decentering lens group is a vibration reduction lens group such as a shift lens group or a tilt lens group capable of correcting an image blur caused by a camera shake.

With disposing the focusing lens group and the decentering lens group in the second lens group, it becomes possible to suppress variation in deterioration of optical performance upon zooming caused by decentering the decentering lens group and moving the focusing lens group.

In an optical system according to the present embodiment, the focusing lens group is preferably disposed to the object side of the decentering lens group.

With disposing the focusing lens group to the object side of the decentering lens group, deterioration in optical performance caused by decentering the decentering lens group is easy to be controlled without being affected by focusing.

In an optical system according to the present embodiment, an auxiliary lens group is preferably disposed to the image side of the decentering lens group. With disposing the auxiliary lens group to the image side of the decentering lens group, it is effective for correcting decentering coma and inclination of the image plane caused upon vibration reduction, so that deterioration in optical performance can be mitigated.

The auxiliary lens group is preferably disposed in the second lens group. With disposing the auxiliary lens group in the second lens group, it is effective for variation in image plane upon focusing, decentering coma and inclination of the image plane upon vibration reduction, so that deterioration in optical performance can be mitigated.

In an optical system according to the present embodiment, the auxiliary lens group is preferably moved in a body with the focusing lens group and the decentering lens group upon zooming. With this construction, it is effective for decentering coma and inclination of the image plane upon vibration reduction, so that deterioration in optical performance can be mitigated.

In an optical system according to the present embodiment, the auxiliary lens group preferably has negative refractive power. With having the auxiliary lens group negative refractive power, it is effective for correcting coma generated in the decentering lens group upon decentering the decentering lens group, so that deterioration in optical performance can be mitigated.

In an optical system according to the present embodiment, the auxiliary lens group preferably has positive refractive power. With having the auxiliary lens group positive refractive power, it is effective for correcting spherical aberration generated in the decentering lens group upon decentering the decentering lens group, so that deterioration in optical performance can be mitigated.

In an optical system according to the present embodiment, the following conditional expression (1) is preferably satisfied:

$$-7.20 < fa/fs < 6.35 \quad (1)$$

where fa denotes a focal length of the auxiliary lens group, and fs denotes a focal length of the decentering lens group.

Conditional expression (1) defines an appropriate range of a ratio of the focal length of the auxiliary lens group to that of the decentering lens group.

When the ratio fa/fs is equal to or exceeds the upper limit of conditional expression (1), the focal length of the decentering lens group becomes small, and it becomes difficult to correct coma and decentering coma, so that it is undesirable. Moreover, it becomes difficult to control the position of the decentering lens group, and sufficient optical accuracy cannot be maintained, so that it is undesirable.

On the other hand, when the ratio fa/fs is equal to or falls below the lower limit of conditional expression (1), the focal length of the decentering lens group becomes large, and a shift amount of the shift lens group becomes large to obtain sufficient image shift amount, so that the shift lens group becomes large. Accordingly, it is undesirable. Moreover, coma and curvature of field becomes undercorrected, so that it is undesirable.

In order to secure the effect of the present embodiment, it is preferable to set the upper limit of conditional expression (1) to 5.51. In order to further secure the effect of the present embodiment, it is preferable to set the upper limit of conditional expression (1) to 4.68. In order to still further secure the effect of the present embodiment, it is preferable to set the upper limit of conditional expression (1) to 3.84.

In order to secure the effect of the present embodiment, it is preferable to set the lower limit of conditional expression (1) to −7.02. In order to further secure the effect of the present embodiment, it is preferable to set the lower limit of conditional expression (1) to −6.35. In order to still further secure the effect of the present embodiment, it is preferable to set the lower limit of conditional expression (1) to −5.50. In order to still further secure the effect of the present embodiment, it is most preferable to set the lower limit of conditional expression (1) to −4.65.

In an optical system according to the present embodiment, an aperture stop is preferably disposed between the focusing lens group and the decentering lens group.

In a lens group capable of shifting the image, in order to suppress curvature of field upon shifting as much as possible, lens shift is carried out by a lens group disposed near the aperture stop, where off-axis light flux passes near to the optical axis upon zooming, so that it becomes possible to secure excellent optical performance. With disposing focusing lens group near to the aperture stop, it becomes possible to reduce variation in curvature of field upon focusing from an infinity object to a close object.

In an optical system according to the present embodiment, a lens component is preferably disposed between the focusing lens group and the decentering lens group. With this lens construction, it becomes possible to suppress variation in curvature of field upon focusing from an infinity object to a close object, so that it is desirable.

In an optical system according to the present embodiment, the second lens group is preferably composed of, in order from the object side, a focusing lens group, a lens component, an aperture stop, a decentering lens group, and an auxiliary lens group. With this construction, it becomes effective to suppress variation in curvature of field upon focusing from an infinity object to a close object.

In an optical system according to the present embodiment, the second lens group is preferably composed of, in order from the object side, a focusing lens group, an aperture stop, a lens component, a decentering lens group, and an auxiliary lens group. With this construction, it becomes effective to suppress deterioration in optical performance caused by decentering coma generated upon vibration reduction.

In an optical system according to the present embodiment, the following conditional expression (2) is preferably satisfied:

$$0.15 < |fw/ff| < 0.45 \quad (2)$$

where fw denotes a focal length of the optical system in the wide-angle end state, and ff denotes a focal length of the focusing lens group.

Conditional expression (2) defines an appropriate range of a ratio of the focal length of the optical system in the wide-angle end state to that of the focusing lens group.

When the ratio |fw/ff| is equal to or exceeds the upper limit of conditional expression (2), the focal length of the focusing lens group becomes small, so that it becomes difficult to control position of the focusing lens group along the optical axis. Accordingly, it becomes difficult to obtain sufficient optical accuracy, so that it is undesirable. Moreover, spherical aberration and coma are generated in the focusing lens group, so that it is undesirable.

On the other hand, when the ratio |fw/ff| is equal to or falls below the lower limit of conditional expression (2), the focal length of the focusing lens group becomes large, and moving amount upon focusing becomes large, so that the whole of the optical system becomes long and the diameter becomes large. As a result, the optical system cannot be compact, so that it is undesirable.

In order to secure the effect of the present embodiment, it is preferable to set the upper limit of conditional expression (2) to 0.43. In order to further secure the effect of the present embodiment, it is preferable to set the upper limit of conditional expression (2) to 0.41. In order to still further secure the effect of the present embodiment, it is most preferable to set the upper limit of conditional expression (2) to 0.38.

In order to secure the effect of the present embodiment, it is preferable to set the lower limit of conditional expression (2) to 0.17. In order to further secure the effect of the present embodiment, it is preferable to set the lower limit of conditional expression (2) to 0.19. In order to still further secure the effect of the present embodiment, it is most preferable to set the lower limit of conditional expression (2) to 0.21. In order to still further secure the effect of the present embodiment, it is most preferable to set the upper-lower limit of conditional expression (2) to 0.23.

In an optical system according to the present embodiment, the following conditional expression (3) is preferably satisfied:

$$0.15 < |f\gamma w| < 0.60 \tag{3}$$

where fγw denotes an image plane moving coefficient (a ratio of a moving amount of the image plane to a moving amount of the focusing lens group) of the focusing lens group in the wide-angle end state.

Conditional expression (3) defines the image plane moving coefficient of the focusing lens group, and minimizes variation in optical performance from infinity to the closest shooting range.

When the value |fγw| is equal to or exceeds the upper limit of conditional expression (3), the focal length of the focusing lens group becomes large, and a moving amount upon focusing becomes large, so that the optical system itself becomes large and the diameter also becomes large. Accordingly, it becomes difficult to make the optical system compact, so that it is undesirable. Moreover, spherical aberration and coma generated by the focusing lens group become undercorrected, so that it is undesirable.

On the other hand, when the value |fγw| is equal to or falls below the lower limit of conditional expression (3), the focal length of the focusing lens group becomes small, it becomes difficult to carry out positioning control of the focusing lens group along the optical axis, so that sufficient optical accuracy cannot be obtained. Accordingly, it is undesirable. Moreover, spherical aberration and coma are generated in the focusing lens group, so that it is undesirable.

In order to secure the effect of the present embodiment, it is preferable to set the upper limit of conditional expression (3) to 0.58. In order to further secure the effect of the present embodiment, it is preferable to set the upper limit of conditional expression (3) to 0.55. In order to still further secure the effect of the present embodiment, it is preferable to set the upper limit of conditional expression (3) to 0.53.

In order to secure the effect of the present embodiment, it is preferable to set the lower limit of conditional expression (3) to 0.18. In order to further secure the effect of the present embodiment, it is preferable to set the lower limit of conditional expression (3) to 0.22. In order to still further secure the effect of the present embodiment, it is preferable to set the lower limit of conditional expression (3) to 0.25.

In an optical system according to the present embodiment, the following conditional expression (4) is preferably satisfied:

$$-3.70 < ff/fs < 3.10 \tag{4}$$

where ff denotes a focal length of the focusing lens group, and fs denotes a focal length of the decentering lens group.

Conditional expression (4) defines an appropriate range of a ratio of the focal length of the focusing lens group to that of the decentering lens group.

When the ratio ff/fs is equal to or exceeds the upper limit of conditional expression (4), the focal length of the focusing lens group becomes large, and a moving amount upon focusing becomes large, so that the optical system becomes long and the diameter thereof becomes large. Accordingly, the optical system itself becomes large to become impossible to make the optical system compact, so that it is undesirable. Moreover, spherical aberration and coma generated in the focusing lens group become undercorrected, so that it is undesirable. Otherwise, the focal length of the decentering lens group becomes small, and positional control of the decentering lens group in a direction perpendicular to the optical axis becomes difficult, and coma and decentering coma become difficult to be corrected, so that sufficient optical accuracy cannot be obtained. Accordingly, it is undesirable.

On the other hand, when the ratio ff/fs is equal to or falls below the lower limit of conditional expression (4), the focal length of the focusing lens group become small, and positional control of the focusing lens group along the optical axis becomes difficult, so that sufficient optical accuracy cannot be obtained. Accordingly, it is undesirable. Moreover, spherical aberration and coma are generated in the focusing lens group, so that it is undesirable. Otherwise, the focal length of the decentering lens group becomes large, so that a larger shift amount of the lens is necessary to obtain a required shift amount of the image. Accordingly, the shift lens group becomes large, so that it is undesirable. Moreover, coma and curvature of field become under corrected, so that it is undesirable.

In order to secure the effect of the present embodiment, it is preferable to set the upper limit of conditional expression (4) to 2.68. In order to further secure the effect of the present embodiment, it is preferable to set the upper limit of conditional expression (4) to 2.25. In order to still further secure the effect of the present embodiment, it is most preferable to set the upper limit of conditional expression (4) to 1.83.

In order to secure the effect of the present embodiment, it is preferable to set the lower limit of conditional expression (4) to −3.27. In order to further secure the effect of the present embodiment, it is preferable to set the lower limit of conditional expression (4) to −2.84. In order to still further secure the effect of the present embodiment, it is most preferable to set the lower limit of conditional expression (4) to −2.41.

In an optical system according to the present embodiment, the lens component preferably includes an aspherical surface. With this construction, it becomes possible to control decentering coma upon vibration reduction and to excellently correct curvature of field.

In an optical system according to the present embodiment, the most object side lens in the first lens group preferably includes an aspherical surface. With this construction, it becomes possible to excellently correct distortion and curvature of field upon zooming.

In an optical system according to the present embodiment, the following conditional expression (5) is preferably satisfied:

$$0.00 < (d12)/ft < 1.20 \tag{5}$$

where d12 denotes a distance along the optical axis between an image side lens surface of the most object side lens in the first lens group and an object side lens surface of a lens right behind the most object side lens, and ft denotes a focal length of the optical system in the telephoto end state.

Conditional expression (5) defines a distance along the optical axis between the image side lens surface of the most object side lens in the first lens group and the object side lens surface of the lens right behind the most object side lens.

When the ratio (d12)/ft is equal to or exceeds the upper limit of conditional expression (5), a distance along the optical axis between the image side lens surface of the most object side lens in the first lens group and the object side lens surface of the lens right behind the most object side lens becomes excessively large. As a result, the first lens group having negative refractive power becomes thick, and the most object side lens becomes large, so that manufacturing cost thereof increases, and the whole optical system becomes large. Accordingly, it is undesirable.

On the other hand, when the ratio (d12)/ft is equal to or falls below the lower limit of conditional expression (5), the focal length of the most object side lens becomes large, and distortion, astigmatism and curvature of field upon zooming become undercorrected, so that it is undesirable.

In order to secure the effect of the present embodiment, it is preferable to set the upper limit of conditional expression (5) to 1.11. In order to further secure the effect of the present embodiment, it is preferable to set the upper limit of conditional expression (5) to 1.03. In order to still further secure the effect of the present embodiment, it is most preferable to set the upper limit of conditional expression (5) to 0.94.

In order to secure the effect of the present embodiment, it is preferable to set the lower limit of conditional expression (5) to 0.04. In order to further secure the effect of the present embodiment, it is preferable to set the lower limit of conditional expression (5) to 0.09. In order to still further secure the effect of the present embodiment, it is most preferable to set the lower limit of conditional expression (5) to 0.13.

In an optical system according to the present embodiment, the most image side lens in the optical system preferably includes an aspherical surface. With this construction, it becomes possible to excellently correct astigmatism and curvature of field.

In an optical system according to the present embodiment, the focusing lens group preferably includes an aspherical surface. With this construction, it becomes possible to suppress variation in curvature of field upon focusing from an infinity object to a close object.

In an optical system according to the present embodiment, the decentering lens group preferably includes an aspherical surface. With this construction, it becomes possible to excellently correct variation in spherical aberration and coma generated in the decentering lens group. Moreover, deterioration in optical performance upon shifting can be suppressed. Furthermore, it is effective to correct curvature of field.

In an optical system according to the present embodiment, the most object side lens in the auxiliary lens group preferably includes an aspherical surface. With this construction, it becomes possible to excellently correct astigmatism, curvature of field, and distortion.

In an optical system according to the present embodiment, the focusing lens group preferably has positive refractive power. With this construction, it becomes possible to excellently correct spherical aberration.

In an optical system according to the present embodiment, the decentering lens group preferably has positive refractive power. With this construction, it becomes effective to suppress variation in spherical aberration upon decentering.

In an optical system according to the present embodiment, in order to obtain excellent optical performance upon shifting lens, in other words, upon shifting the decentering lens group, spherical aberration, sine condition, and Petzval sum can excellently be corrected. Correction of spherical aberration and sine condition is for suppressing decentering coma generated at the center of the image upon shifting the shift lens group in a direction substantially perpendicular to the optical axis. Correction of Petzval sum is for suppressing curvature of field generated on the periphery of the image upon shifting the shift lens group in a direction substantially perpendicular to the optical axis. Upon shifting, the whole of the decentering lens group or a portion of the decentering lens group is shifted in a direction substantially perpendicular to the optical axis, thereby carrying out shifting the image, so that an image blur on the image plane upon occurring a camera shake is preferably corrected.

In an optical system according to the present embodiment, the decentering lens group is preferably composed of a cemented lens. With this construction, it becomes possible to excellently correct chromatic aberration and spherical aberration generated in the decentering lens group.

In an optical system according to the present embodiment, the decentering lens group is preferably composed of a single lens. With this construction, the decentering lens group becomes compact and lightweight, so that it is desirable.

In an optical system according to the present embodiment, the following conditional expression (6) is preferably satisfied:

$$2.00 < |\beta G2fw| \qquad (6)$$

where $\beta G2fw$ denotes an imaging magnification of the focusing lens group in the wide-angle end state.

Conditional expression (6) defines an appropriate range of the imaging magnification of the focusing lens group in the wide-angle end state.

When the value $|\beta G2fw|$ is equal to or falls below the lower limit of conditional expression (6), variation in the moving amount for focusing of the focusing lens group upon zooming becomes large, so that it is undesirable.

In an optical system according to the present embodiment, the following conditional expression (7) is preferably satisfied:

$$2.00 < |\beta G2ft| \qquad (7)$$

where $\beta G2ft$ denotes an imaging magnification of the focusing lens group in the telephoto end state.

Conditional expression (7) defines an appropriate range of the imaging magnification of the focusing lens group in the telephoto end state.

When the value $|\beta G2ft|$ is equal to or falls below the lower limit of conditional expression (7), variation in the moving amount for focusing of the focusing lens group upon zooming becomes large, so that it is undesirable.

Then, an outline of a method for manufacturing an optical system according to the present application is explained.

Figure 62:
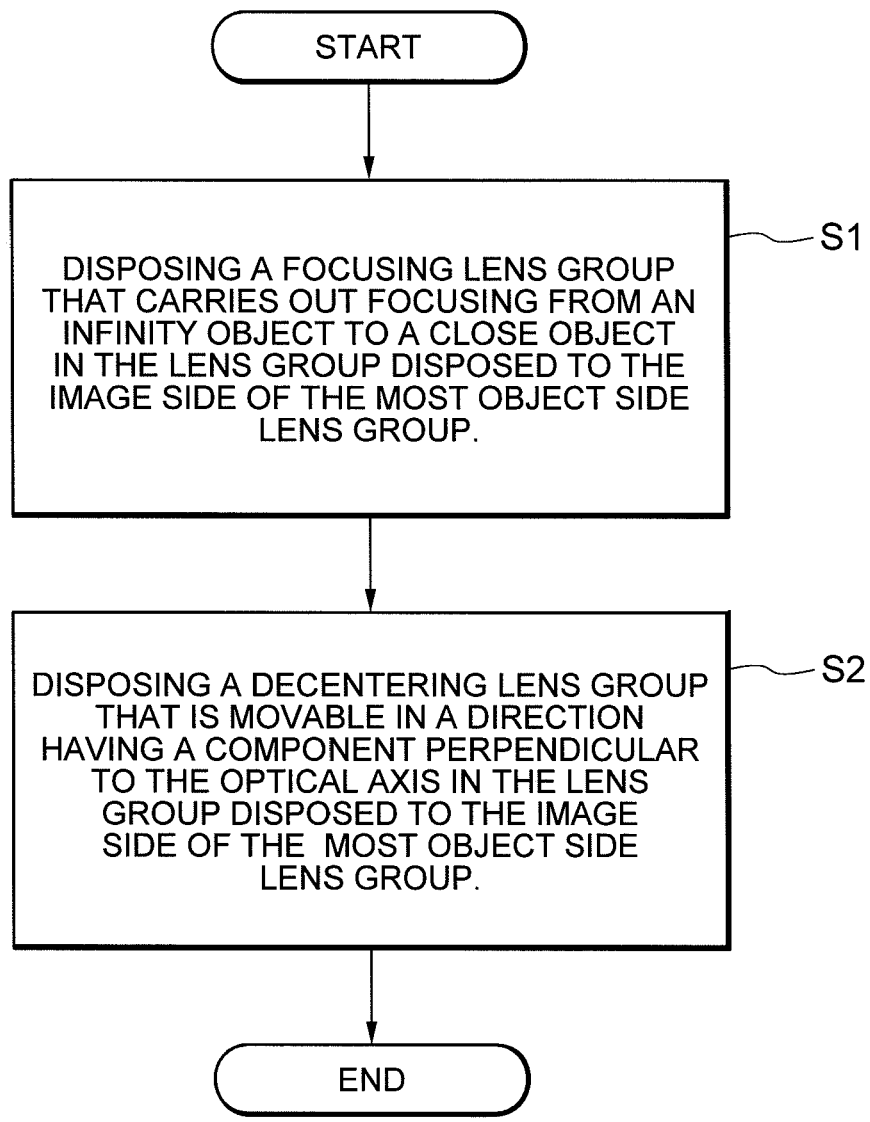
FIG. 62 is a flowchart schematically explaining a method for manufacturing the optical system according to the present embodiment.

FIG. 62 is a flowchart schematically explaining a method for manufacturing the optical system according to the present application.

The method for manufacturing the optical system according to the present application is a method for manufacturing an optical system comprising a most object side lens group, and a lens group having positive refractive power disposed to an image side of the most object side lens group, and includes the following steps S1 and S2 shown in FIG. 62.

Step S1: a focusing lens group that carries out focusing from an infinity object to a close object is disposed in the lens group disposed to the image side of the most object side lens group.

Step S2: a decentering lens group that is movable in a direction having a component perpendicular to the optical axis is disposed in the lens group disposed to the image side of the most object side lens group.

According to the method for manufacturing the optical system according to the present application, it becomes possible to manufacture an optical system capable of establishing both of an internal focusing system and a decentering lens group with obtaining compactness and excellent optical performance.

Then, an optical system according to the present embodiment seen from another point of view is explained below.

An optical system according to the present embodiment seen from another point of view is composed of a plurality of lens groups. A lens group disposed to an image side of the most object side lens group has positive refractive power. The lens group disposed to the image side of the most object side lens group includes a focusing lens group that carries out focusing from an infinity object to a close object, and a decentering lens group that is movable in a direction having a component perpendicular to an optical axis. The focusing lens group is disposed to the image side of the decentering lens group. Incidentally, the decentering lens group means a shift lens group or a tilt lens group.

With disposing a focusing lens group to the image side of a decentering lens group, it becomes possible to excellently mitigate deterioration in coma and curvature of field generated upon decentering the decentering lens group from an infinity state to a close range shooting state by the focusing lens group.

In an optical system according to the present embodiment seen from another point of view, it is preferable that upon zooming from a wide-angle end state to a telephoto end state, a distance between the most object side lens group and the lens group disposed to the image side of the most object side lens group varies, and the lens group disposed to the image side of the most object side lens group moves to the object side. The lens group disposed to the image side of the most object side lens group has an effect to enlarge an image of an object, as the state proceeds from the wide-angle end state to the telephoto end state, the magnification is getting increased by varying the distance between the most object side lens group and the lens group disposed to the image side of the most object side lens group, thereby enabling to vary the focal length.

In an optical system according to the present embodiment seen from another point of view, the most object side lens group preferably has negative refractive power. With distributing negative refractive power to the most object side lens group, it becomes possible to correct variation in the image plane upon zooming.

In an optical system according to the present embodiment seen from another point of view, the most object side lens group and the lens group disposed to the image side of the most object side lens group are preferably adjacent with each other. With making the most object side lens group and the lens group disposed to the image side of the most object side lens group adjacent with each other, it becomes possible to suppress deterioration in coma and curvature of field upon zooming.

In an optical system according to the present embodiment seen from another point of view, an aperture stop is preferably disposed between the focusing lens group and the decentering lens group.

In a lens group capable of shifting the image, in order to suppress deterioration in optical performance upon shifting as much as possible, shifting is carried by a lens group disposed near to the aperture stop, in which off-axis light flux passes near to the optical axis, thereby keeping excellent optical performance. With disposing the focusing lens group near to the aperture stop, it becomes possible to suppress variation in the image plane upon focusing from an infinity object to a close object.

In an optical system according to the present embodiment seen from another point of view, an auxiliary lens group is preferably disposed at least one of the object side and the image side of the decentering lens group. With disposing an auxiliary lens group, it becomes possible to suppress generation of decentering coma and to mitigate deterioration in curvature of field upon shifting, that is, upon vibration reduction.

In an optical system according to the present embodiment seen from another point of view, the following conditional expression (1) is preferably satisfied:

$$-11.00 < fa/fs < 11.00 \quad (1)$$

where fa denotes a focal length of the auxiliary lens group, and fs denotes a focal length of the decentering lens group.

Conditional expression (1) defines an appropriate range of a ratio of the focal length of the auxiliary lens group to that of the decentering lens group.

When the ratio fa/fs is equal to or exceeds the upper limit of conditional expression (1), refractive power of the decentering lens group becomes strong, so that it becomes difficult to carry out positional control of the decentering lens group in a direction perpendicular to the optical axis. As a result, it becomes difficult to correct decentering coma and coma, so that it is undesirable.

On the other hand, when the ratio fa/fs is equal to or falls below the lower limit of conditional expression (1), refractive power of the decentering lens group becomes weak, so that much larger shift amount is necessary to obtain desired image shift amount. Moreover, coma and curvature of field become undercorrected, so that it is undesirable.

In order to secure the effect of the present embodiment, it is preferable to set the upper limit of conditional expression (1) to 9.22. In order to further secure the effect of the present embodiment, it is preferable to set the upper limit of conditional expression (1) to 7.35. In order to still further secure the effect of the present embodiment, it is most preferable to set the upper limit of conditional expression (1) to 5.48.

In order to secure the effect of the present embodiment, it is preferable to set the lower limit of conditional expression (1) to −9.18. In order to further secure the effect of the present embodiment, it is preferable to set the lower limit of conditional expression (1) to −7.35. In order to still further secure the effect of the present embodiment, it is most preferable to set the lower limit of conditional expression (1) to −5.48.

In an optical system according to the present embodiment seen from another point of view, the following conditional expression (8) is preferably satisfied:

$$0.05 < |f/ff| < 0.65 \quad (8)$$

where f denotes a focal length of the optical system, and ff denotes a focal length of the focusing lens group.

Conditional expression (8) defines an appropriate range of a ratio of the focal length of the optical system to that of the focusing lens group.

When the value |f/ff| is equal to or exceeds the upper limit of conditional expression (8), refractive power of the focusing lens group becomes strong, so that it becomes difficult to carry out positional control of the focusing lens group on the optical axis. Moreover, variation in curvature of field and coma upon focusing from infinity to a close object becomes large, so that it is undesirable.

On the other hand, when the value |f/ff| is equal to or falls below the lower limit of conditional expression (8), refractive power of the focusing lens group becomes weak, so that the moving amount of the focusing lens group becomes necessary to be large. Moreover, coma and curvature of field become undercorrected, so that it is undesirable.

In order to secure the effect of the present embodiment, it is preferable to set the upper limit of conditional expression (8) to 0.60. In order to further secure the effect of the present embodiment, it is preferable to set the upper limit of conditional expression (8) to 0.54. In order to still further secure the effect of the present embodiment, it is most preferable to set the upper limit of conditional expression (8) to 0.48.

In order to secure the effect of the present embodiment, it is preferable to set the lower limit of conditional expression (8) to 0.09. In order to further secure the effect of the present embodiment, it is preferable to set the lower limit of conditional expression (8) to 0.12. In order to still further secure the effect of the present embodiment, it is most preferable to set the lower limit of conditional expression (8) to 0.16.

In an optical system according to the present embodiment seen from another point of view, the following conditional expression (9) is preferably satisfied:

$$0.05<|f\gamma|<2.75 \qquad (9)$$

where fγ denotes an image plane moving coefficient (a ratio of a moving amount of the image plane to a moving amount of the focusing lens group) of the focusing lens group.

Conditional expression (9) defines an appropriate range of the image plane moving coefficient of the focusing lens group.

When the value |fγ| is equal to or exceeds the upper limit of conditional expression (9), refractive power of the focusing lens group becomes weak, so that it becomes difficult to carry out positional control of the focusing lens group along the optical axis. Moreover, coma and curvature of field become undercorrected, so that it is undesirable.

On the other hand, when the value |fγ| is equal to or falls below the lower limit of conditional expression (9), refractive power of the focusing lens group becomes strong, so that spherical aberration and coma are generated in the focusing lens group. Moreover, deterioration in optical performance upon focusing on a close object becomes large, so that it is undesirable.

In order to secure the effect of the present embodiment, it is preferable to set the upper limit of conditional expression (9) to 2.55. In order to further secure the effect of the present embodiment, it is preferable to set the upper limit of conditional expression (9) to 2.30. In order to still further secure the effect of the present embodiment, it is most preferable to set the upper limit of conditional expression (9) to 2.00.

In order to secure the effect of the present embodiment, it is preferable to set the lower limit of conditional expression (9) to 0.15. In order to further secure the effect of the present embodiment, it is preferable to set the lower limit of conditional expression (9) to 0.25. In order to still further secure the effect of the present embodiment, it is most preferable to set the lower limit of conditional expression (9) to 0.45.

In an optical system according to the present embodiment seen from another point of view, the following conditional expression (2) is preferably satisfied:

$$0.05<|fw/ff|<0.65 \qquad (2)$$

where fw denotes a focal length of the optical system in the wide-angle end state, and ff denotes a focal length of the focusing lens group.

Conditional expression (2) defines an appropriate range of a ratio of the focal length of the optical system in the wide-angle end state to that of the focusing lens group.

When the ratio |fw/ff| is equal to or exceeds the upper limit of conditional expression (2), refractive power of the focusing lens group becomes strong, so that it becomes difficult to carry out positional control of the focusing lens group along the optical axis. Moreover, variation in curvature of field and coma upon focusing from infinity to a close object becomes large, so that it is undesirable.

On the other hand, when the ratio |fw/ff| is equal to or falls below the lower limit of conditional expression (2), refractive power of the focusing lens group becomes weak, so that moving amount of the focusing lens group becomes necessary to be large. Moreover, coma and curvature of field become undercorrected, so that it is undesirable.

In order to secure the effect of the present embodiment, it is preferable to set the upper limit of conditional expression (2) to 0.60. In order to further secure the effect of the present embodiment, it is preferable to set the upper limit of conditional expression (2) to 0.54. In order to still further secure the effect of the present embodiment, it is most preferable to set the upper limit of conditional expression (2) to 0.48.

In order to secure the effect of the present embodiment, it is preferable to set the lower limit of conditional expression (2) to 0.09. In order to further secure the effect of the present embodiment, it is preferable to set the lower limit of conditional expression (2) to 0.12. In order to still further secure the effect of the present embodiment, it is most preferable to set the lower limit of conditional expression (2) to 0.16.

In an optical system according to the present embodiment seen from another point of view, the following conditional expression (3) is preferably satisfied:

$$0.05<|f\gamma w|<2.75 \qquad (3)$$

where fγw denotes an image plane moving coefficient (a ratio of a moving amount of the image plane to a moving amount of the focusing lens group) of the focusing lens group in the wide-angle end state.

Conditional expression (3) defines an appropriate range of the image plane moving coefficient of the focusing lens group in the wide-angle end state.

When the value |fγw| is equal to or exceeds the upper limit of conditional expression (3), refractive power of the focusing lens group becomes weak, so that it becomes difficult to carry out positional control of the focusing lens group on the optical axis. Moreover, coma and curvature of field become undercorrected, so that it is undesirable.

On the other hand, when the value |fγw| is equal to or falls below the lower limit of conditional expression (3), refractive power of the focusing lens group becomes strong, so that spherical aberration and coma are generated in the focusing lens group. Moreover, deterioration in optical performance upon focusing on a close object becomes large, so that it is undesirable.

In order to secure the effect of the present embodiment, it is preferable to set the upper limit of conditional expression (3) to 2.55. In order to further secure the effect of the present embodiment, it is preferable to set the upper limit of conditional expression (3) to 2.30. In order to still further secure the effect of the present embodiment, it is most preferable to set the upper limit of conditional expression (3) to 2.00.

In order to secure the effect of the present embodiment, it is preferable to set the lower limit of conditional expression (3) to 0.15. In order to further secure the effect of the present embodiment, it is preferable to set the lower limit of conditional expression (3) to 0.25. In order to still further secure the effect of the present embodiment, it is most preferable to set the lower limit of conditional expression (3) to 0.45.

In an optical system according to the present embodiment seen from another point of view, the following conditional expression (4) is preferably satisfied:

$$-4.00<ff/fs<4.00 \qquad (4)$$

where ff denotes a focal length of the focusing lens group, and fs denotes a focal length of the decentering lens group.

Conditional expression (4) defines an appropriate range of a ratio of the focal length of the focusing lens group to that of the decentering lens group.

When the ratio ff/fs is equal to or exceeds the upper limit of conditional expression (4), refractive power of the focusing lens group becomes weak, so that it becomes difficult to carry out positional control of the focusing lens group on the optical axis. Moreover, coma and curvature of field become undercorrected, so that it is undesirable. Otherwise, refractive power of the decentering lens group becomes strong, so that it becomes difficult to carry out positional control of the decentering lens group in a direction perpendicular to the optical axis. As a result, it becomes difficult to correct decentering coma and coma, so that it is undesirable.

On the other hand, when the ratio ff/fs is equal to or falls below the lower limit of conditional expression (4), refractive power of the focusing lens group becomes strong, so that spherical aberration and coma are generated in the focusing lens group. Moreover, deterioration in optical performance upon focusing on a close object becomes large, so that it is undesirable. Otherwise, refractive power of the decentering lens group becomes weak, so that a larger shift amount becomes necessary for obtaining desired shift amount of the image. Moreover, coma and curvature of field become undercorrected, so that it is undesirable.

In order to secure the effect of the present embodiment, it is preferable to set the upper limit of conditional expression (4) to 3.32. In order to further secure the effect of the present embodiment, it is preferable to set the upper limit of conditional expression (4) to 2.66. In order to still further secure the effect of the present embodiment, it is most preferable to set the upper limit of conditional expression (4) to 2.00.

In order to secure the effect of the present embodiment, it is preferable to set the lower limit of conditional expression (4) to −3.34. In order to further secure the effect of the present embodiment, it is preferable to set the lower limit of conditional expression (4) to −2.67. In order to still further secure the effect of the present embodiment, it is most preferable to set the lower limit of conditional expression (4) to −2.00.

In an optical system according to the present embodiment seen from another point of view, the following conditional expression (5) is preferably satisfied:

$$0.00 < (d12)/ft < 1.50 \quad (5)$$

where d12 denotes a distance along the optical axis between an image side lens surface of the most object side lens in the optical system and an object side lens surface of a lens right behind the most object side lens, and ft denotes a focal length of the optical system in the telephoto end state.

Conditional expression (5) defines a distance along the optical axis between the image side lens surface of the most object side lens in the optical system and the object side lens surface of the lens right behind the most object side lens.

When the ratio (d12)/ft is equal to or exceeds the upper limit of conditional expression (5), the distance along the optical axis between the image side lens surface of the most object side lens in the optical system and the object side lens surface of the lens right behind the most object side lens becomes large. As a result, the most object side lens group in the optical system becomes thick. As a result, it becomes difficult to sufficiently correct coma and curvature of field, so that it is undesirable.

On the other hand, when the ratio (d12)/ft is equal to or falls below the lower limit of conditional expression (5), refractive power of the most object side lens group becomes weak, so that curvature of field upon zooming and distortion become undercorrected. Accordingly, it is undesirable.

In order to secure the effect of the present embodiment, it is preferable to set the upper limit of conditional expression (5) to 1.30. In order to further secure the effect of the present embodiment, it is preferable to set the upper limit of conditional expression (5) to 1.15. In order to still further secure the effect of the present embodiment, it is most preferable to set the upper limit of conditional expression (5) to 1.00.

In order to secure the effect of the present embodiment, it is preferable to set the lower limit of conditional expression (5) to 0.04. In order to further secure the effect of the present embodiment, it is preferable to set the lower limit of conditional expression (5) to 0.09. In order to still further secure the effect of the present embodiment, it is most preferable to set the lower limit of conditional expression (5) to 0.13.

In an optical system according to the present embodiment seen from another point of view, the decentering lens group preferably includes an aspherical surface. With this construction, it becomes possible to excellently correct spherical aberration and coma generated in the decentering lens group, and in particular it becomes possible to reduce deterioration in coma generated by decentering.

In an optical system according to the present embodiment seen from another point of view, in order to prevent miss shooting caused by an image blur generated by a camera shake liable to happen in a high-zoom-ratio zoom lens, a detection system for detecting a camera shake and a driving means are combined to the optical system, and a lens group or a portion of a lens group composing the optical system can be decentered as a decentering lens group. In other words, in order to correct an image blur (displacement of the image plane) caused by a camera shake detected by the detection system, the image can be shifted by driving the decentering lens group by means of the driving means. As described above, an optical system according to the present embodiment seen from another point of view can be functioned as a vibration reduction lens system.

Then, an outline of a method for manufacturing an optical system according to the present application seen from another point of view is explained.

Figure 63:
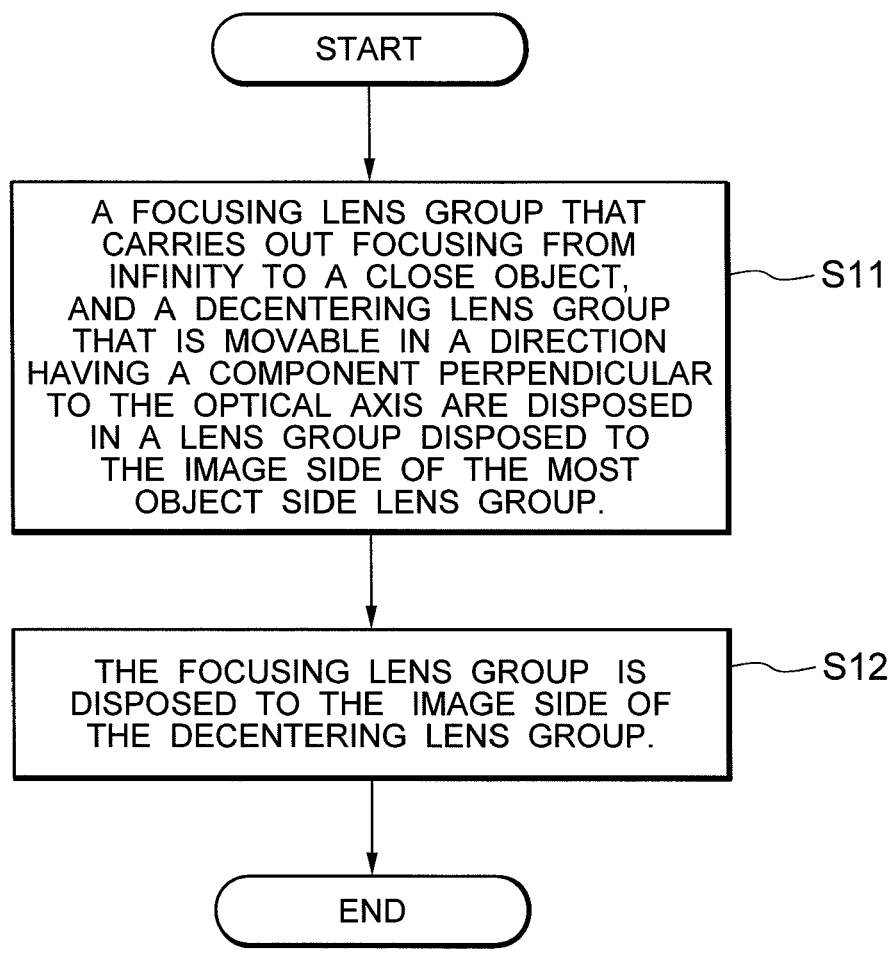
FIG. 63 is a flowchart schematically explaining a method for manufacturing the optical system according to an embodiment seen from another point of view.

FIG. 63 is a flowchart schematically explaining a method for manufacturing the optical system according to the present application seen from another point of view.

The method for manufacturing the optical system according to the present application seen from another point of view is a method for manufacturing an optical system composed of a plurality of lens groups, and a lens group disposed to an image side of the most object side lens group has positive refractive power, and includes the following steps S11 and S12 shown in FIG. 63.

Step S11: a focusing lens group that carries out focusing from infinity to a close object, and a decentering lens group that is movable in a direction having a component perpendicular to the optical axis are disposed in a lens group disposed to the image side of the most object side lens group.

Step S12: the focusing lens group is disposed to the image side of the decentering lens group.

According to the method for manufacturing the optical system according to the present application seen from another point of view, it becomes possible to manufacture an optical system capable of establishing both of an internal focusing system and a decentering lens group with obtaining compactness and excellent optical performance.

Each example according to the present embodiment is explained below with reference to accompanying drawings.

Example 1

FIG. 1 is a sectional view showing a lens configuration of an optical system according to Example 1.

As shown in FIG. 1, the optical system according to Example 1 is composed of, in order from an object side, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side, a negative meniscus lens L11 having a convex surface facing the object side, a double convex negative lens L12, and a positive meniscus lens L13 having a convex surface facing the object side. The negative meniscus lens L11 disposed to the most object side in the first lens group G1 is an aspherical lens having an aspherical surface formed on an image plane I side.

The second lens group G2 is composed of, in order from the object side, a cemented positive lens constructed by a negative meniscus lens L21 having a convex surface facing the object side cemented with a double convex positive lens L22, an aperture stop S, a cemented positive lens constructed by a double convex positive lens L23 cemented with a negative meniscus lens L24 having a concave surface facing the object side, a negative meniscus lens L25 having a convex surface facing the object side, and a cemented positive lens constructed by a negative meniscus lens L26 having a convex surface facing the object side cemented with a double convex positive lens L27. The negative meniscus lens L21 disposed to the most object side in the second lens group G2 is an aspherical lens having an aspherical surface formed on the object side surface. The double convex positive lens L27 disposed to the most image plane I side in the second lens group G2 is an aspherical lens having an aspherical surface formed on the image plane I side.

The image plane I is formed on an unillustrated imaging device, and the imaging device is constructed by a CCD or a CMOS (the same goes in the following Examples).

The aperture stop S disposed in the second lens group G2 moves to the object side in a body with the second lens group G2 upon zooming from the wide-angle end state W to the telephoto end state T.

The cemented positive lens constructed by the negative meniscus lens L21 cemented with the double convex lens L22 is a focusing lens group Gf, and with moving the focusing lens group Gf to the image plane I side, focusing from an infinity object to a close object is carried out.

The cemented positive lens constructed by the double convex positive lens L23 cemented with the negative meniscus lens L24 is a decentering lens group Gs, and with moving the decentering lens group Gs in a direction substantially perpendicular to the optical axis, vibration reduction is carried out.

The negative meniscus lens L25 and the cemented positive lens constructed by the negative meniscus lens L26 cemented with the double convex positive lens L27 are an auxiliary lens group Ga having negative refractive power.

Various values associated with the optical system according to Example 1 are listed in Table 1. In [Specifications], W denotes a wide-angle end state, M denotes an intermediate focal length state, T denotes a telephoto end state, f denotes a focal length of the zoom optical system, FNO denotes an f-number, and 2ω denotes an angle of view (unit: degree), Y denotes an image height, TL denotes a total lens length, and Bf denotes a back focal length. In [Lens Data], the left most column "i" shows the lens surface number counted in order from the object side, the second column "r" shows a radius of curvature of the lens surface, the third column "d" shows a distance to the next surface, the fourth column "nd" shows a refractive index at d-line (wavelength λ=587.6 nm), and the fifth column "vd" shows an Abbe number at d-line (wavelength λ=587.6 nm). In the fourth column "nd" refractive index of the air nd=1.000000 is omitted. In the second column "r", r=∞ indicates a plane surface. In third column "d", Bf denotes a back focal length. In [Aspherical Date], an aspherical surface is expressed by the following expression:

$$X(y)=(y^2/r)/[1+[1-\kappa(y^2/r^2)]^{1/2}]+A4 \times y^4+A6 \times y^6+A8 \times y^8+A10 \times y^{10}$$

where "y" denotes a vertical height from the optical axis, X(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), K denotes a conical coefficient, and An denotes an aspherical coefficient of n-th order. In [Aspherical Surface Data], "E–n" denotes "×10$^{-n}$", in which "n" is an integer, and for example "1.234E–05" denotes "1.234×10$^{-5}$". Each aspherical surface is expressed in [Lens Data] by attaching "*" to the right side of the surface number.

In [Variable Distances], ΔFx denotes a moving amount of the focusing lens group where the movement to the object side is positive, and d0 denotes a distance between the object and the most object side lens surface.

In [Lens Group Data], a starting surface number and a focal length of each lens group is shown.

In [Values for Conditional Expressions], values for conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. The explanation of reference symbols is the same in the other Examples.

TABLE 1

[Specifications]
Zoom Ratio: 2.825

| | W | M | T |
|---|---|---|---|
| f = | 10.30 | 17.30 | 29.10 |
| FNO = | 3.31 | 4.22 | 5.78 |
| 2ω = | 77.58 | 49.65 | 30.52 |
| Y = | 7.962 | 7.962 | 7.962 |
| TL = | 73.80 | 67.53 | 72.19 |
| Bf = | 18.7255 | 26.4381 | 39.4394 |

[Lens Data]

| i | r | d | nd | vd |
|---|---|---|---|---|
| 1 | 18.6779 | 1.30 | 1.85135 | 40.10 |
| 2* | 7.8525 | 7.25 | | |
| 3 | −94.6821 | 1.00 | 1.83481 | 42.72 |
| 4 | 34.1506 | 0.31 | | |
| 5 | 18.6651 | 2.51 | 1.86074 | 23.06 |
| 6 | 78.9142 | (d6) | | |
| 7* | 18.1125 | 1.30 | 1.83441 | 37.28 |
| 8 | 12.2772 | 1.76 | 1.59319 | 67.87 |
| 9 | −2494.0282 | (d9) | | |
| 10 | ∞ | 1.00 | Aperture Stop S | |
| 11 | 23.3375 | 1.67 | 1.74400 | 44.78 |
| 12 | −19.5626 | 1.00 | 1.67270 | 32.11 |
| 13 | −219.6865 | 2.59 | | |
| 14 | 106.9379 | 1.53 | 1.80486 | 24.73 |
| 15 | 28.0039 | 1.36 | | |
| 16 | 352.0524 | 0.83 | 1.79952 | 42.24 |
| 17 | 10.0128 | 2.17 | 1.69350 | 53.20 |
| 18* | −38.1016 | (Bf) | | |

TABLE 1-continued

[Aspherical Data]

Surface Number: 2

κ = 0.6460
A4 = 1.2719E−05
A6 = 5.3251E−07
A8 = −4.7392E−09
A10 = 4.5963E−11

Surface Number: 7

κ = −1.0893
A4 = 3.0467E−05
A6 = 9.8555E−08
A8 = −1.0556E−08
A10 = 2.2926E−10

Surface Number: 18

κ = 1.0000
A4 = 6.6102E−05
A6 = 5.9125E−08
A8 = 3.8159E−08
A10 = −1.1681E−09

| | W | M | T |
|---|---|---|---|
| [Variable Distances upon Zooming] | | | |
| f = | 10.3000 | 17.3000 | 29.0999 |
| d6 = | 23.5020 | 9.5180 | 1.1743 |
| d9 = | 3.9922 | 3.9922 | 3.9922 |
| Bf = | 18.7255 | 26.4381 | 39.4394 |
| [Moving Amount of Focusing Lens Group] | | | |
| f = | 10.3000 | 17.3000 | 29.0999 |
| ΔFx = | 0.36655 | 0.18679 | 0.11743 |
| [Variable Distances upon Shooting Magnification = −0.01] | | | |
| d0 = | 1007.2359 | 1711.1536 | 2893.2744 |
| f = | 10.16856 | 17.14450 | 28.85935 |
| d6 = | 23.86855 | 9.70478 | 1.29170 |
| d9 = | 3.62564 | 3.80541 | 3.87477 |
| Bf = | 18.72545 | 26.43808 | 39.43937 |

[Lens Group Data]

| Group | I | Focal Length |
|---|---|---|
| 1 | 1 | −17.9744 |
| 2 | 7 | 19.8044 |

[Values for Conditional Expressions]

fw = 10.3000
ft = 29.0999
ff = 36.6504
fs = 26.0978
fa = −98.3425
d12 = 7.2500
fγw = −0.282
βG2fw = −2.668
βG2ft = 4.265
(1) fa/fs = −3.768
(2) |fw/ff| = 0.281
(3) |fγw| = 0.282
(4) ff/fs = 1.404
(5) (d12)/ft = 0.249
(6) |βG2fw| = 2.668
(7) |βG2ft| = 4.265

Figure 2B:
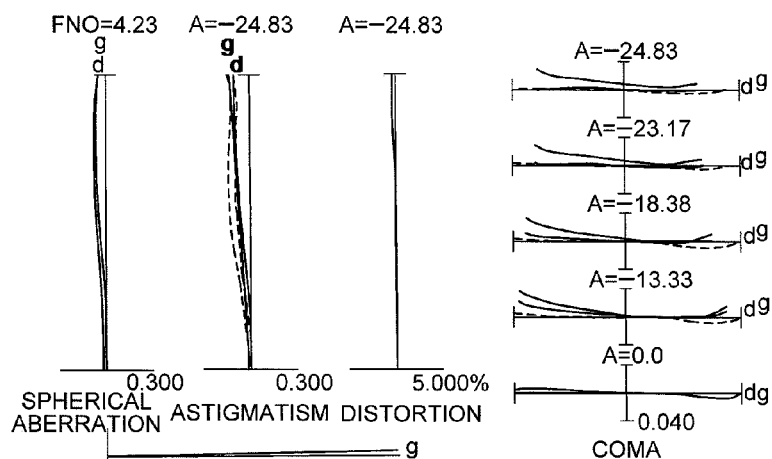
Figure 2C:
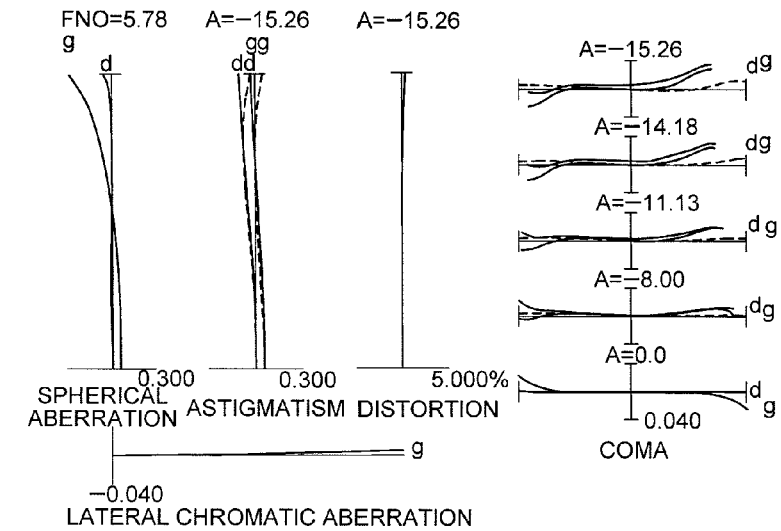
Figure 3A:
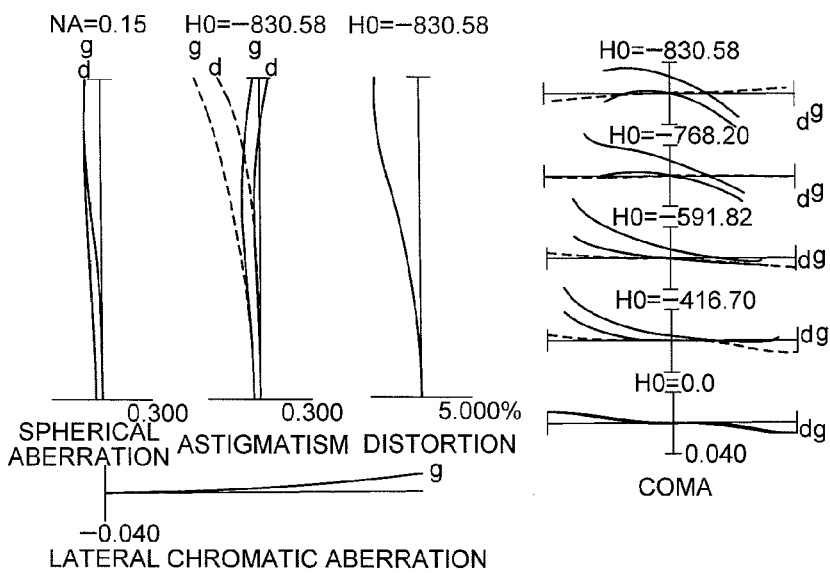
Figure 3B:
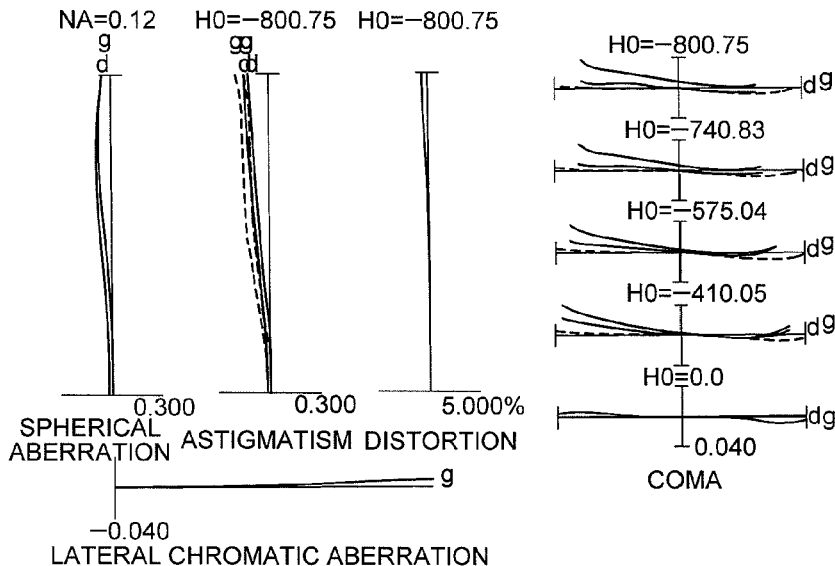
Figure 3C:
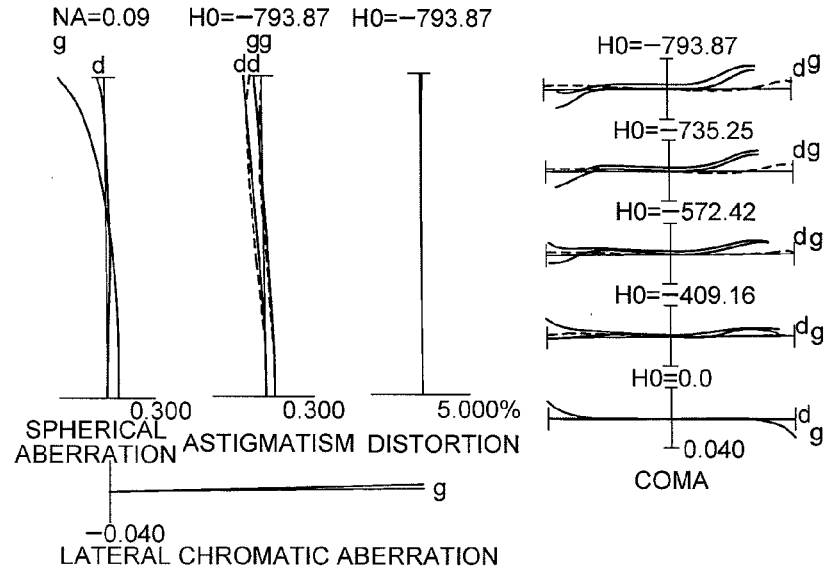
Figure 4A:
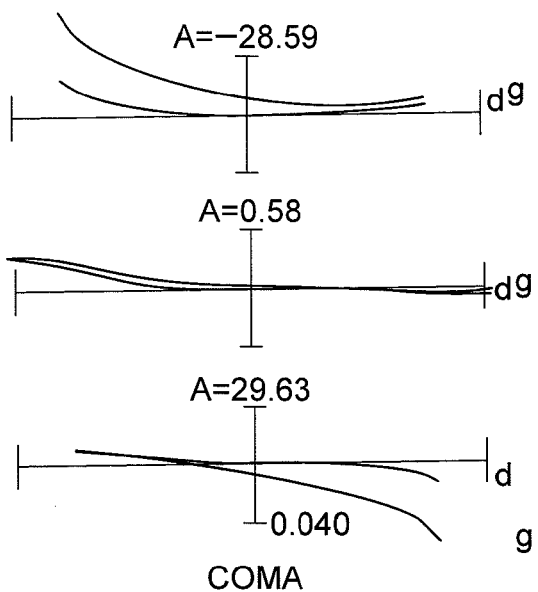
Figure 4B:
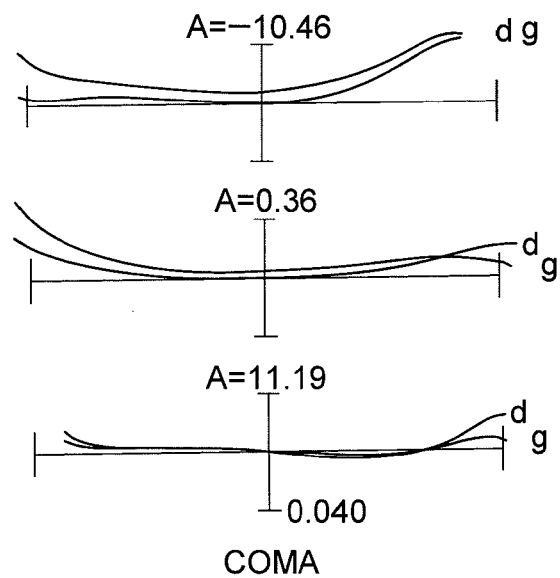

FIGS. 2A, 2B, and 2C are graphs showing various aberrations of the optical system according to Example 1 focusing on infinity, in which FIG. 2A is in a wide-angle end state, FIG. 2B is in an intermediate focal length state, and FIG. 2O is in a telephoto end state. FIGS. 3A, 3B, and 3C are graphs showing various aberrations of the optical system according to Example 1 focusing on a close object (shooting magnification is −0.01), in which FIG. 3A is in the wide-angle end state, FIG. 3B is in the intermediate focal length state, and FIG. 3C is in the telephoto end state. FIGS. 4A, and 4B are graphs showing coma of the optical system according to Example 1 upon shifting a decentering lens group (0.1 mm) focusing on infinity, in which FIG. 4A is in the wide-angle end state, and FIG. 4B is in the telephoto end state.

In respective graphs, FNO denotes an f-number, A denotes a half angle of view (unit: degree), HO denotes an object height (unit: mm), d denotes d-line (wavelength λ=587.6 nm), and g denotes g-line (wavelength λ=435.6 nm). In graphs showing astigmatism, a solid line indicates a sagittal image plane, and a broken line indicates a meridional image plane. The above-described explanation regarding various aberration graphs is the same as the other Examples.

As is apparent from the respective graphs, the optical system according to Example 1 shows superb optical performance as a result of good corrections to various aberrations in each focal length state from the wide-angle end state through the telephoto end state.

Example 2

FIG. 5 is a sectional view showing a lens configuration of an optical system according to Example 2.

As shown in FIG. 5, the optical system according to Example 2 is composed of, in order from an object side, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side, a negative meniscus lens L11 having a convex surface facing the object side, a double concave negative lens L12, a positive meniscus lens L13 having a convex surface facing the object side, and a positive meniscus lens L14 having a convex surface facing the object side. The negative meniscus lens L11 disposed to the most object side in the first lens group G1 is an aspherical lens having an aspherical surface formed on the image plane I side surface.

The second lens group G2 is composed of, in order from the object side, a cemented positive lens constructed by a negative meniscus lens L21 having a convex surface facing the object side cemented with a positive meniscus lens L22 having a convex surface facing the object side, an aperture stop S, a cemented positive lens constructed by a double convex positive lens L23 cemented with a negative meniscus lens L24 having a concave surface facing the object side, a positive meniscus lens L25 having a convex surface facing the object side, and a cemented negative lens constructed by a double concave negative lens L26 cemented with a double convex positive lens. The negative meniscus lens L21 disposed to the most object side in the second lens group G2 is an aspherical lens having an aspherical surface formed on the object side surface. The positive meniscus lens L25 disposed to the image plane I side of the decentering lens group Gs in the second lens group G2 is an aspherical lens having an aspherical surface formed on the object side surface. The double convex positive lens L27 disposed to the most image plane I side of the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The cemented positive lens constructed by the negative meniscus lens L21 cemented with the positive meniscus lens L22 is a focusing lens group Gf, and with moving the focusing lens group Gf to the image plane I side, focusing from an infinity object to a close object is carried out.

The cemented positive lens constructed by the double convex positive lens L23 cemented with the negative meniscus lens L24 is a decentering lens group Gs, and with moving the decentering lens group Gs in a direction substantially perpendicular to the optical axis, vibration reduction is carried out.

The positive meniscus lens L25 and the cemented negative lens constructed by the double concave negative lens L26 cemented with the double convex positive lens L27 are an auxiliary lens group Ga having positive refractive power.

Various values associated with the optical system according to Example 2 are listed in Table 2.

TABLE 2

[Specifications]
Zoom Ratio: 2.825

| | W | M | T |
|---|---|---|---|
| f = | 10.30 | 17.30 | 29.10 |
| FNO = | 3.51 | 4.14 | 5.77 |
| 2ω = | 78.16 | 49.68 | 30.56 |
| Y = | 7.962 | 7.962 | 7.962 |
| TL = | 74.56 | 70.81 | 77.93 |
| Bf = | 20.7334 | 9.3225 | 43.8013 |

[Lens Data]

| i | r | d | nd | νd |
|---|---|---|---|---|
| 1 | 16.2784 | 1.30 | 1.85135 | 40.10 |
| 2* | 8.9447 | 5.30 | | |
| 3 | −301.3986 | 1.00 | 1.88300 | 40.76 |
| 4 | 12.6615 | 1.06 | | |
| 5 | 18.9306 | 1.56 | 1.76346 | 26.38 |
| 6 | 27.0707 | 1.36 | | |
| 7 | 18.2904 | 2.18 | 1.86074 | 23.06 |
| 8 | 58.5517 | (d8) | | |
| 9* | 16.7318 | 1.39 | 1.85135 | 40.10 |
| 10 | 11.1081 | 1.81 | 1.58090 | 57.73 |
| 11 | 676.4968 | (d11) | | |
| 12 | ∞ | 1.00 | Aperture Stop S | |
| 13 | 134.3575 | 1.83 | 1.75197 | 47.49 |
| 14 | −10.0350 | 1.00 | 1.83781 | 31.56 |
| 15 | −34.0385 | 1.80 | | |
| 16* | 13.9946 | 1.35 | 1.77377 | 47.17 |
| 17 | 24.7571 | 2.13 | | |
| 18 | −54.0166 | 0.80 | 1.89370 | 35.17 |
| 19 | 9.5527 | 1.80 | 1.73077 | 40.50 |
| 20* | −53.9739 | (Bf) | | |

[Aspherical Data]

Surface Number: 2

κ = 0.1601
A4 = 9.1340E−05
A6 = 4.5205E−07
A8 = 5.5818E−09
A10 = −2.4977E−11
Surface Number: 9

κ = −3.5386
A4 = 1.0402E−04
A6 = −8.0989E−07
A8 = 1.5095E−08
A10 = −1.1446E−10
Surface Number: 16

κ = −0.0568
A4 = 1.5624E−04
A6 = 1.5318E−06

TABLE 2-continued

A8 = 1.2547E−08
A10 = 0.0000E+00
Surface Number: 20

κ = 1.0000
A4 = 1.9868E−04
A6 = 1.8409E−06
A8 = 9.4693E−08
A10 = −1.4396E−09

| | W | M | T |
|---|---|---|---|
| [Variable Distances upon Zooming] | | | |
| f = | 10.3000 | 17.3001 | 29.1002 |
| d8 = | 21.1546 | 8.8150 | 1.4524 |
| d11 = | 4.0108 | 4.0108 | 4.0108 |
| Bf = | 20.7334 | 9.3225 | 43.8013 |
| [Moving Amount of Focusing Lens Group] | | | |
| f = | 10.3000 | 17.3001 | 29.1002 |
| ΔFx = | 0.26202 | 0.14965 | 0.09679 |
| [Variable Distances upon Shooting Magnification = −0.01] | | | |
| d0 = | 1010.2853 | 1712.6264 | 2894.1760 |
| f = | 10.20052 | 17.16716 | 28.88711 |
| d8 = | 21.41652 | 8.96456 | 1.54914 |
| d11 = | 3.74878 | 3.86115 | 3.91401 |
| Bf = | 20.73340 | 29.32251 | 43.80132 |

[Lens Group Data]

| Group | I | Focal Length |
|---|---|---|
| 1 | 1 | −16.0000 |
| 2 | 9 | 19.6321 |

[Values for Conditional Expressions]

fw = 10.3000
ft = 29.1002
ff = 37.5001
fs = 46.2923
fa = 136.987
d12 = 5.2957
fγw = −0.394
βG2fw = −4.4851
βG2ft = 3.3066
(1) fa/fs = 2.959
(2) |fw/ff| = 0.275
(3) |fγw| = 0.394
(4) ff/fs = 0.810
(5) (d12)/ft = 0.182
(6) |βG2fw| = 4.485
(7) |βG2ft| = 3.307

Figure 6A:
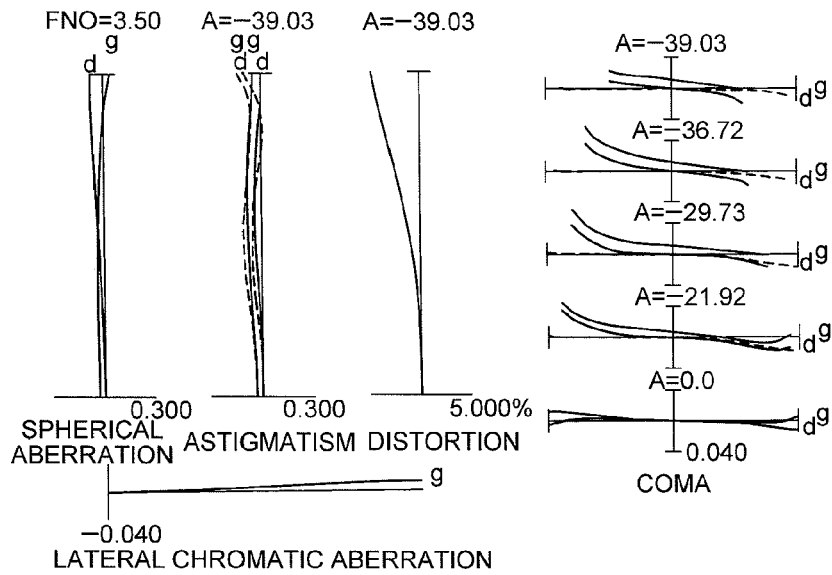
Figure 6B:
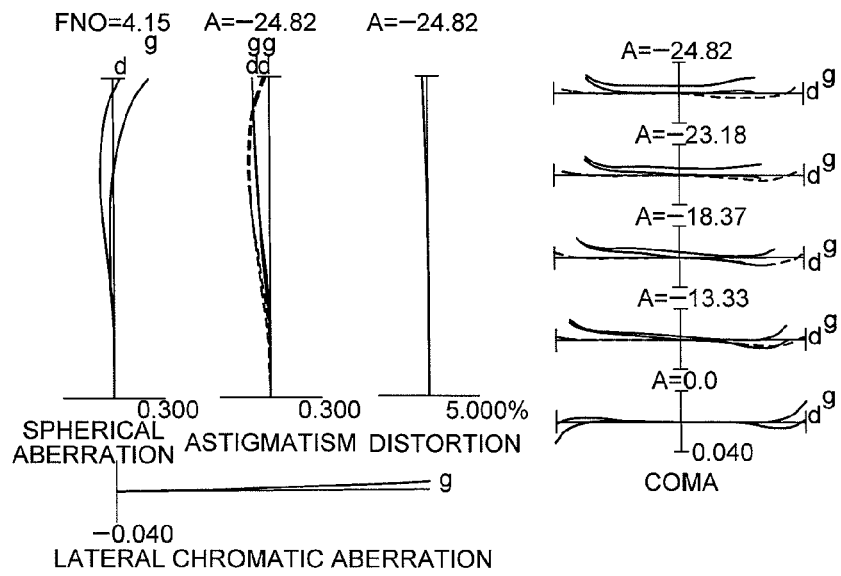
Figure 6C:
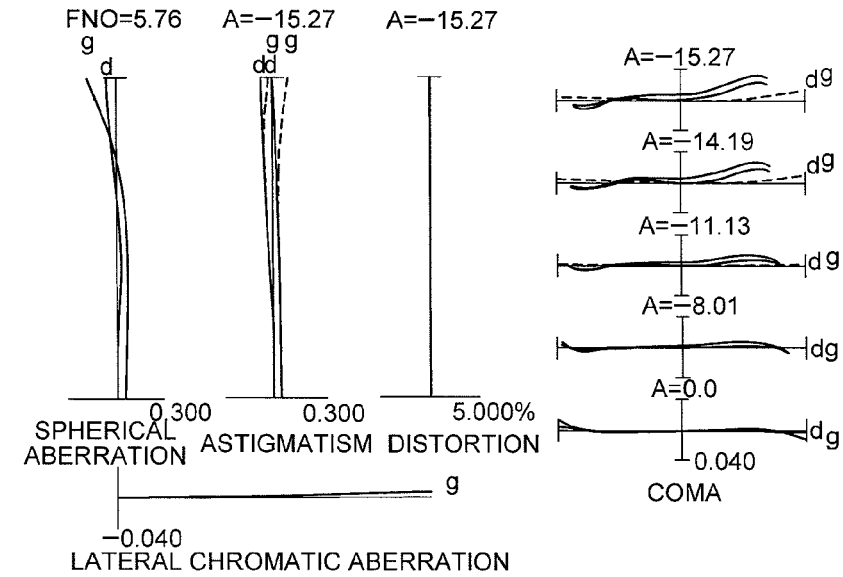
Figure 7A:
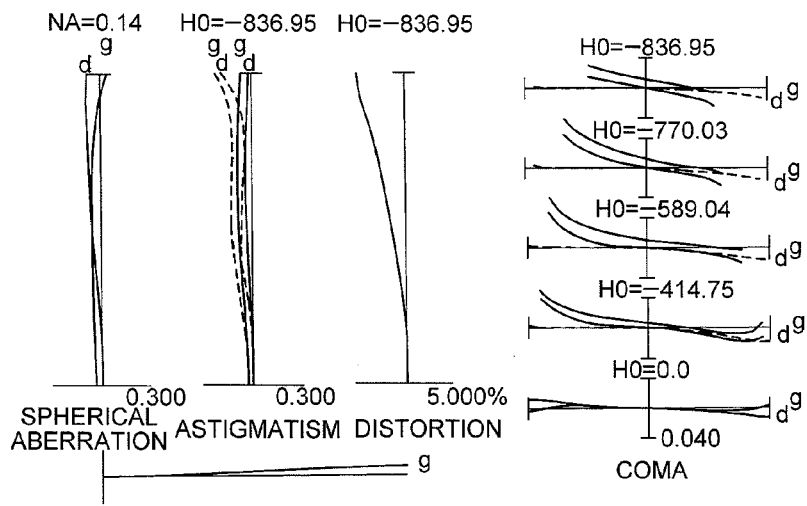
Figure 7B:
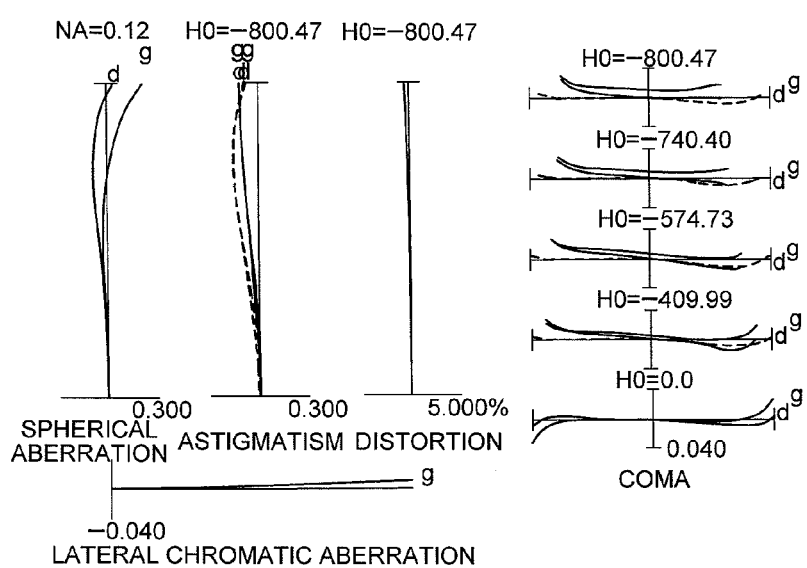
Figure 7C:
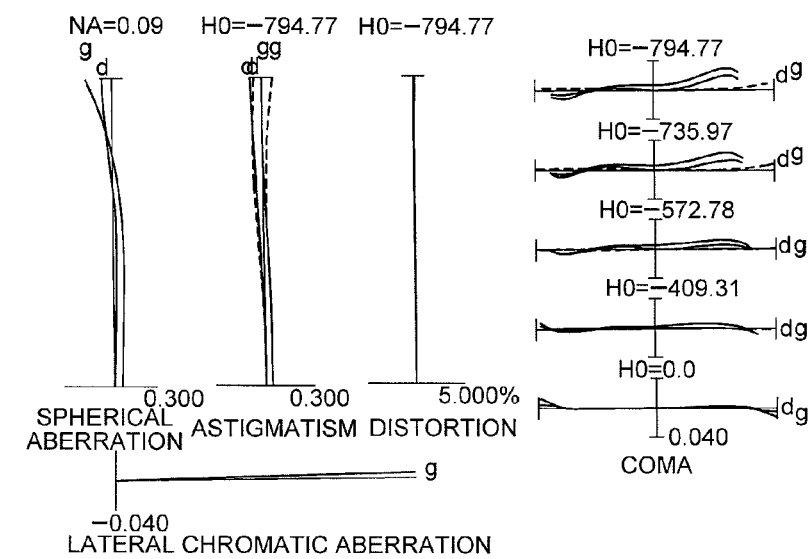
Figure 8A:
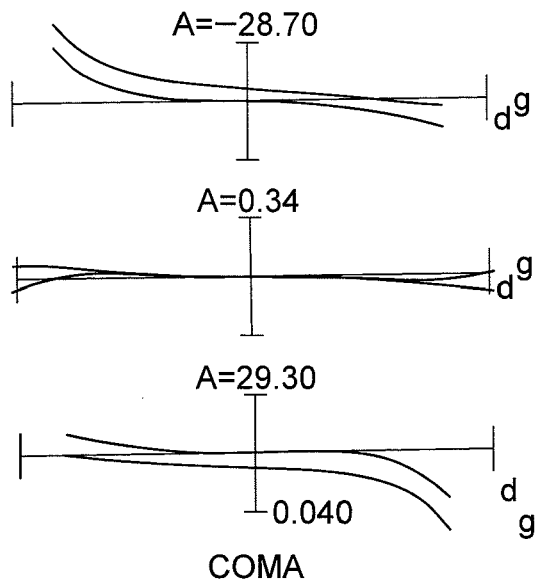
Figure 8B:
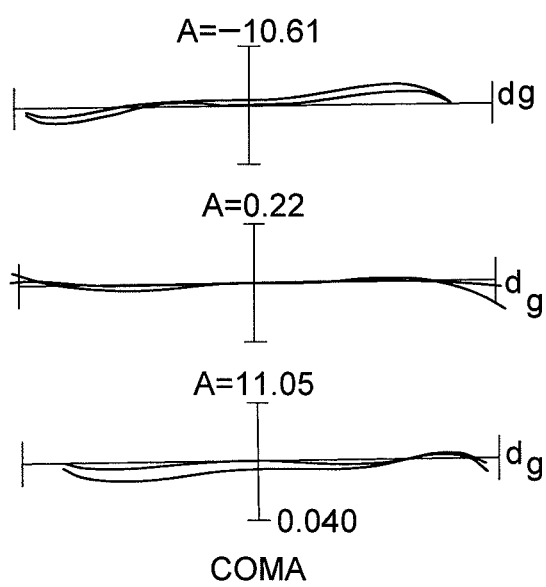

FIGS. 6A, 6B, and 6C are graphs showing various aberrations of the optical system according to Example 2 focusing on infinity, in which FIG. 6A is in a wide-angle end state, FIG. 6B is in an intermediate focal length state, and FIG. 6C is in a telephoto end state. FIGS. 7A, 7B, and 7C are graphs showing various aberrations of the optical system according to Example 2 focusing on a close object (shooting magnification: −0.01), in which FIG. 7A is in the wide-angle end state, FIG. 7B is in the intermediate focal length state, and FIG. 7C is in the telephoto end state. FIGS. 8A, and 8B are graphs showing coma of the optical system according to Example 2 upon shifting a decentering lens group (0.1 mm) focusing on infinity, in which FIG. 8A is in the wide-angle end state, and FIG. 8B is in the telephoto end state.

As is apparent from the respective graphs, the optical system according to Example 2 shows superb optical performance as a result of good corrections to various aberrations in each focal length state from the wide-angle end state through the telephoto end state.

Example 3

FIG. 9 is a sectional view showing a lens configuration of an optical system according to Example 3.

As shown in FIG. 9, the optical system according to Example 3 is composed of, in order from an object side, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side, a negative meniscus lens L11 having a convex surface facing the object side, a negative meniscus lens L12 having a convex surface facing the object side, a positive meniscus lens L13 having a convex surface facing the object side, and a positive meniscus lens L14 having a convex surface facing the object side. The negative meniscus lens L11 disposed to the most object side in the first lens group G1 is an aspherical lens having an aspherical surface formed on the image plane I side surface.

The second lens group G2 is composed of, in order from the object side, a cemented positive lens constructed by a negative meniscus lens L21 having a convex surface facing the object side cemented with a positive meniscus lens L22 having a convex surface facing the object side, a positive meniscus lens L23 having a convex surface facing the object side, and aperture stop S, a cemented positive lens constructed by a double convex positive lens L24 cemented with a negative meniscus lens L25 having a concave surface facing the object side, and a cemented negative lens constructed by a double concave negative lens L26 cemented with a double convex positive lens L27. The negative meniscus lens L21 disposed to the most object side in the second lens group G2 is an aspherical lens having an aspherical surface facing the object side. The positive meniscus lens L23 disposed to the object side of the aperture stop S in the second lens group G2 is an aspherical lens having an aspherical surface formed on the object side. The double convex positive lens L27 disposed to the most image plane I side of the second lens group is an aspherical lens having an aspherical surface formed on the image plane I side.

The aperture stop S disposed in the second lens group G2 is moved to the object side in a body with the second lens group G2 upon zooming from a wide-angle end state W to a telephoto end stat T.

The cemented positive lens constructed by the negative meniscus lens L21 cemented with the positive meniscus lens L22 is a focusing lens group Gf, and with moving the focusing lens group Gf to the image plane I side, focusing from an infinity object to a close object is carried out.

The cemented positive lens constructed by the double convex positive lens L24 cemented with the negative meniscus lens L25 is a decentering lens group Gs, and with moving the decentering lens group Gs in a direction substantially perpendicular to the optical axis, vibration reduction is carried out.

The cemented negative lens constructed by the double concave negative lens L26 cemented with the double convex positive lens is an auxiliary lens group Ga.

The positive meniscus lens L23, which is a lens component, is disposed between the focusing lens group Gf and the decentering lens group Gs.

Various values associated with the optical system according to Example 3 are listed in Table 3.

TABLE 3

[Specifications]
Zoom Ratio: 2.825

|  | W | M | T |
|---|---|---|---|
| f = | 10.30 | 17.30 | 29.10 |
| FNO = | 3.57 | 4.27 | 5.80 |
| 2ω = | 77.45 | 49.72 | 30.58 |
| Y = | 7.962 | 7.962 | 7.962 |
| TL = | 74.59 | 69.93 | 76.27 |
| Bf = | 19.7396 | 28.1183 | 42.2423 |

[Lens Data]

| i | r | d | nd | νd |
|---|---|---|---|---|
| 1 | 18.4021 | 1.30 | 1.85135 | 40.10 |
| 2* | 9.4660 | 5.19 | | |
| 3 | 106.6621 | 1.00 | 1.88300 | 40.76 |
| 4 | 12.4920 | 1.75 | | |
| 5 | 18.3528 | 1.77 | 1.84666 | 23.78 |
| 6 | 28.9480 | 0.65 | | |
| 7 | 17.1399 | 2.08 | 1.80809 | 22.79 |
| 8 | 32.7787 | (d8) | | |
| 9* | 15.0062 | 0.80 | 1.83441 | 37.28 |
| 10 | 9.9310 | 1.70 | 1.74100 | 52.67 |
| 11 | 36.5917 | (d11) | | |
| 12* | 20.2806 | 1.24 | 1.58913 | 61.25 |
| 13 | 519.9944 | 0.80 | | |
| 14 | ∞ | 1.00 | Aperture Stop S | |
| 15 | 33.1718 | 2.09 | 1.61720 | 54.01 |
| 16 | −13.7000 | 1.00 | 1.74077 | 27.78 |
| 17 | −47.2996 | 0.81 | | |
| 18 | ∞ | 1.00 | | |
| 19 | −12.0144 | 0.80 | 1.83400 | 37.16 |
| 20 | 10.7146 | 3.37 | 1.73077 | 40.50 |
| 21* | −14.3627 | (Bf) | | |

[Aspherical Data]

Surface Number: 2

κ = −0.8688
A4 = 2.2426E−04
A6 = −1.1858E−07
A8 = 2.0865E−09
A10 = 0.0000E+00

Surface Number: 9

κ = 1.5382
A4 = −4.3414E−05
A6 = 1.8507E−08
A8 = −3.1873E−08
A10 = 9.2225E−10

Surface Number: 12

κ = 1.0000
A4 = 6.9511E−05
A6 = 8.0932E−07
A8 = −2.7525E−09
A10 = 0.0000E+00

Surface Number: 21

κ = 1.0000
A4 = 7.5377E−05
A6 = 6.6313E−07
A8 = 0.0000E+00
A10 = 0.0000E+00

|  | W | M | T |
|---|---|---|---|

[Variable Distances upon Zooming]

|  | W | M | T |
|---|---|---|---|
| f = | 10.3000 | 17.3001 | 29.1002 |
| d8 = | 22.2705 | 9.2305 | 1.4500 |
| d11 = | 4.2370 | 4.2370 | 4.2370 |
| Bf = | 19.7396 | 28.1183 | 42.2423 |

TABLE 3-continued

[Moving Amount of Focusing Lens Group]

| f = | 10.3000 | 17.3001 | 29.1002 |
|---|---|---|---|
| ΔFx = | 0.29387 | 0.16110 | 0.10384 |

[Variable Distances upon Shooting Magnification = −0.01]

| d0 = | 1008.7799 | 1711.7323 | 2893.5651 |
|---|---|---|---|
| f = | 10.19058 | 17.16189 | 28.88227 |
| d8 = | 22.56436 | 9.39160 | 1.55387 |
| d11 = | 3.94313 | 4.07590 | 4.13316 |
| Bf = | 19.73960 | 28.11827 | 42.24230 |

[Lens Group Data]

| Group | I | Focal Length |
|---|---|---|
| 1 | 1 | −16.6530 |
| 2 | 9 | 19.9329 |

[Values for Conditional Expressions]

fw = 10.3000
ft = 29.0999
ff = 36.2513
fs = 40.0000
fa = −52.4471
d12 = 5.1881
fγw = −0.3513
βG2fw = 3.5011
βG2ft = 3.4637
(1) fa/fs = −1.311
(2) |fw/ff| = 0.284
(3) |fγw| = 0.351
(4) ff/fs = 0.906
(5) (d12)/ft = 0.178
(6) |βG2fw| = 3.501
(7) |βG2ft| = 3.464

Figure 10A:
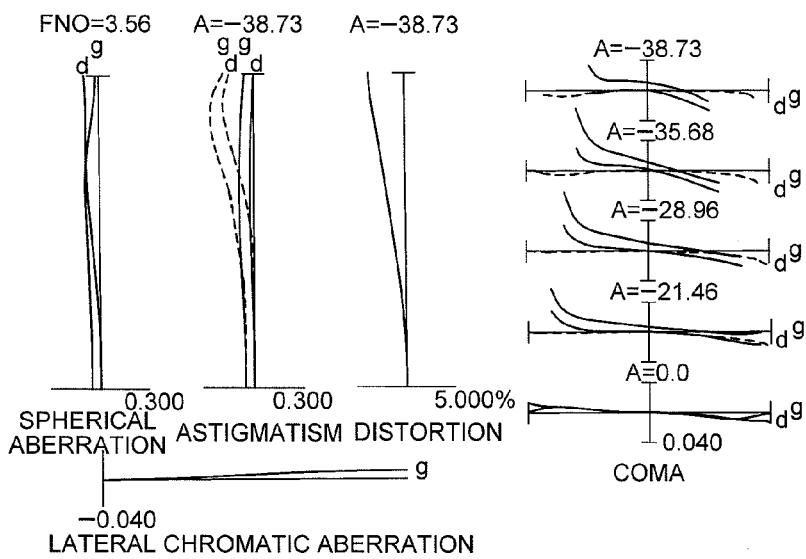
Figure 10B:
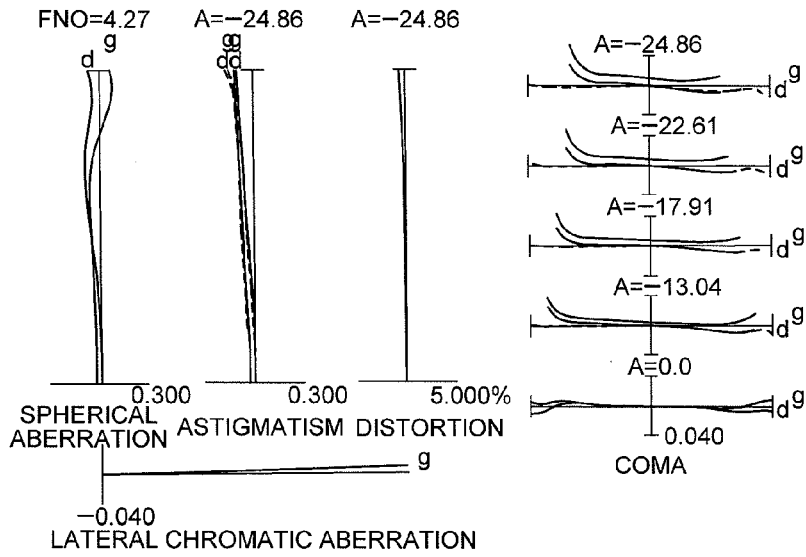
Figure 10C:
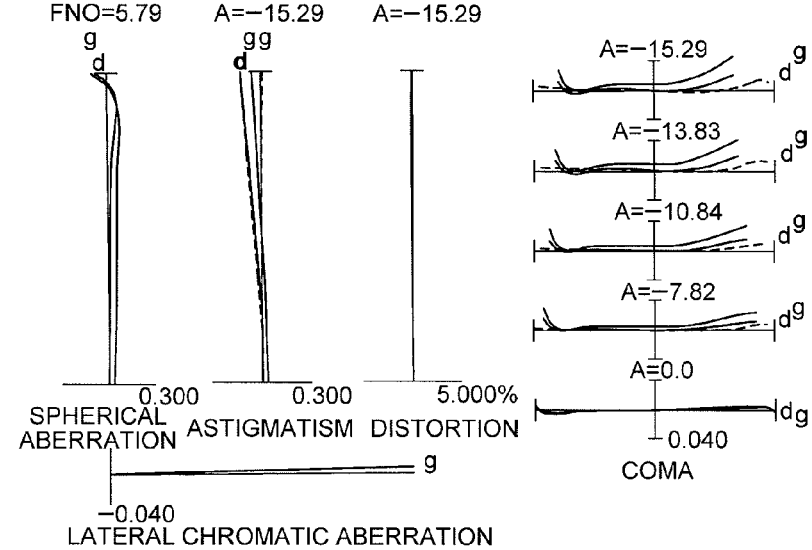
Figure 11A:
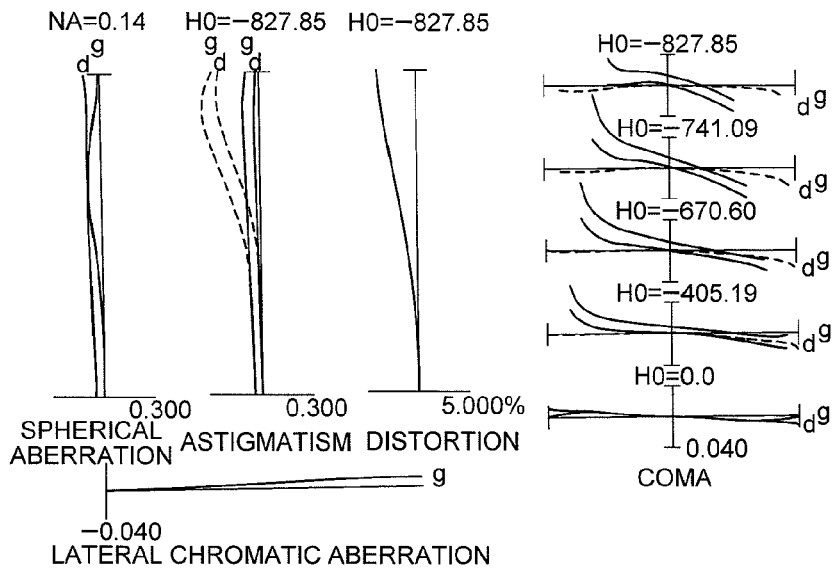
Figure 11B:
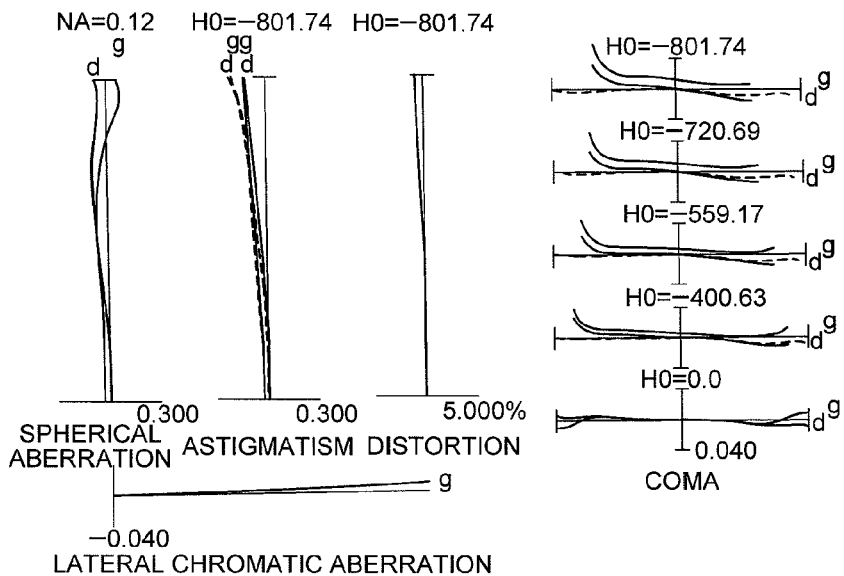
Figure 11C:
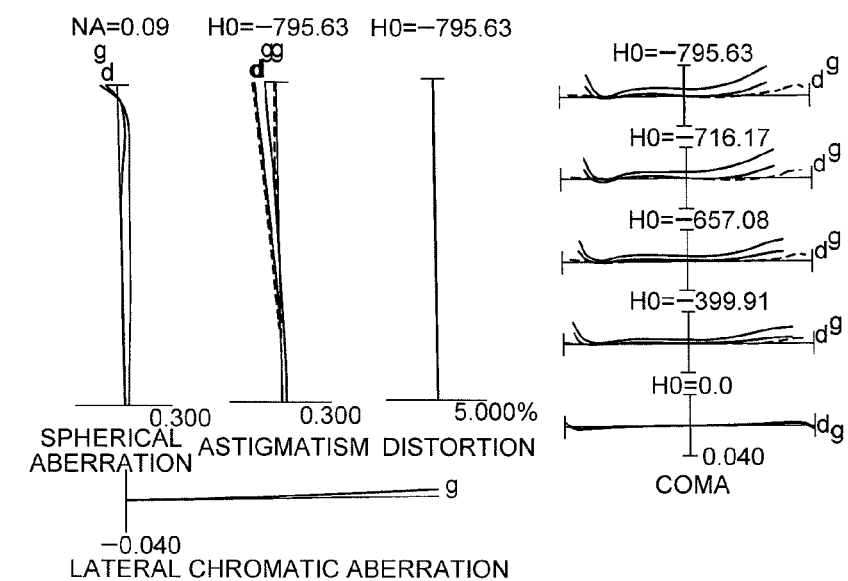
Figure 12A:
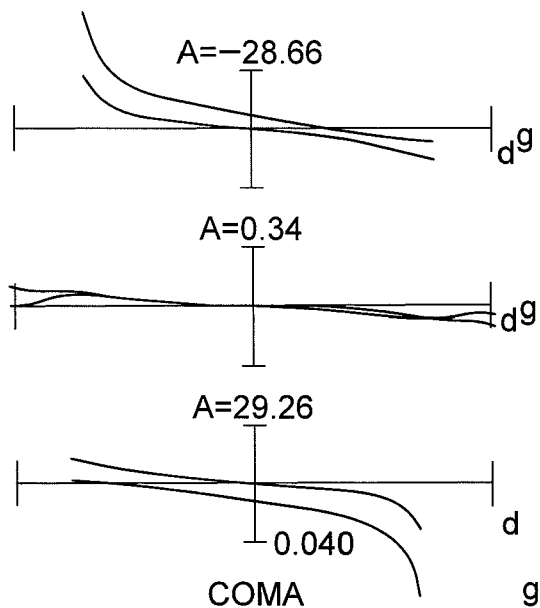
Figure 12B:
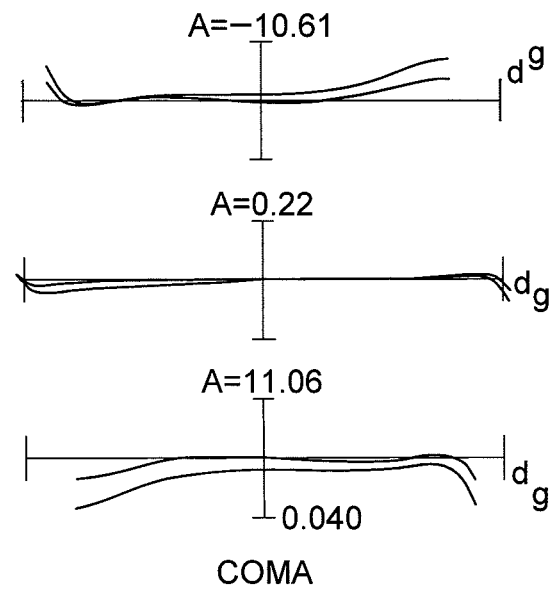

FIGS. 10A, 10B, and 10C are graphs showing various aberrations of the optical system according to Example 3 focusing on infinity, in which FIG. 10A is in a wide-angle end state, FIG. 10B is in an intermediate focal length state, and FIG. 10C is in a telephoto end state. FIGS. 11A, 11B, and 11C are graphs showing various aberrations of the optical system according to Example 3 focusing on a close object (shooting magnification is −0.01), in which FIG. 11A is in the wide-angle end state, FIG. 11B is in the intermediate focal length state, and FIG. 11C is in the telephoto end state. FIGS. 12A, and 12B are graphs showing coma of the optical system according to Example 3 upon shifting a decentering lens group (0.1 mm) focusing on infinity, in which FIG. 12A is in the wide-angle end state, and FIG. 12B is in the telephoto end state.

As is apparent from the respective graphs, the optical system according to Example 3 shows superb optical performance as a result of good corrections to various aberrations in each focal length state from the wide-angle end state through the telephoto end state.

Example 4

Figure 13:
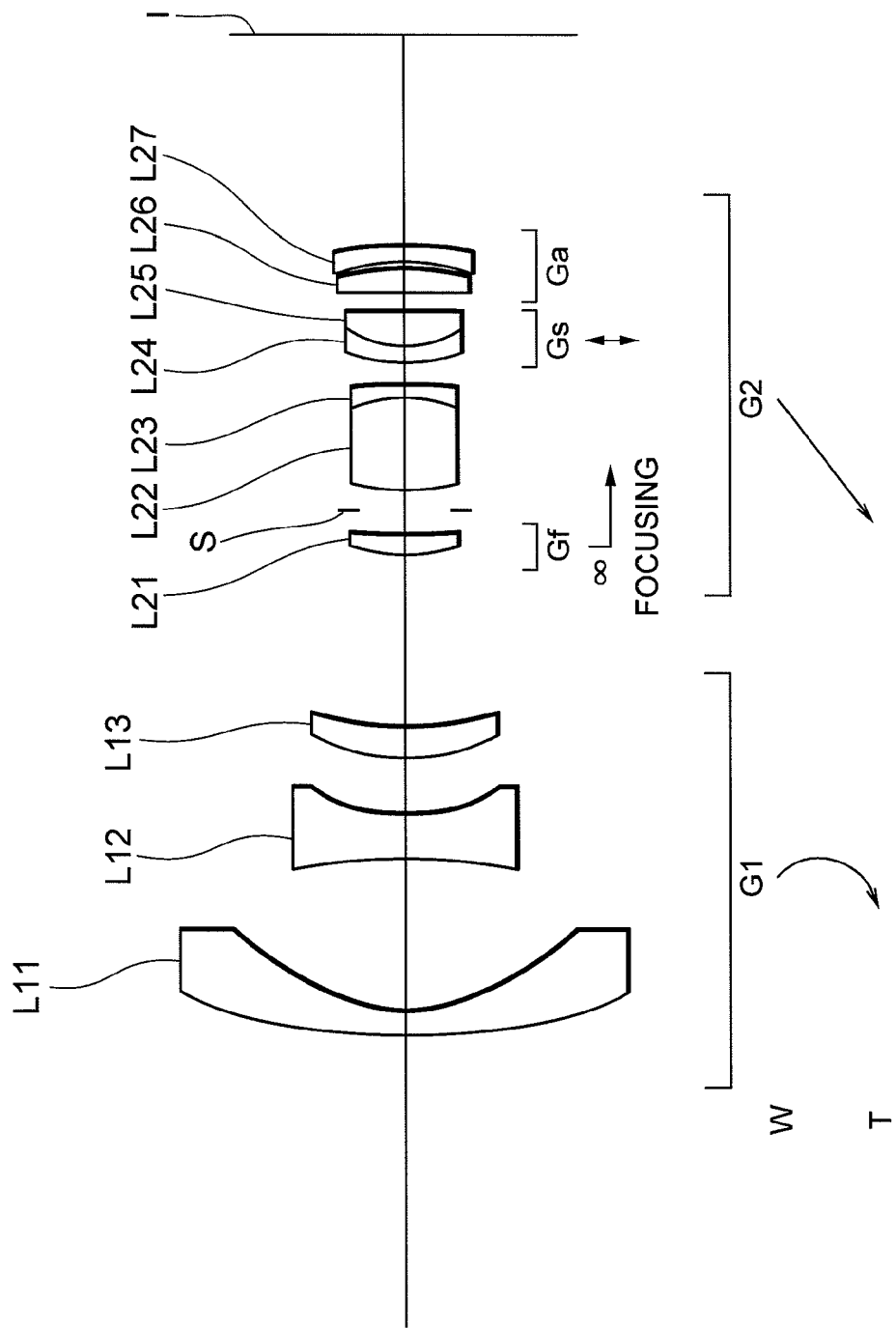
FIG. 13 is a sectional view showing a lens configuration of an optical system according to Example 4.

FIG. 13 is a sectional view showing a lens configuration of an optical system according to Example 4.

As shown in FIG. 13, the optical system according to Example 4 is composed of, in order from an object side, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side, a negative meniscus lens L11 having a convex surface facing the object side, a double concave negative lens L12, and a positive meniscus lens L13 having a convex surface facing the object side. The negative meniscus lens L11 disposed to the most object side in the first lens group G1 is an aspherical lens having aspherical surfaces formed on both sides. The double concave negative lens L12 in the first lens group G1 is an aspherical lens having an aspherical surface formed on the image plane I side.

The second lens group G2 is composed of, in order from the object side along the optical axis, a positive meniscus lens L21 having a convex surface facing the object side, an aperture stop S, a cemented positive lens constructed by a double convex positive lens L22 cemented with a negative meniscus lens L23 having a concave surface facing the object side, a cemented positive lens constructed by a negative meniscus lens L24 having a convex surface facing the object side cemented with a double convex positive lens L25, a positive meniscus lens L26 having a convex surface facing the image plane I side, and a negative meniscus lens L27 having a convex surface facing the image plane I side. The negative meniscus lens L27 disposed to the most image plane I side in the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The positive meniscus lens L21 is a focusing lens group Gf, and with moving the focusing lens group Gf to the image plane I side, focusing from an infinity object to a close object is carried out.

The cemented positive lens constructed by the negative meniscus lens L24 cemented with the double convex positive lens L25 is a decentering lens group Gs, and with moving the decentering lens group Gs in a direction substantially perpendicular to the optical axis, vibration reduction is carried out.

The positive meniscus lens L26 and the negative meniscus lens L27 are an auxiliary lens group Ga having positive refractive power.

The cemented positive lens constructed by the double convex positive lens L22 cemented with the negative meniscus lens L23, which are lens components, are disposed between the focusing lens group Gf and the decentering lens group Gs.

Various values associated with the optical system according to Example 4 are listed in Table 4.

TABLE 4

[Specifications]
Zoom Ratio: 1.828

| | W | M | T |
|---|---|---|---|
| f = | 6.90 | 9.50 | 12.61 |
| FNO = | 3.62 | 4.52 | 5.77 |
| 2ω = | 98.83 | 79.61 | 63.97 |
| Y = | 7.962 | 7.962 | 7.962 |
| TL = | 70.23 | 68.58 | 69.98 |
| Bf = | 14.6644 | 19.2561 | 24.7483 |

[Lens Data]

| i | r | d | nd | vd |
|---|---|---|---|---|
| 1* | 65.6582 | 1.80 | 1.76802 | 49.23 |
| 2* | 11.1606 | 10.60 | | |
| 3 | −41.8065 | 3.20 | 1.76802 | 49.23 |
| 4* | 17.5136 | 3.80 | | |

TABLE 4-continued

| | | | | |
|---|---|---|---|---|
| 5 | 14.4408 | 2.30 | 1.92286 | 20.88 |
| 6 | 23.0940 | (d6) | | |
| 7 | 13.2190 | 1.50 | 1.75500 | 52.32 |
| 8 | 37.9290 | (d8) | | |
| 9 | ∞ | 1.50 | | |
| 10 | 21.6826 | 6.50 | 1.49782 | 82.56 |
| 11 | −9.3713 | 1.00 | 1.88300 | 40.77 |
| 12 | −50.0183 | 1.42 | | |
| 13 | 11.9486 | 1.20 | 1.90366 | 31.31 |
| 14 | 7.9899 | 2.50 | 1.49782 | 82.56 |
| 15 | −409.7597 | 1.25 | | |
| 16 | −5817.7134 | 1.80 | 1.49782 | 82.56 |
| 17 | −17.3100 | 0.40 | | |
| 18 | −13.7854 | 1.20 | 1.76802 | 49.23 |
| 19* | −21.3255 | (Bf) | | |

[Aspherical Data]

Surface Number: 1

κ = 11.2695
A4 = 6.5208E−08
A6 = 4.5111E−09
A8 = 0.0000E+00
A10 = 0.0000E+00

Surface Number: 2

κ = −0.6591
A4 = 0.0000E+00
A6 = 0.0000E+00
A8 = 0.0000E+00
A10 = 0.0000E+00

Surface Number: 4

κ = 2.7380
A4 = 1.5432E−04
A6 = 3.8186E−07
A8 = 0.0000E+00
A10 = 0.0000E+00

Surface Number: 19

κ = −21.6774
A4 = −1.3542E−04
A6 = 5.0739E−06
A8 = −6.2280E−08
A10 = 0.0000E+00

| | W | M | T |
|---|---|---|---|
| [Variable Distances upon Zooming] | | | |
| f = | 6.9000 | 9.5000 | 12.6100 |
| d6 = | 11.9986 | 5.7487 | 1.6581 |
| d8 = | 1.5974 | 1.5974 | 1.5974 |
| Bf = | 14.6644 | 19.2561 | 24.7483 |
| [Moving Amount of Focusing Lens Group] | | | |
| f = | 6.9000 | 9.5000 | 12.6100 |
| ΔFx = | 0.14189 | 0.09426 | 0.07147 |
| [Variable Distances upon Shooting Magnification = −0.01] | | | |
| d0 = | 675.3095 | 936.2195 | 1247.7556 |
| f = | 6.85007 | 9.44449 | 12.54231 |
| d6 = | 12.14042 | 5.84296 | 1.72955 |
| d8 = | 1.45551 | 1.50314 | 1.52593 |
| Bf = | 14.66442 | 19.25605 | 24.74834 |

[Lens Group Data]

| Group | I | Focal Length |
|---|---|---|
| 1 | 1 | −9.4458 |
| 2 | 7 | 16.6813 |

[Values for Conditional Expressions]

fw = 6.9000
ft = 12.6100
ff = 26.1912
fs = 35.2637
fa = 101.5495
d12 = 10.6000
fγw = −0.4872
βG2fw = −3.3912
βG2ft = 10.0072
(1) fa/fs = 2.880
(2) |fw/ff| = 0.263
(3) |fγw| = 0.487
(4) ff/fs = 0.743
(5) (d12)/ft = 0.841
(6) |βG2fw| = 3.391
(7) |βG2ft| = 10.007

Figure 14A:
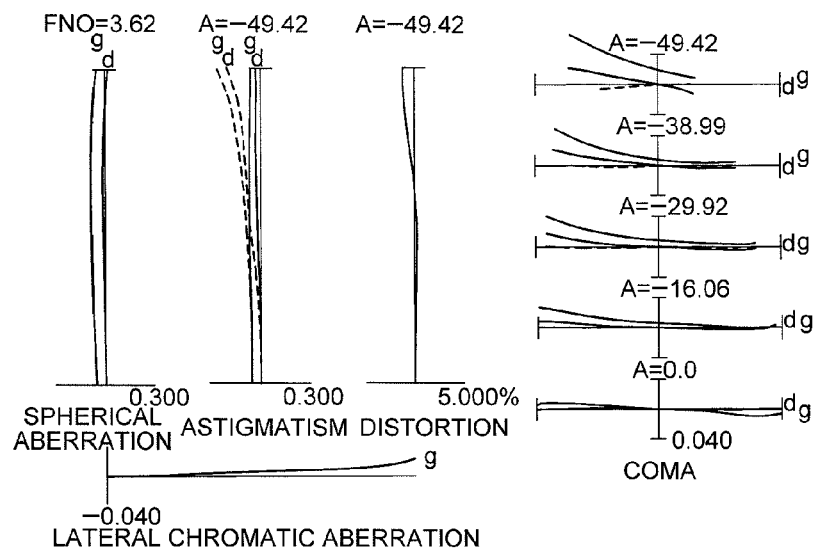
Figure 14B:
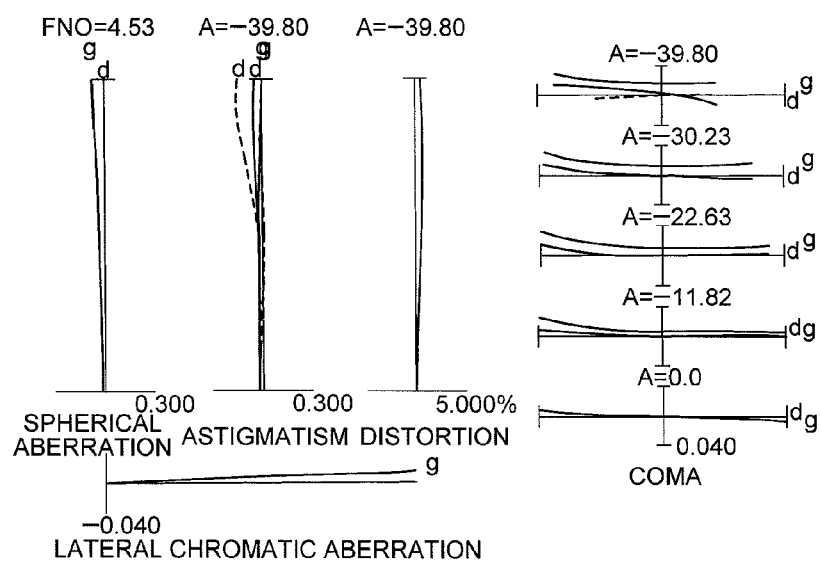
Figure 14C:
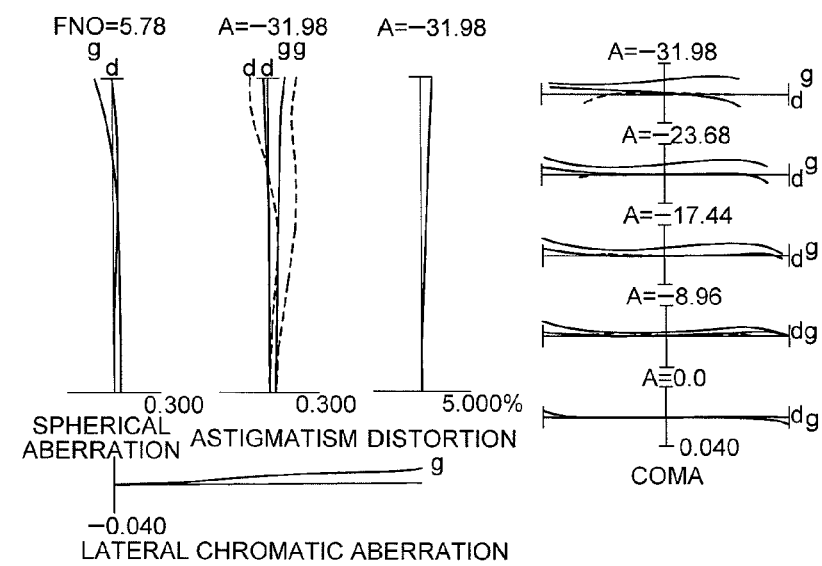
Figure 15A:
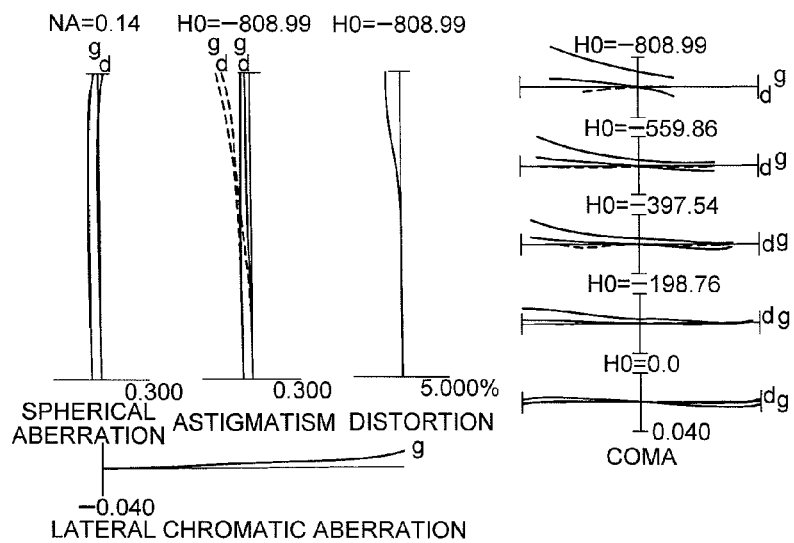
Figure 15B:
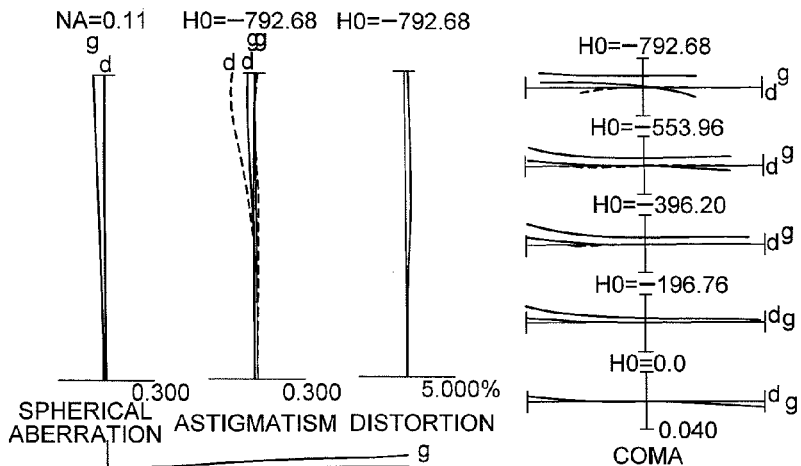
Figure 15C:
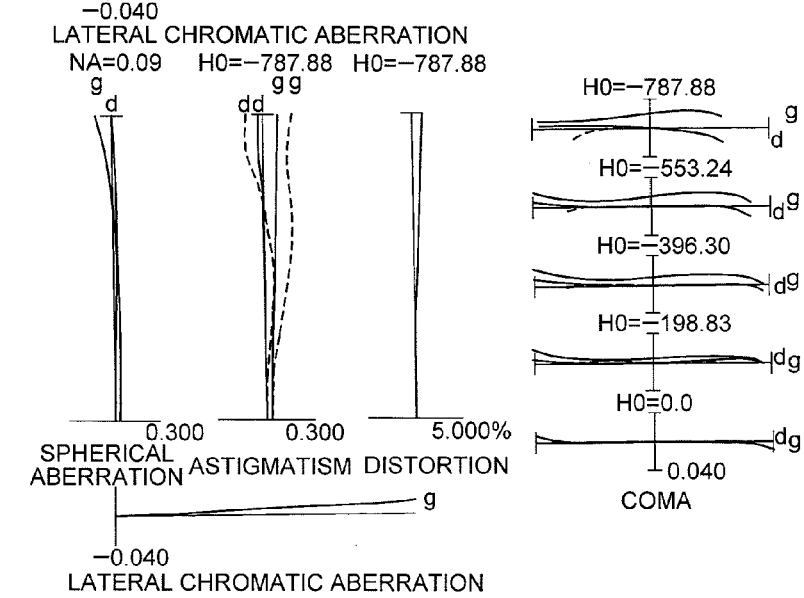
Figure 16A:
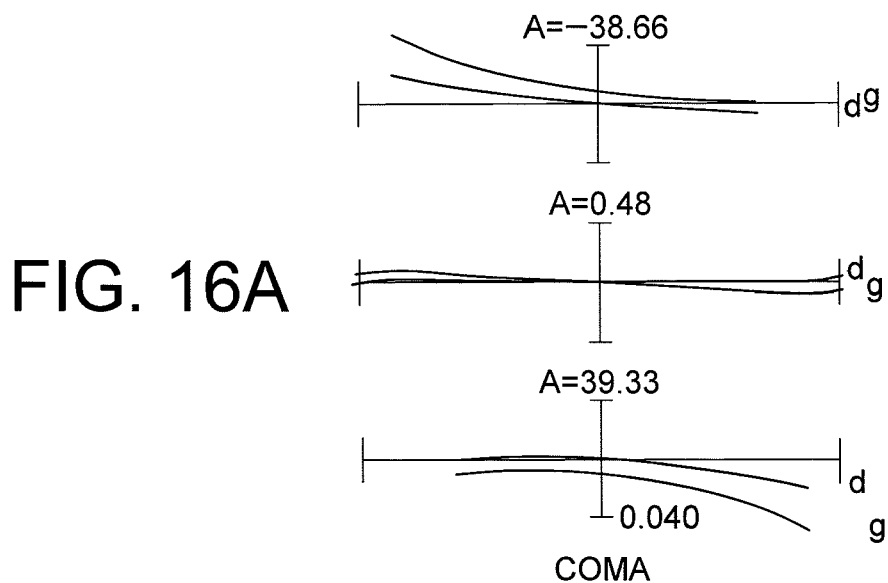
Figure 16B:
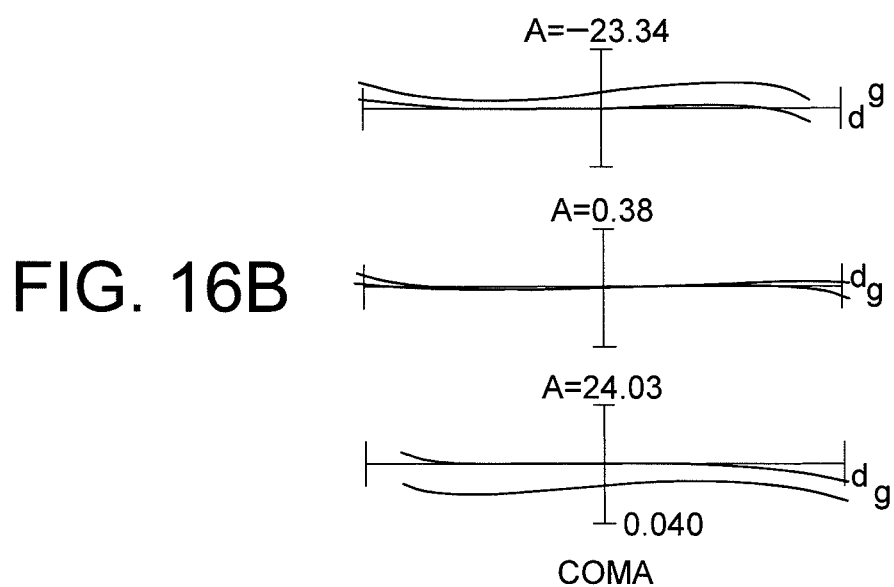

FIGS. 14A, 14B, and 14C are graphs showing various aberrations of the optical system according to Example 4 focusing on infinity, in which FIG. 14A is in a wide-angle end state, FIG. 14B is in an intermediate focal length state, and FIG. 14C is in a telephoto end state. FIGS. 15A, 15B, and 15C are graphs showing various aberrations of the optical system according to Example 4 focusing on a close object (shooting magnification is −0.01), in which FIG. 15A is in the wide-angle end state, FIG. 15B is in the intermediate focal length state, and FIG. 15C is in the telephoto end state. FIGS. 16A, and 16B are graphs showing coma of the optical system according to Example 4 upon shifting a decentering lens group (0.1 mm) focusing on infinity, in which FIG. 16A is in the wide-angle end state, and FIG. 16B is in the telephoto end state.

As is apparent from the respective graphs, the optical system according to Example 4 shows superb optical performance as a result of good corrections to various aberrations in each focal length state from the wide-angle end state through the telephoto end state.

Example 5

Figure 17:
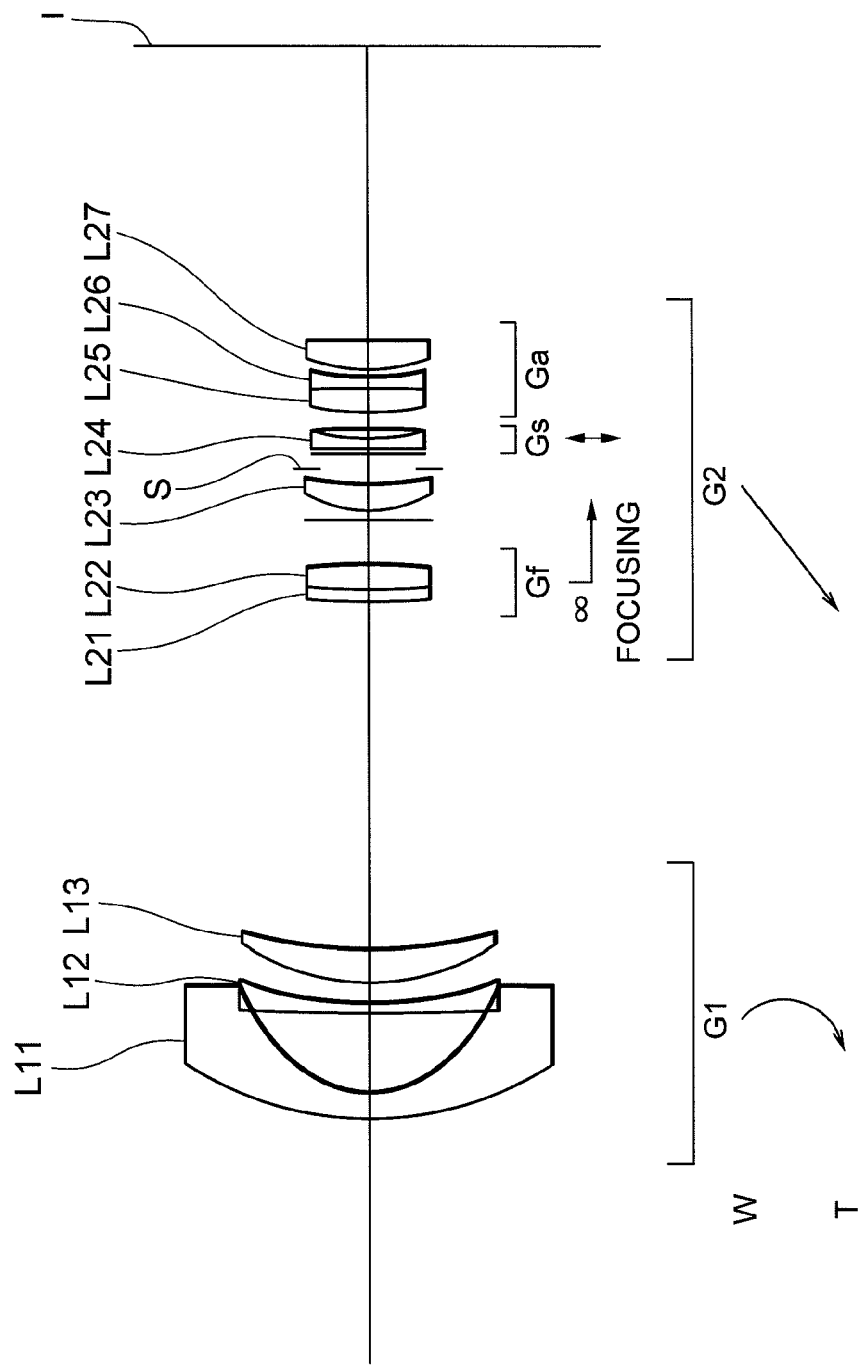
FIG. 17 is a sectional view showing a lens configuration of an optical system according to Example 5.

FIG. 17 is a sectional view showing a lens configuration of an optical system according to Example 5.

As shown in FIG. 17, the optical system according to Example 5 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a negative meniscus lens L12 having a convex surface facing the object side, and a positive meniscus lens L13 having a convex surface facing the object side. The negative meniscus lens L11 disposed to the most object side in the first lens group G1 is an aspherical lens having an aspherical surface formed on an image plane I side.

The second lens group G2 is composed of, in order from the object side along the optical axis, a cemented positive lens constructed by a negative meniscus lens L21 having a convex surface facing the object side cemented with a double convex positive lens L22, a positive meniscus lens L23 having a convex surface facing the object side, an aperture stop S, a double concave negative lens L24, a cemented negative lens constructed by a double convex positive lens L25 cemented with a double concave negative lens L26, and a double convex positive lens L27. The double concave negative lens L24 disposed in the second lens group G2 is an aspherical lens having an aspherical surface formed on the image plane I side.

The double concave negative lens L27 disposed to the most image plane I side of the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The cemented positive lens constructed by the negative meniscus lens L21 cemented with the double convex positive lens L22 is a focusing lens group Gf, and with moving the focusing lens group Gf to the image plane I side, focusing from an infinity object to a close object is carried out.

The double concave negative lens L24 is a decentering lens group Gs, and with moving the decentering lens group Gs in a direction substantially perpendicular to the optical axis, vibration reduction is carried out.

The cemented negative lens constructed by the double convex positive lens L25 cemented with the double concave negative lens L26, and the double convex positive lens L27 are an auxiliary lens group Ga having positive refractive power.

The positive meniscus lens L23, which is a lens component, is disposed between the focusing lens group Gf and the decentering lens group Gs.

Various values associated with the optical system according to Example 5 are listed in Table 5.

TABLE 5

[Specifications]
Zoom Ratio: 2.825

|  | W | M | T |
|---|---|---|---|
| f = | 10.30 | 18.75 | 29.10 |
| FNO = | 3.64 | 4.59 | 5.86 |
| 2ω = | 78.83 | 46.51 | 30.69 |
| Y = | 7.962 | 7.962 | 7.962 |
| TL = | 73.78 | 67.23 | 71.78 |
| Bf = | 20.0062 | 29.3544 | 40.8045 |

[Lens Data]

| i | r | d | nd | νd |
|---|---|---|---|---|
| 1 | 25.0000 | 1.80 | 1.77377 | 47.17 |
| 2* | 8.2000 | 5.44 | | |
| 3 | 195.9606 | 0.80 | 1.75500 | 52.32 |
| 4 | 27.4972 | 1.32 | | |
| 5 | 16.4792 | 2.39 | 1.84666 | 23.78 |
| 6 | 33.0474 | (d6) | | |
| 7 | 48.1225 | 0.80 | 1.80810 | 22.76 |
| 8 | 29.9061 | 1.89 | 1.65160 | 58.55 |
| 9 | −48.2389 | (d9) | | |
| 10 | ∞ | 0.67 | | |
| 11 | 9.6847 | 1.93 | 1.60300 | 65.44 |
| 12 | 26.0017 | 1.00 | | |
| 13 | ∞ | 1.10 | Aperture Stop S | |
| 14 | ∞ | 0.20 | | |
| 15 | −34215.1520 | 0.80 | 1.82080 | 42.71 |
| 16* | 16.7358 | 0.61 | | |
| 17 | ∞ | 1.15 | | |
| 18 | 20.3058 | 1.72 | 1.49700 | 81.54 |
| 19 | −90.6802 | 0.80 | 1.83400 | 37.16 |
| 20 | 17.5527 | 0.44 | | |
| 21 | 12.3817 | 2.16 | 1.66910 | 55.42 |
| 22* | −74.1839 | (Bf) | | |

[Aspherical Data]

Surface Number: 2

$\kappa = 0.6129$
$A4 = 1.9233E{-}05$

TABLE 5-continued $A6 = 1.4470E{-}07$
$A8 = 1.3914E{-}09$
$A10 = 1.5950E{-}12$

Surface Number: 16

$\kappa = 0.1365$
$A4 = -3.4023E{-}05$
$A6 = 1.6026E{-}06$
$A8 = -2.1064E{-}07$
$A10 = 7.1553E{-}09$ Surface Number: 22

$\kappa = -8.5088$
$A4 = 2.4559E{-}04$
$A6 = 2.7667E{-}06$
$A8 = -3.1696E{-}08$
$A10 = 4.6513E{-}10$

|  | W | M | T |
|---|---|---|---|

[Variable Distances upon Zooming]

| f = | 10.3000 | 18.7500 | 29.1000 |
|---|---|---|---|
| d6 = | 23.7984 | 7.8948 | 1.0000 |
| d9 = | 6.9185 | 6.9185 | 6.9185 |
| Bf = | 20.0062 | 29.3544 | 40.8045 |

[Moving Amount of Focusing Lens Group]

| f = | 10.3000 | 18.7500 | 29.1000 |
|---|---|---|---|
| ΔFx = | 4.45572 | 1.20699 | 0.57516 |

[Variable Distances upon Shooting Magnification = −0.01]

| d0 = | 880.7722 | 1768.0822 | 2809.2484 |
|---|---|---|---|
| f = | 8.91478 | 17.71087 | 28.02997 |
| d6 = | 37.47672 | 18.32442 | 10.79778 |
| d9 = | 2.46278 | 5.71151 | 6.34334 |
| Bf = | 26.97504 | 36.32324 | 47.77340 |

[Lens Group Data]

| Group | I | Focal Length |
|---|---|---|
| 1 | 1 | −18.1260 |
| 2 | 7 | 20.0528 |

[Values for Conditional Expressions]

fw = 10.3000
ft = 29.1000
ff = 40.2798
fs = −20.3795
fa = 27.6231
d1 − 2 = 5.4400
fγw = −0.2994
βG2fw = −3.7065
βG2ft = 3.3760
(1) fa/fs = −1.355
(2) |fw/ff| = 0.256
(3) |fγw| = 0.299
(4) ff/fs = −1.976
(5) (d12)/ft = 0.187
(6) |βG2fw| = 3.707
(7) |βG2ft| = 3.376

Figure 18A:
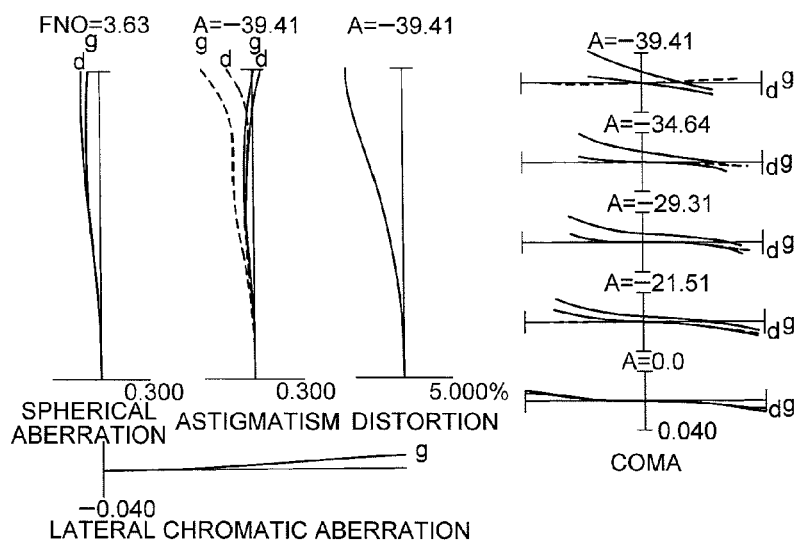
Figure 18B:
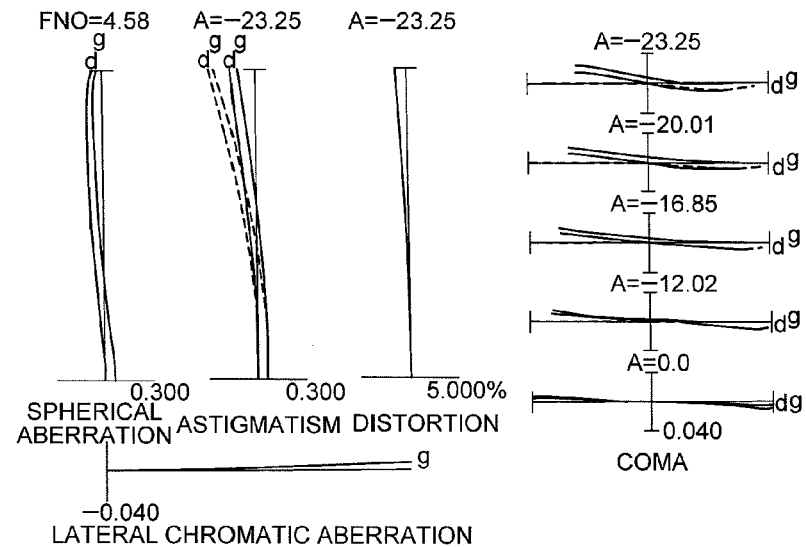
Figure 18C:
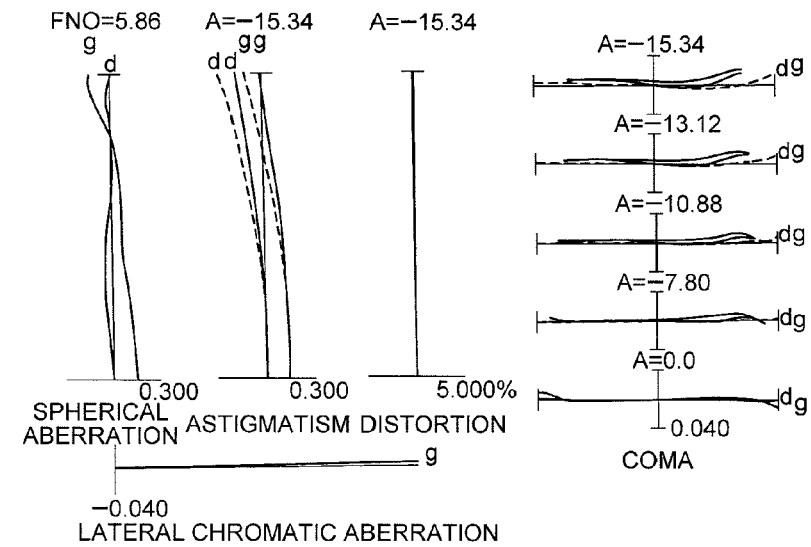
Figure 19A:
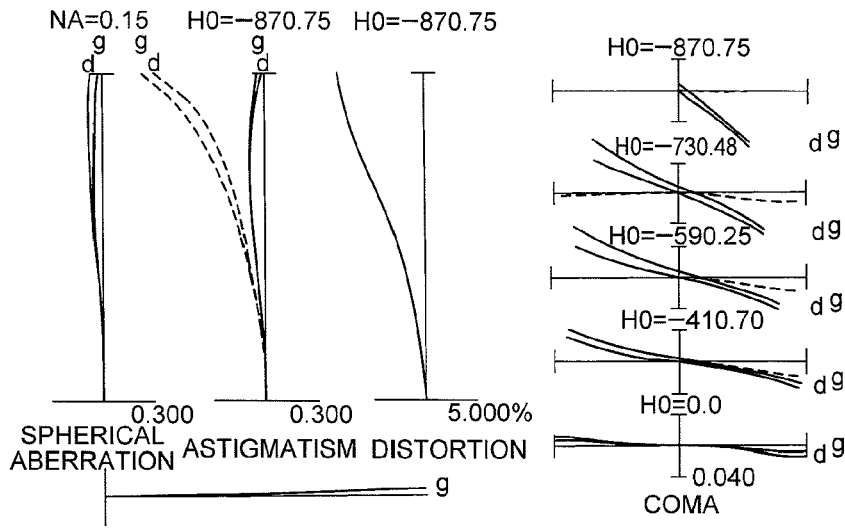
Figure 19B:
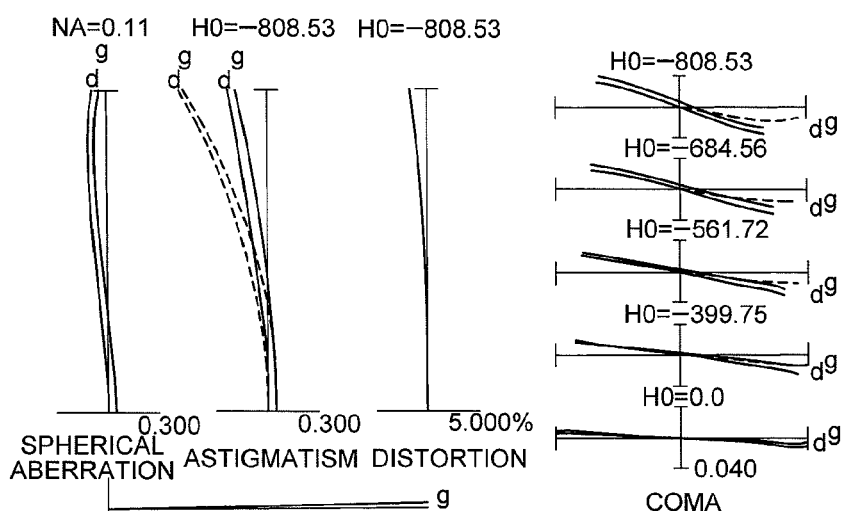
Figure 19C:
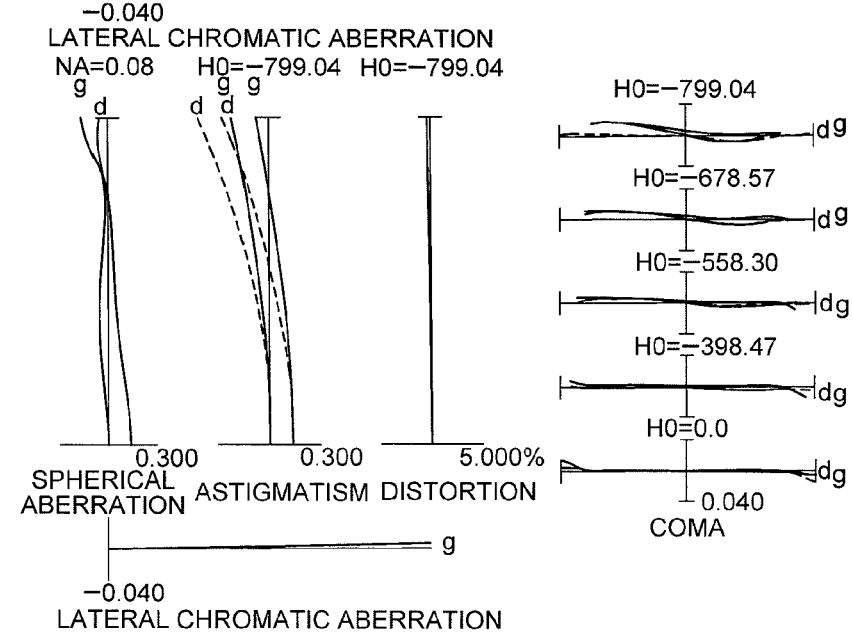
Figure 20A:
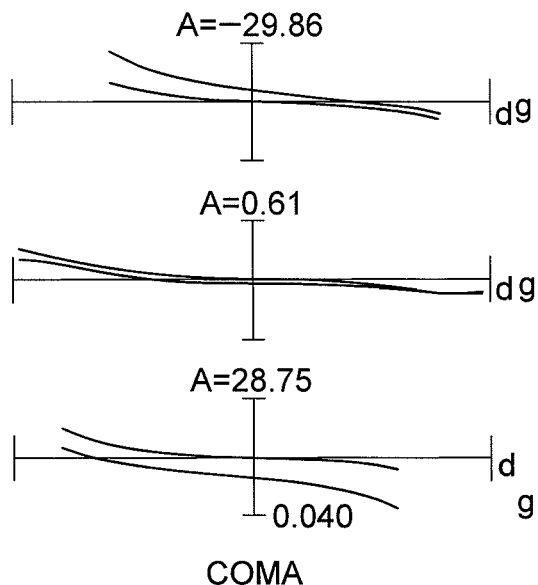
Figure 20B:
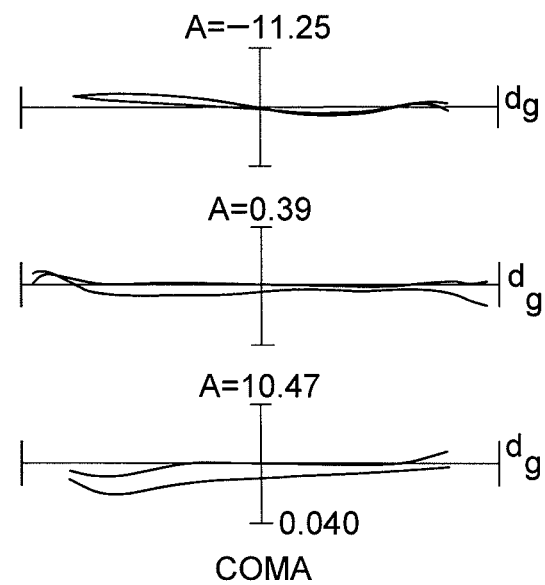

FIGS. 18A, 18B, and 18C are graphs showing various aberrations of the optical system according to Example 5 focusing on infinity, in which FIG. 18A is in a wide-angle end state, FIG. 18B is in an intermediate focal length state, and FIG. 18C is in a telephoto end state. FIGS. 19A, 19B, and 19C are graphs showing various aberrations of the optical system according to Example 5 focusing on a close object (shooting magnification is −0.01), in which FIG. 19A is in the wide-angle end state, FIG. 19B is in the intermediate focal length state, and FIG. 19C is in the telephoto end state. FIGS. 20A, and 20B are graphs showing coma of the optical system according to Example 5 upon shifting a decentering lens group (0.1 mm) focusing on infinity, in which FIG. 20A is in the wide-angle end state, and FIG. 20B is in the telephoto end state.

As is apparent from the respective graphs, the optical system according to Example 5 shows superb optical performance as a result of good corrections to various aberrations in each focal length state from the wide-angle end state through the telephoto end state.

Example 6

Figure 21:
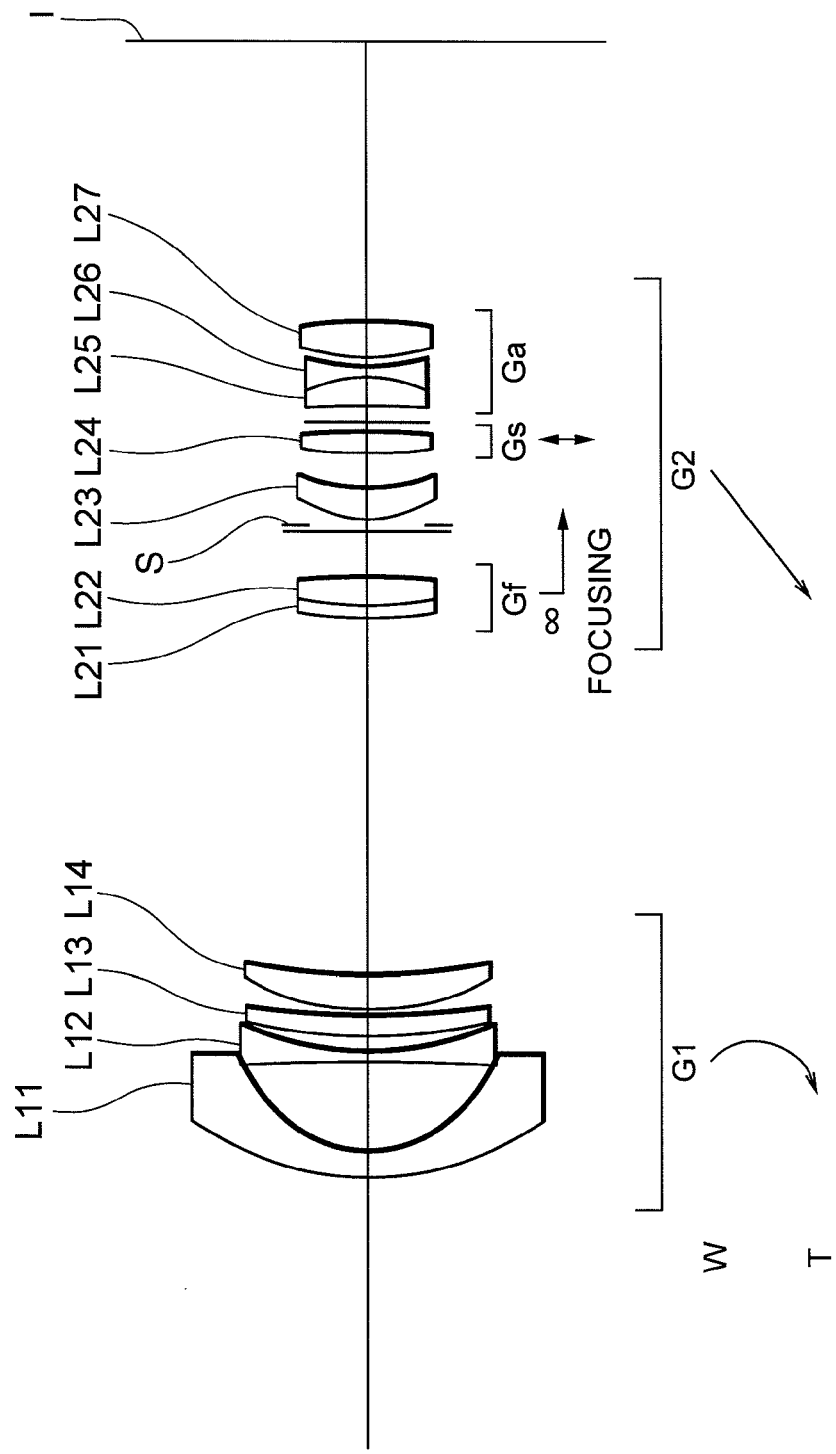
FIG. 21 is a sectional view showing a lens configuration of an optical system according to Example 6.

FIG. 21 is a sectional view showing a lens configuration of an optical system according to Example 6.

As shown in FIG. 21, the optical system according to Example 6 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a double concave negative lens L12, a positive meniscus lens L13 having a convex surface facing the object side, and a positive meniscus lens L14 having a convex surface facing the object side. The negative meniscus lens L11 disposed to the most object side in the first lens group G1 is an aspherical lens having an aspherical surface facing the image plane I side.

The second lens group G2 is composed of, in order from the object side along the optical axis, a cemented positive lens constructed by a negative meniscus lens L21 having a convex surface facing the object side cemented with a double convex positive lens L22, an aperture stop S, a positive meniscus lens L23 having a convex surface facing the object side, a positive meniscus lens L24 having a convex surface facing the object side, a cemented negative lens constructed by a positive meniscus lens L25 having a concave surface facing the object side cemented with a double concave negative lens L26, and a double convex positive lens L27. The positive meniscus lens L24 in the second lens group G2 is an aspherical lens having an aspherical surface formed on the image plane I side. The double convex positive lens L27 disposed to the most image plane I side in the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The cemented positive lens constructed by the negative meniscus lens L21 cemented with the double convex positive lens L22 is a focusing lens group Gf, and with moving the focusing lens group Gf to the image plane I side, focusing from an infinity object to a close object is carried out.

The positive meniscus lens L24 is a decentering lens group Gs, and with moving the decentering lens group Gs in a direction substantially perpendicular to the optical axis, vibration reduction is carried out.

The cemented negative lens constructed by the positive meniscus lens L25 cemented with the double concave negative lens L26, and the double convex positive lens L27 are an auxiliary lens group Ga having negative refractive power.

The positive meniscus lens L23, which is a lens component, is disposed between the focusing lens group Gf and the decentering lens group Gs.

Various values associated with the optical system according to Example 6 are listed in Table 6.

TABLE 6

[Specifications]
Zoom Ratio: 2.825

|  | W | M | T |
|---|---|---|---|
| f = | 10.30 | 18.75 | 29.10 |
| FNO = | 3.64 | 4.57 | 5.86 |
| 2ω = | 78.82 | 46.27 | 30.58 |
| Y = | 7.962 | 7.962 | 7.962 |
| TL = | 75.78 | 69.22 | 73.78 |
| Bf = | 18.4425 | 27.8042 | 39.2710 |

[Lens Data]

| i | r | d | nd | νd |
|---|---|---|---|---|
| 1 | 21.5900 | 1.80 | 1.77377 | 47.17 |
| 2* | 8.3834 | 5.81 | | |
| 3 | −330.2204 | 0.80 | 1.75500 | 52.32 |
| 4 | 20.4287 | 0.90 | | |
| 5 | 34.6426 | 1.58 | 1.69895 | 30.13 |
| 6 | 56.8065 | 0.20 | | |
| 7 | 17.3398 | 2.42 | 1.80518 | 25.42 |
| 8 | 40.5926 | (d8) | | |
| 9 | 38.9358 | 0.80 | 1.84666 | 23.78 |
| 10 | 20.3696 | 2.02 | 1.64000 | 60.08 |
| 11 | −52.1553 | (d11) | | |
| 12 | ∞ | 0.40 | | |
| 13 | ∞ | 0.40 | Aperture Stop S | |
| 14 | 8.7558 | 2.14 | 1.60300 | 65.44 |
| 15 | 11.3294 | 2.22 | | |
| 16 | 25.7295 | 1.53 | 1.77377 | 47.17 |
| 17* | 836.1941 | 0.55 | | |
| 18 | ∞ | 1.15 | | |
| 19 | −63.5509 | 1.90 | 1.49700 | 81.54 |
| 20 | −10.3135 | 0.80 | 1.83481 | 42.71 |
| 21 | 12.9668 | 0.50 | | |
| 22 | 13.3652 | 2.59 | 1.66910 | 55.42 |
| 23* | −20.7258 | (Bf) | | |

[Aspherical Data]

Surface Number: 2

$\kappa = 0.6895$
$A4 = 2.9268E{-}06$
$A6 = 5.0186E{-}08$
$A8 = 2.0720E{-}09$
$A10 = -2.1936E{-}11$ Surface Number: 17

$\kappa = 11.0000$
$A4 = 1.1167E{-}05$
$A6 = 1.2804E{-}06$
$A8 = -9.7386E{-}08$
$A10 = 2.7299E{-}09$ Surface Number: 23

$\kappa = 3.1942$
$A4 = 1.5565E{-}04$
$A6 = 1.5752E{-}06$
$A8 = 1.9610E{-}08$
$A10 = 9.0671E{-}11$

|  | W | M | T |
|---|---|---|---|
| [Variable Distances upon Zooming] | | | |
| f = | 10.3000 | 18.7500 | 29.1000 |
| d8 = | 23.8288 | 7.9040 | 1.0000 |
| d11 = | 3.0141 | 3.0141 | 3.0141 |
| Bf = | 18.4425 | 27.8042 | 39.2710 |
| [Moving Amount of Focusing Lens Group] | | | |
| f = | 10.3000 | 18.7500 | 29.1000 |
| ΔFx = | 0.33741 | 0.17897 | 0.12482 |

TABLE 6-continued

[Variable Distances upon Shooting Magnification = −0.01]

| d0 = | 887.6920 | 1768.8032 | 2809.1446 |
|---|---|---|---|
| f = | 10.18868 | 18.59343 | 28.86569 |
| d8 = | 24.16620 | 8.08298 | 1.12481 |
| d11 = | 2.67669 | 2.83513 | 2.88928 |
| Bf = | 18.44270 | 27.80445 | 39.27122 |

[Lens Group Data]

| Group | I | Focal Length |
|---|---|---|
| 1 | 1 | −18.1250 |
| 2 | 9 | 20.0807 |

[Values for Conditional Expressions]

fw = 10.3000
ft = 29.1000
ff = 42.2410
fs = 34.2797
fa = −65.0250
d12 = 5.8071
fγw = −0.3059
βG2fw = −4.3491
βG2ft = 3.2206
(1) fa/fs = −1.897
(2) |fw/ff| = 0.244
(3) |fγw| = 0.306
(4) ff/fs = 1.232
(5) (d12)/ft = 0.200
(6) |βG2fw| = 4.349
(7) |βG2ft| = 3.221

Figure 22A:
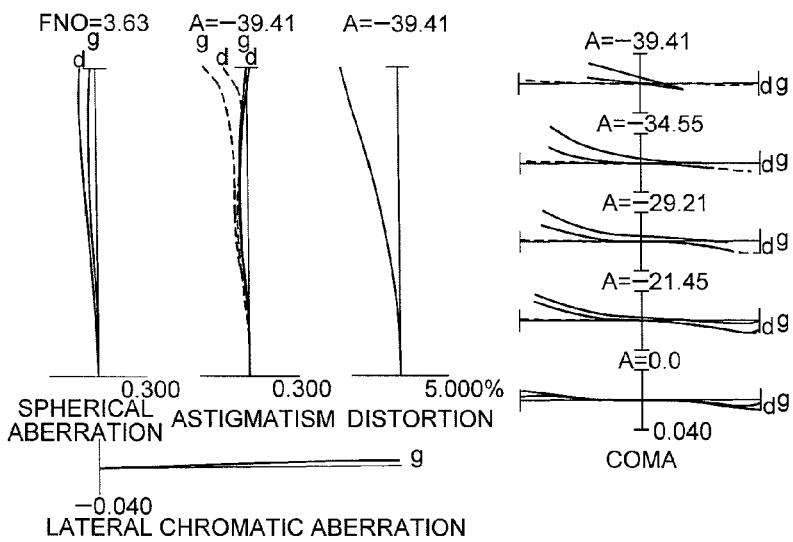
Figure 22B:
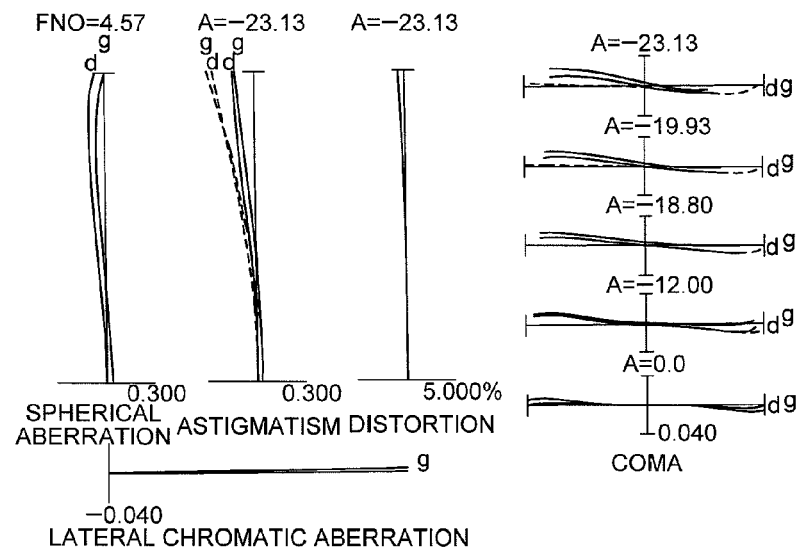
Figure 22C:
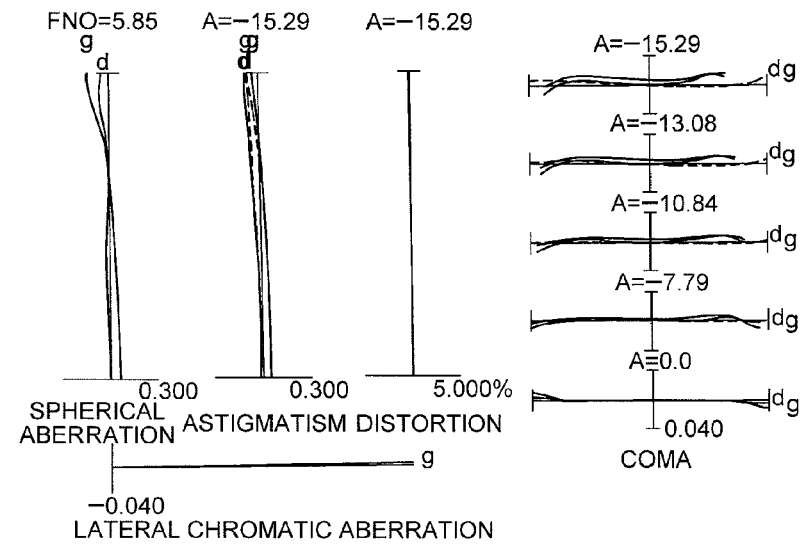
Figure 23A:
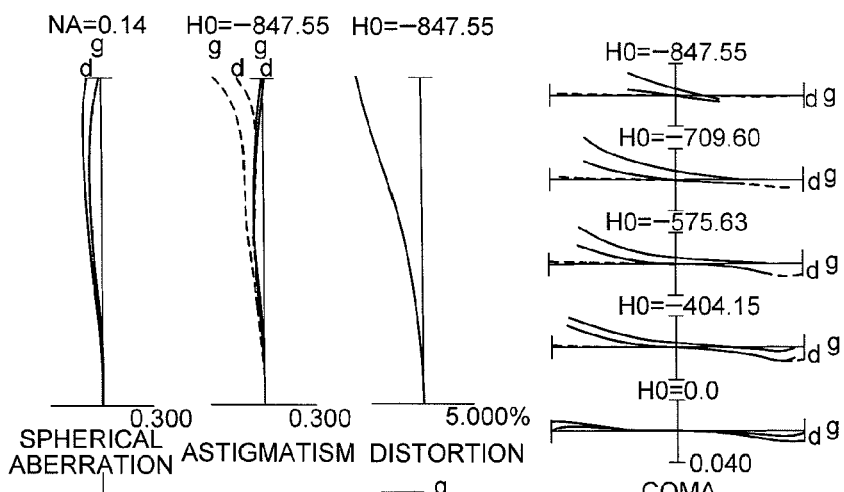
Figure 23B:
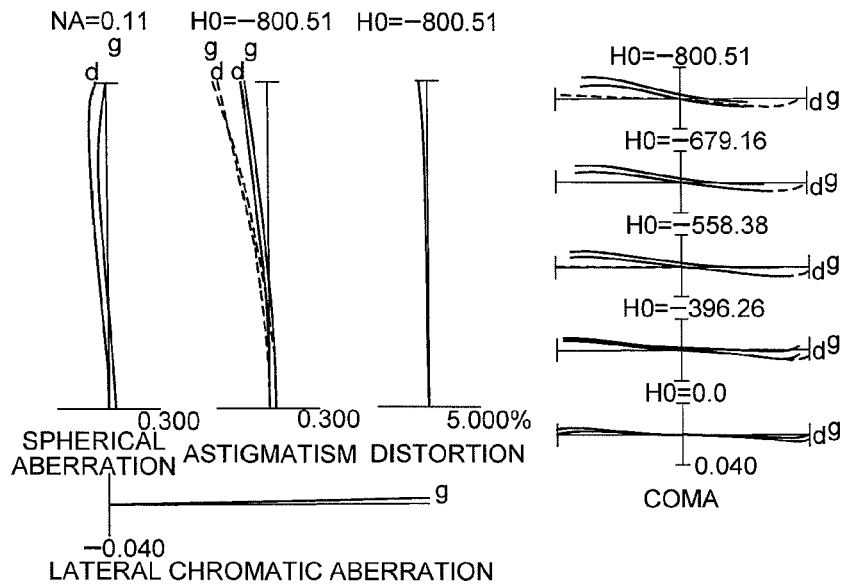
Figure 23C:
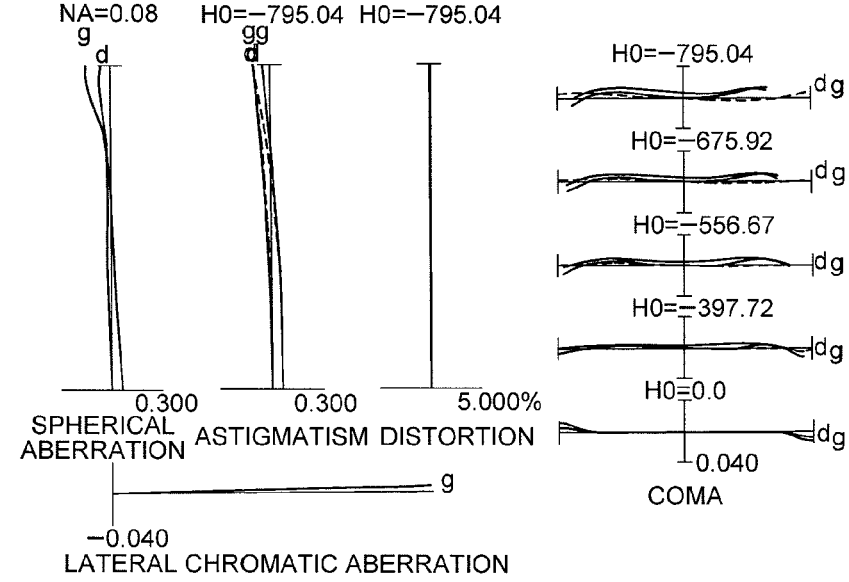
Figure 24A:
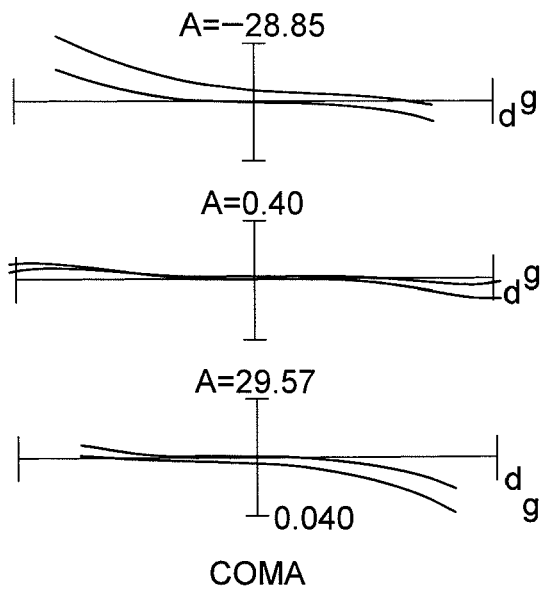
Figure 24B:
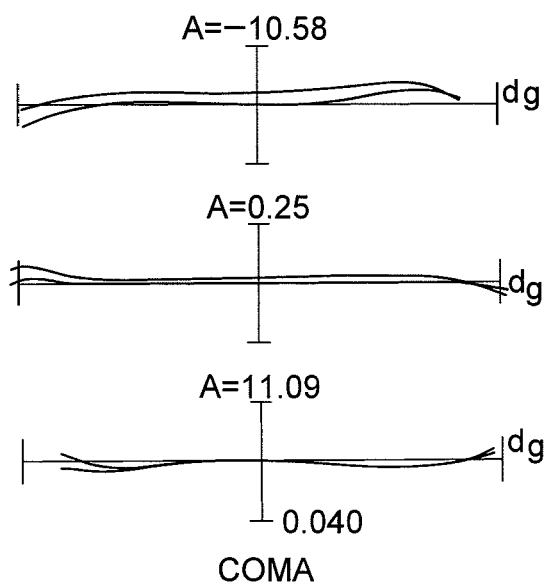

FIGS. 22A, 22B, and 22C are graphs showing various aberrations of the optical system according to Example 6 focusing on infinity, in which FIG. 22A is in a wide-angle end state, FIG. 22B is in an intermediate focal length state, and FIG. 22C is in a telephoto end state. FIGS. 23A, 23B, and 23C are graphs showing various aberrations of the optical system according to Example 6 focusing on a close object (shooting magnification is −0.01), in which FIG. 23A is in the wide-angle end state, FIG. 23B is in the intermediate focal length state, and FIG. 23C is in the telephoto end state. FIGS. 24A, and 24B are graphs showing coma of the optical system according to Example 6 upon shifting a decentering lens group (0.1 mm) focusing on infinity, in which FIG. 24A is in the wide-angle end state, and FIG. 24B is in the telephoto end state.

As is apparent from the respective graphs, the optical system according to Example 6 shows superb optical performance as a result of good corrections to various aberrations in each focal length state from the wide-angle end state through the telephoto end state.

Example 7

Figure 25:
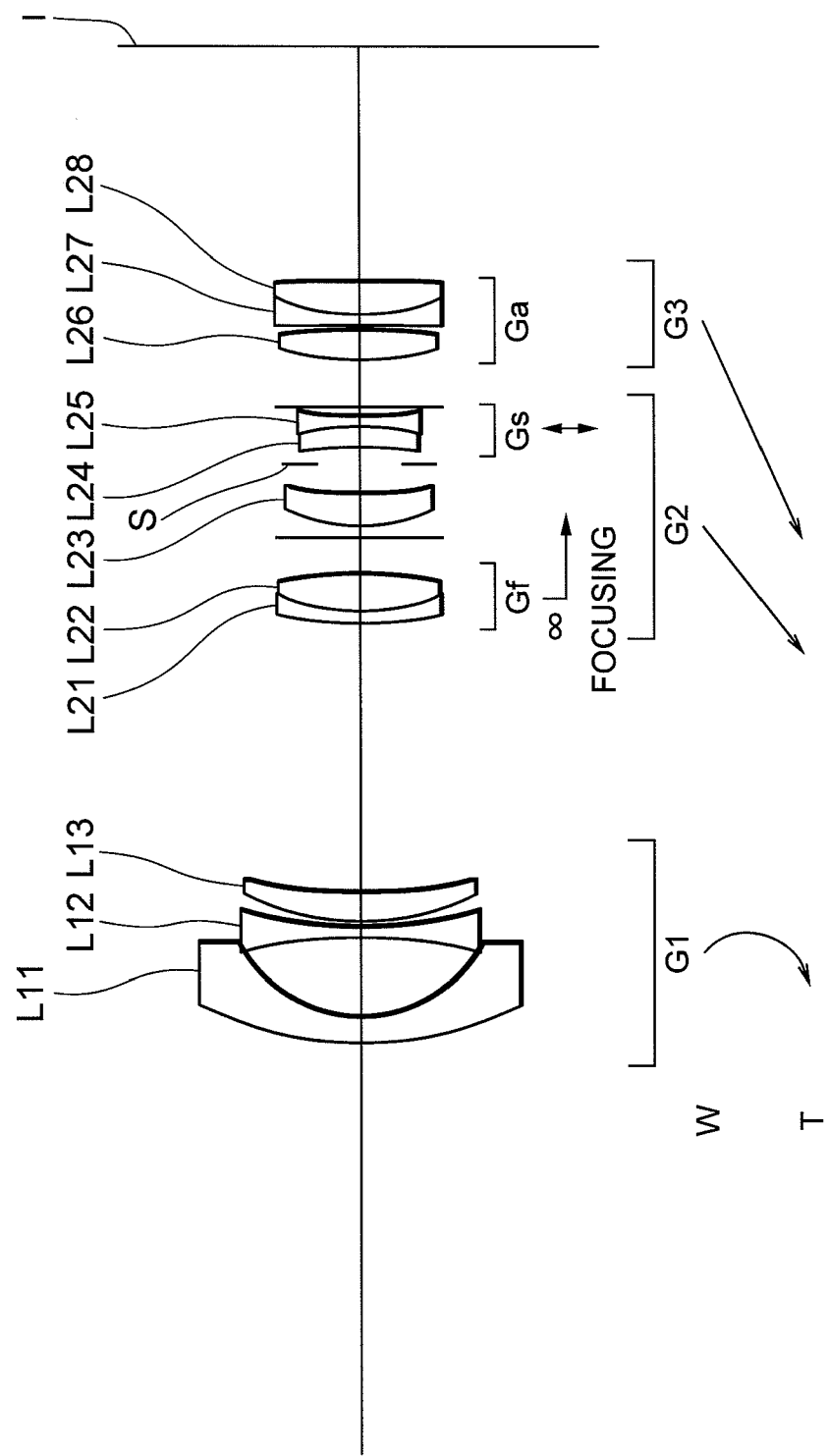
FIG. 25 is a sectional view showing a lens configuration of an optical system according to Example 7.

FIG. 25 is a sectional view showing a lens configuration of an optical system according to Example 7.

As shown in FIG. 25, the optical system according to Example 7 is composed of, in order from an object side along an optical axis, a first lens group G1 having negative refractive power, a second lens group G2 having positive refractive power, and a third lens group having positive refractive power. Upon zooming from a wide-angle end state W to a telephoto end state T, the first lens group G1, the second lens group G2, and the third lens group G3 move such that a distance between the first lens group G1 and the second lens group G2 decreases, and a distance between the second lens group G2 and the third lens group G3 decreases.

The first lens group G1 is composed of, in order from the object side along the optical axis, a negative meniscus lens L11 having a convex surface facing the object side, a double concave negative lens L12, and a positive meniscus lens L13 having a convex surface facing the object side. The negative meniscus lens L11 disposed to the most object side in the first lens group G1 is an aspherical lens having an aspherical surface facing the image plane I side.

The second lens group G2 is composed of, in order from the object side along the optical axis, a cemented positive lens constructed by a negative meniscus lens L21 having a convex surface facing the object side cemented with a double convex positive lens L22, a positive meniscus lens L23 having a convex surface facing the object side, an aperture stop S, and a cemented negative lens constructed by a positive meniscus lens L24 having a concave surface facing the object side cemented with a double concave negative lens L25. The positive meniscus lens L24 in the second lens group G2 is an aspherical lens having an aspherical surface formed on the object side.

The third lens group G3 is composed of, in order from the object side along the optical axis, a double convex positive lens L31, and a cemented negative lens constructed by a negative meniscus lens L32 having a convex surface facing the object side cemented with a double convex positive lens L33. The double convex positive lens L31 in the third lens group G3 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The cemented positive lens constructed by the negative meniscus lens L21 cemented with the double convex positive lens L22 is a focusing lens group Gf, and with moving the focusing lens group Gf to the image plane I side, focusing from an infinity object to a close object is carried out.

The cemented negative lens constructed by the positive meniscus lens L24 cemented with the double concave negative lens L25 is a decentering lens group Gs, and with moving the decentering lens group Gs in a direction substantially perpendicular to the optical axis, vibration reduction is carried out.

The third lens group is an auxiliary lens group Ga.

The positive meniscus lens L23, which is a lens component, is disposed between the focusing lens group Gf and the decentering lens group Gs.

Various values associated with the optical system according to Example 7 are listed in Table 7.

TABLE 7

[Specifications]
Zoom Ratio: 2.825

| | W | M | T |
|---|---|---|---|
| f = | 10.30 | 18.75 | 29.10 |
| FNO = | 3.64 | 4.23 | 5.86 |
| 2ω = | 78.78 | 46.56 | 30.67 |
| Y = | 7.962 | 7.962 | 7.962 |
| TL = | 66.55 | 62.74 | 68.78 |
| Bf = | 15.4801 | 25.2812 | 36.7848 |

TABLE 7-continued

[Lens Data]

| i | r | d | nd | vd |
|---|---|---|---|---|
| 1 | 25.0000 | 1.80 | 1.74330 | 49.32 |
| 2* | 8.5722 | 5.23 | | |
| 3 | −31.9974 | 0.80 | 1.49700 | 81.54 |
| 4 | 25.7099 | 0.15 | | |
| 5 | 16.2678 | 2.16 | 1.84666 | 23.78 |
| 6 | 33.0579 | (d6) | | |
| 7 | 27.3560 | 0.80 | 1.79504 | 28.69 |
| 8 | 12.7778 | 2.62 | 1.60300 | 65.44 |
| 9 | −27.7840 | (d9) | | |
| 10 | ∞ | 0.68 | | |
| 11 | 10.6214 | 2.34 | 1.60300 | 65.44 |
| 12 | 28.5797 | 1.86 | | |
| 13 | ∞ | 1.10 | Aperture stop S | |
| 14* | −27.4165 | 1.37 | 1.82115 | 24.06 |
| 15 | −17.0648 | 0.80 | 1.75500 | 52.32 |
| 16 | 21.3149 | 0.55 | | |
| 17 | ∞ | (d17) | | |
| 18 | 18.9858 | 2.05 | 1.67790 | 54.89 |
| 19* | −30.4460 | 0.15 | | |
| 20 | 155.5536 | 0.80 | 1.85026 | 32.35 |
| 21 | 12.8042 | 2.38 | 1.60300 | 65.44 |
| 22 | −74.1840 | (Bf) | | |

[Aspherical Data]

Surface Number: 2

κ = 0.8028
A4 = −2.1183E−06
A6 = −2.6605E−09
A8 = 1.1966E−09
A10 = −3.0855E−11

Surface Number: 14

κ = −7.4148
A4 = 2.7745E−05
A6 = −2.0384E−06
A8 = −2.7176E−07
A10 = −9.6003E−09

Surface Number: 19

κ = 0.2983
A4 = 1.5880E−04
A6 = 1.8851E−06
A8 = −5.0971E−08
A10 = 8.8426E−10

| | W | M | T |
|---|---|---|---|
| [Variable Distances upon Zooming] | | | |
| f = | 10.3000 | 18.7500 | 29.1000 |
| d6 = | 17.8651 | 5.8489 | 1.0000 |
| d9 = | 2.3653 | 2.3653 | 2.3653 |
| d17 = | 3.2097 | 1.6140 | 1.0000 |
| Bf = | 15.4801 | 25.2812 | 36.7848 |
| [Moving Amount of Focusing Lens Group] | | | |
| f = | 10.3000 | 18.7500 | 29.1000 |
| ΔFx = | 0.27154 | 0.12586 | 0.0844 |
| [Variable Distances upon Shooting Magnification = −0.01] | | | |
| d0 = | 1006.0724 | 1855.1767 | 2891.6589 |
| f = | 10.17755 | 18.59081 | 28.86119 |
| d6 = | 18.13661 | 5.97474 | 1.08438 |
| d9 = | 2.09376 | 2.23944 | 2.28090 |
| d17 = | 3.20972 | 1.61399 | 1.00000 |
| Bf = | 15.48033 | 25.28137 | 36.78498 |

TABLE 7-continued

[Lens Group Data]

| Group | I | Focal Length |
|---|---|---|
| 1 | 1 | −15.3542 |
| 2 | 7 | 26.5552 |
| 3 | 18 | 19.4757 |

[Values for Conditional Expressions]

fw = 10.3000
ft = 29.1000
ff = 28.4536
fs = −15.9679
fa = 19.4757
d12 = 5.2284
fγw = −0.38103
βG2fw = −2.5541
βG2ft = 4.9702
(1) fa/fs = −1.220
(2) |fw/ff| = 0.362
(3) |fγw| = 0.381
(4) ff/fs = −1.782
(5) (d12)/ft = 0.180
(6) |βG2fw| = 2.554
(7) |βG2ft| = 4.970

Figure 26A:
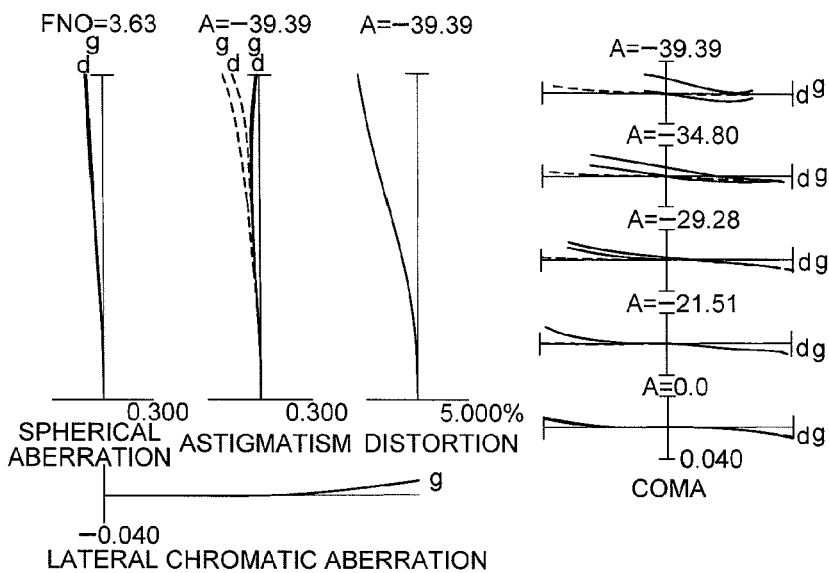
Figure 26B:
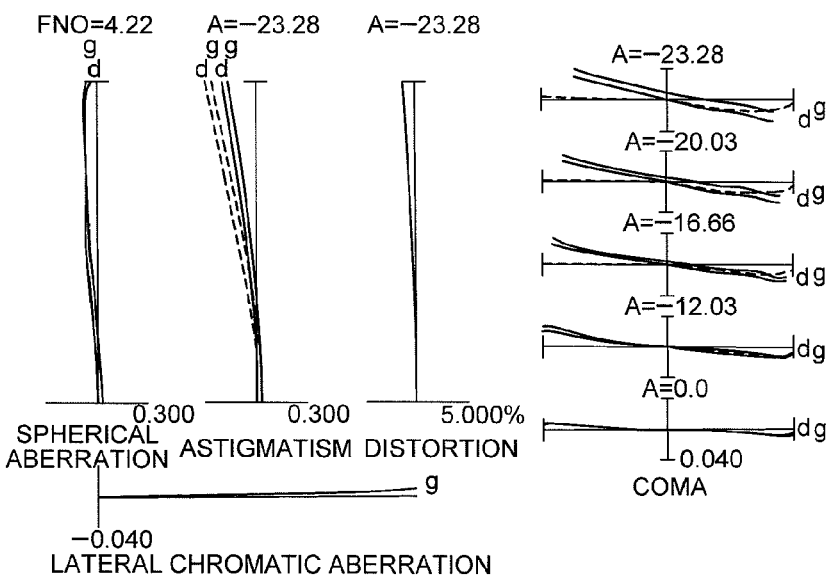
Figure 26C:
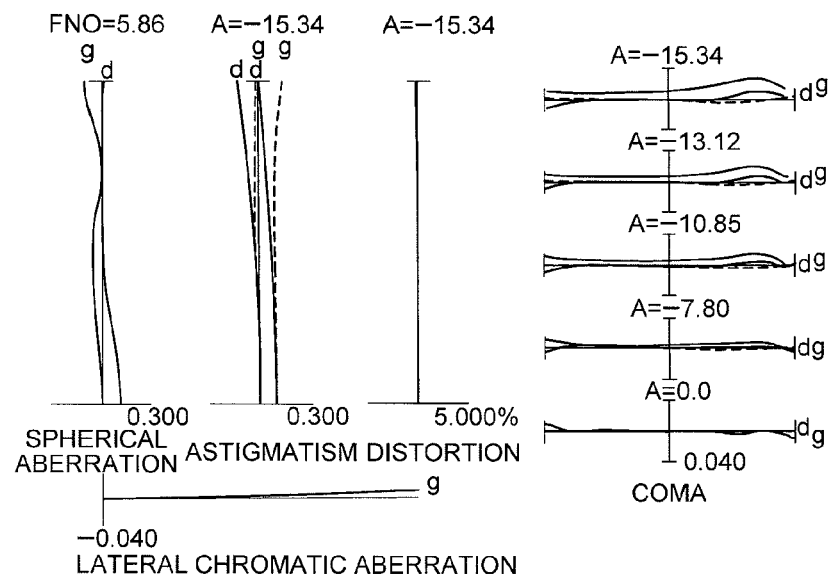
Figure 27A:
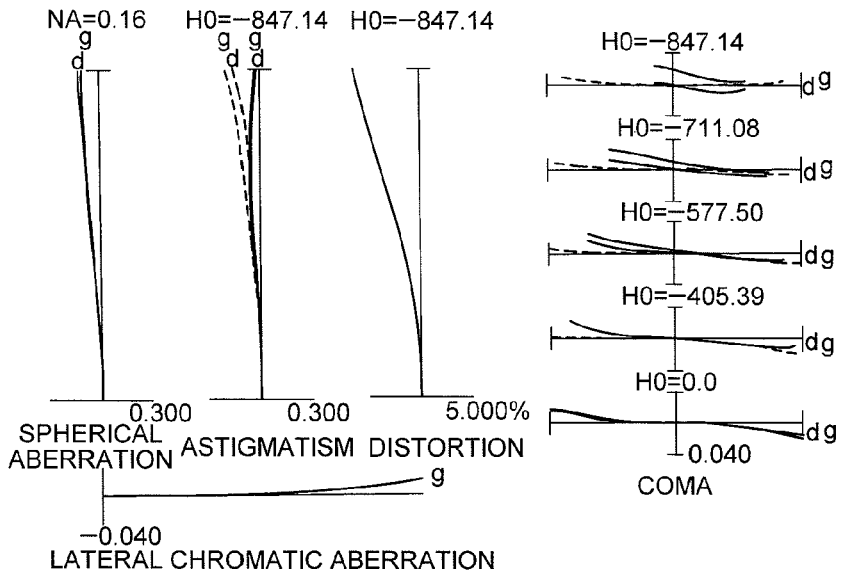
Figure 27B:
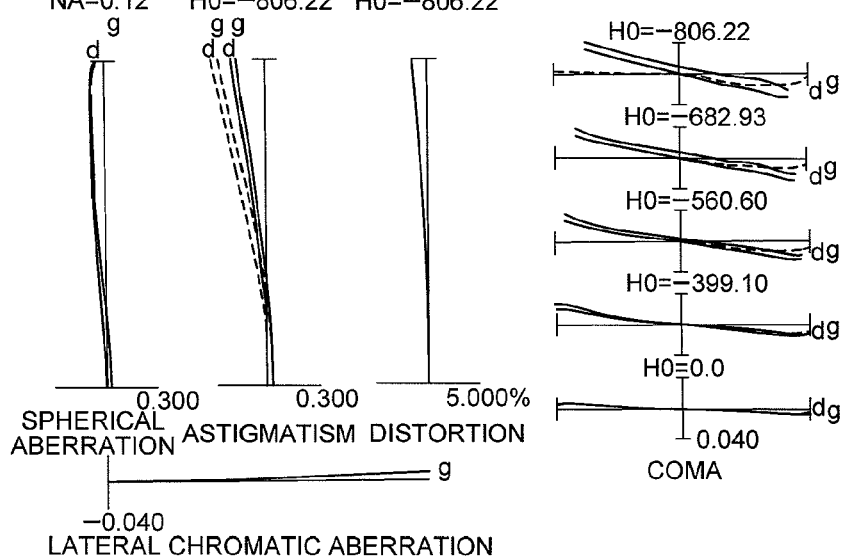
Figure 27C:
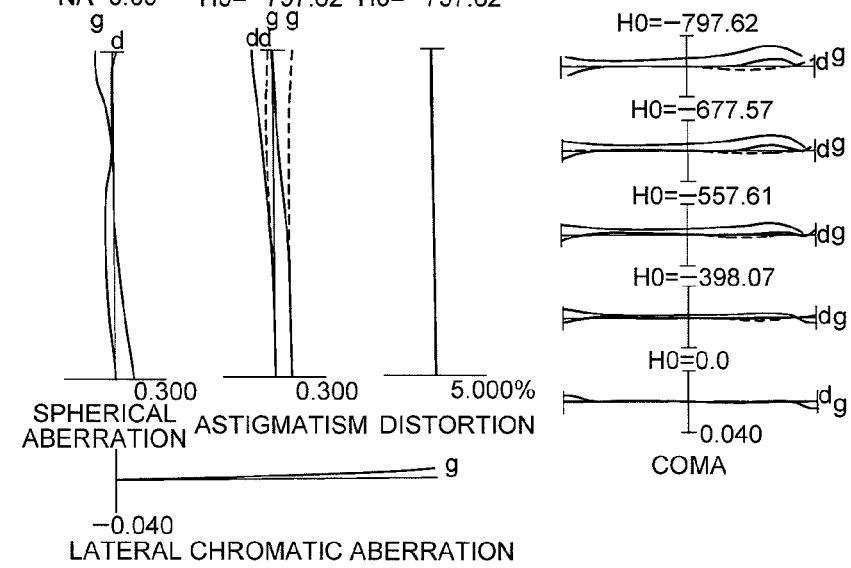
Figure 28A:
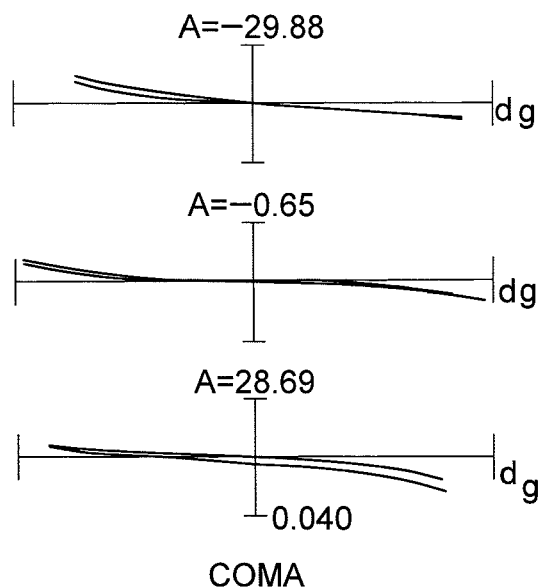
Figure 28B:
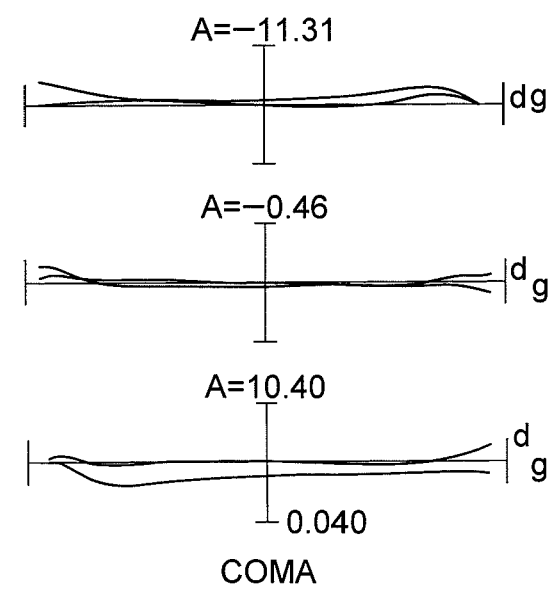

FIGS. 26A, 26B, and 26C are graphs showing various aberrations of the optical system according to Example 7 focusing on infinity, in which FIG. 26A is in a wide-angle end state, FIG. 26B is in an intermediate focal length state, and FIG. 26C is in a telephoto end state. FIGS. 27A, 27B, and 27C are graphs showing various aberrations of the optical system according to Example 7 focusing on a close object (shooting magnification is −0.01), in which FIG. 27A is in the wide-angle end state, FIG. 27B is in the intermediate focal length state, and FIG. 27C is in the telephoto end state. FIGS. 28A, and 28B are graphs showing coma of the optical system according to Example 7 upon shifting a decentering lens group (0.1 mm) focusing on infinity, in which FIG. 28A is in the wide-angle end state, and FIG. 28B is in the telephoto end state.

As is apparent from the respective graphs, the optical system according to Example 7 shows superb optical performance as a result of good corrections to various aberrations in each focal length state from the wide-angle end state through the telephoto end state.

Example 8

FIG. 29 is a sectional view showing a lens configuration of an optical system according to Example 8.

As shown in FIG. 29, the optical system according to Example 8 is composed of, in order from an object side along an optical axis, a first lens group G1 having negative refractive power, and a second lens group G2 having positive refractive power. Upon zooming from a wide-angle end state W to a telephoto end state T, the first lens group G1, and the second lens group G2 move such that a distance between the first lens group G1 and the second lens group G2 decreases.

The first lens group G1 is composed of, in order from the object side along the optical axis, a negative meniscus lens L11 having a convex surface facing the object side, a double concave negative lens L12, and a positive meniscus lens L13 having a convex surface facing the object side. The negative meniscus lens L11 disposed to the most object side in the first lens group G1 is an aspherical lens having an aspherical surface facing the image plane I side.

The second lens group G2 is composed of, in order from the object side, a cemented positive lens constructed by a negative meniscus lens L21 having a convex surface facing the object side cemented with a double convex positive lens L22, an aperture stop S, a cemented positive lens constructed by a double convex positive lens L23 cemented with a negative meniscus lens L24 having a concave surface facing the object side, a negative meniscus lens L25 having a convex surface facing the object side, and a cemented positive lens constructed by a negative meniscus lens L26 having a convex surface facing the object side cemented with a double convex positive lens L27. The negative meniscus lens L21 disposed to the most object side in the second lens group G2 is an aspherical lens having an aspherical surface formed on the object side surface. The double convex positive lens L27 disposed to the most image plane I side in the second lens group G2 is an aspherical lens having an aspherical surface formed on the image plane I side.

The aperture stop S disposed in the second lens group G2 moves to the object side in a body with the second lens group G2 upon zooming from the wide-angle end state W to the telephoto end state T.

The cemented positive lens constructed by the double convex positive lens L23 cemented with the negative meniscus lens L24 is a focusing lens group Gf, and with moving the focusing lens group Gf to the object side, focusing from an infinity object to a close object is carried out.

The cemented positive lens constructed by the negative meniscus lens L21 cemented with the double convex positive lens L22 is a decentering lens group Gs, and with moving the decentering lens group Gs in a direction substantially perpendicular to the optical axis, vibration reduction is carried out.

The negative meniscus lens L25 and the cemented positive lens constructed by the negative meniscus lens L26 cemented with the double convex positive lens L27 are an auxiliary lens group Ga having negative refractive power.

Various values associated with the optical system according to Example 8 are listed in Table 8.

TABLE 8

[Specifications]
Zoom Ratio: 2.825

| | W | M | T |
|---|---|---|---|
| f = | 10.30 | 17.30 | 29.10 |
| FNO = | 3.31 | 4.22 | 5.78 |
| 2ω = | 77.59 | 49.65 | 30.52 |
| Y = | 7.96 | 7.96 | 7.96 |
| TL = | 73.80 | 67.53 | 72.19 |
| Bf = | 18.7255 | 26.4381 | 39.4394 |

[Lens Data]

| i | r | d | nd | vd |
|---|---|---|---|---|
| 1 | 18.6779 | 1.30 | 1.85135 | 40.10 |
| 2* | 7.8525 | 7.25 | | |
| 3 | −94.6821 | 1.00 | 1.83481 | 42.72 |
| 4 | 34.1506 | 0.31 | | |
| 5 | 18.6651 | 2.51 | 1.86074 | 23.06 |
| 6 | 78.9142 | (d6) | | |
| 7* | 18.1125 | 1.30 | 1.83441 | 37.28 |
| 8 | 12.2772 | 1.76 | 1.59319 | 67.87 |
| 9 | −2494.0282 | 3.99 | | |
| 10 | ∞ | 1.00 | Aperture Stop S | |
| 11 | 23.3375 | 1.67 | 1.74400 | 44.78 |
| 12 | −19.5626 | 1.00 | 1.67270 | 32.11 |
| 13 | −219.6865 | 2.59 | | |
| 14 | 106.9379 | 1.53 | 1.80486 | 24.73 |
| 15 | 28.0039 | 1.36 | | |
| 16 | 352.0524 | 0.83 | 1.79952 | 42.24 |
| 17 | 10.0128 | 2.17 | 1.69350 | 53.20 |
| 18* | −38.1016 | (Bf) | | |

[Aspherical Data]

Surface Number: 2

κ = 0.6460
A4 = 1.2719E−05
A6 = 5.3251E−07
A8 = −4.7392E−09
A10 = 4.5963E−11

Surface Number: 7

κ = −1.0893
A4 = 3.0467E−05
A6 = 9.8555E−08
A8 = −1.0556E−08
A10 = 2.2926E−10

Surface Number: 18

κ = 1.0000
A4 = 6.6102E−05
A6 = 5.9125E−08
A8 = 3.8159E−08
A10 = −1.1681E−09

| | W | M | T |
|---|---|---|---|
| [Variable Distances upon Zooming] | | | |
| f = | 10.3000 | 17.3000 | 29.0999 |
| d6 = | 23.5020 | 9.5180 | 1.1743 |
| Bf = | 18.7255 | 26.4381 | 39.4394 |
| [Moving Amount of Focusing Lens Group] | | | |
| f = | 10.3000 | 17.3000 | 29.0999 |
| ΔFx = | 0.0669 | 0.0967 | 0.1445 |

[Lens Group Data]

| Group | I | Focal Length |
|---|---|---|
| 1 | 1 | −17.9744 |
| 2 | 7 | 19.8044 |

[Values for Conditional Expressions]

fw = 10.3000
ft = 29.0999
ff = 26.0978
fs = 36.6504
fa = −98.3425
d12 = 7.2500
fγw = 1.5400
(1) fa/fs = −2.6833
(2) |fw/ff| = 0.3947
(3) |fγw| = 1.5400
(4) ff/fs = 0.7121
(5) (d12)/ft = 0.2491

Figure 30A:
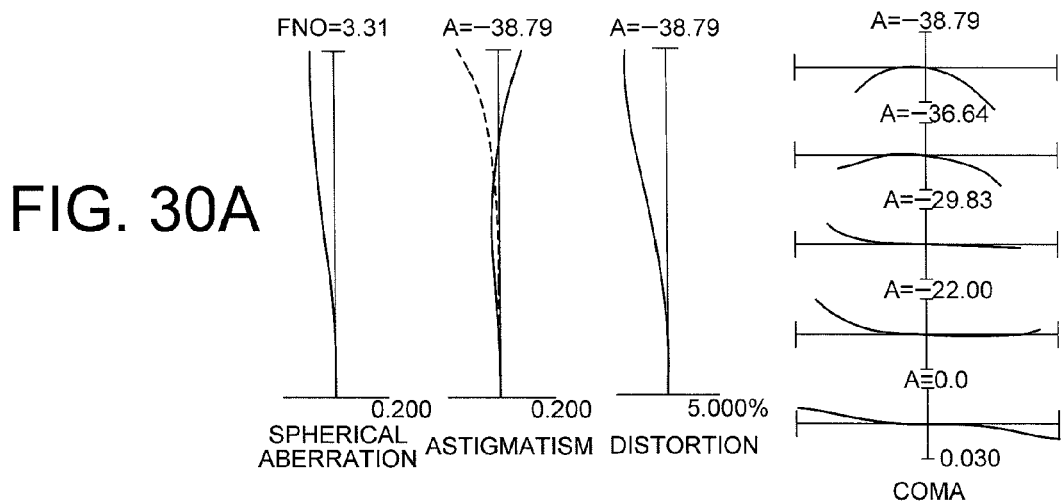
Figure 30B:
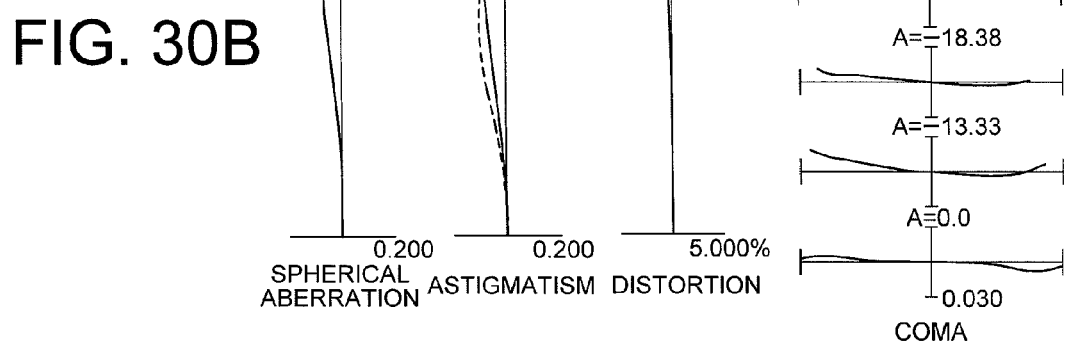
Figure 30C:
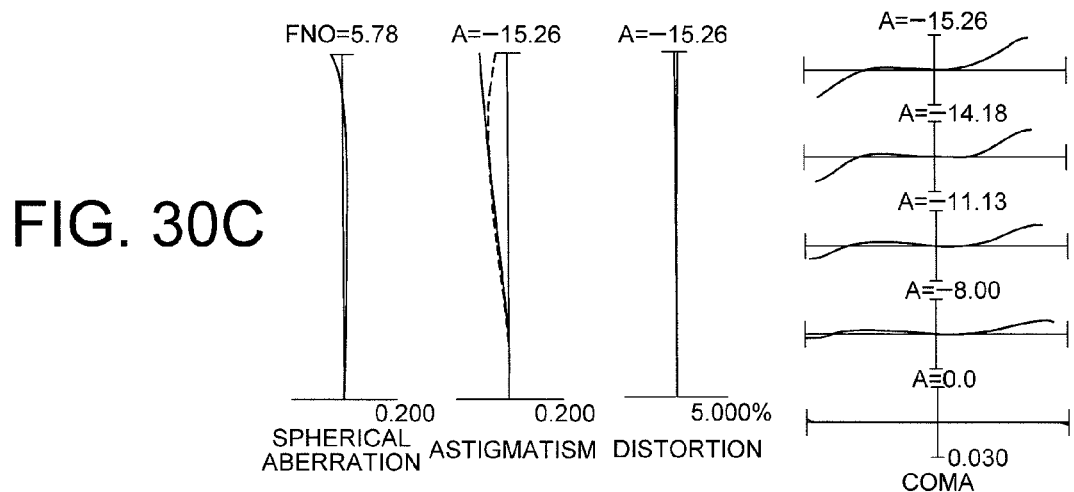
Figure 31A:
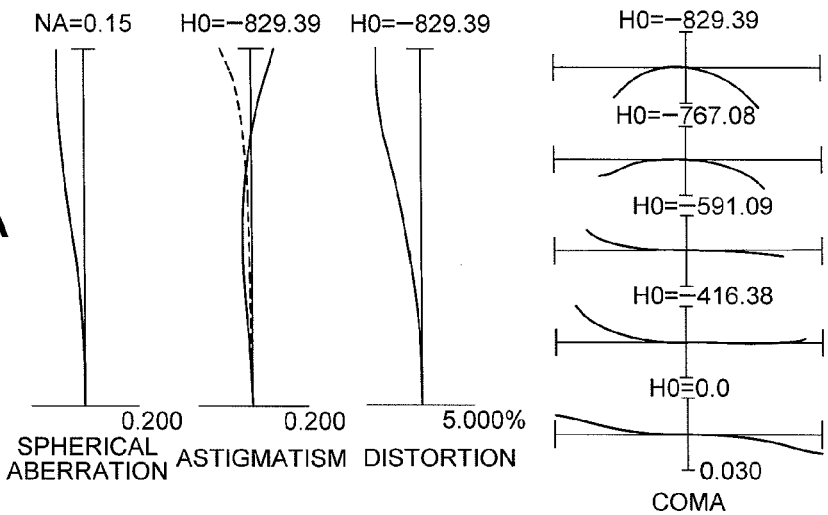
Figure 31B:
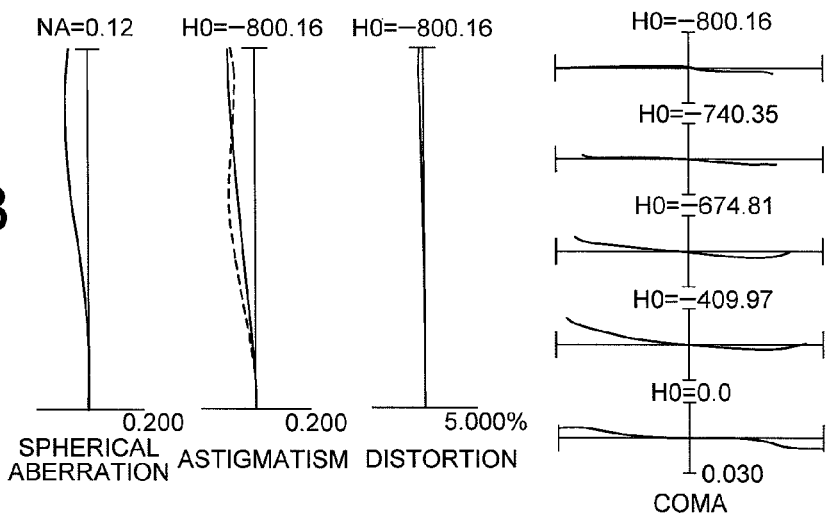
Figure 31C:
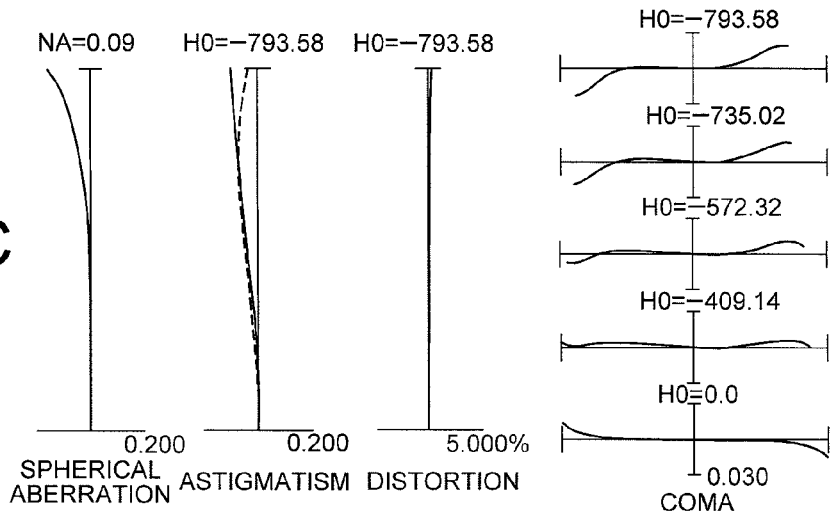
Figure 32A:
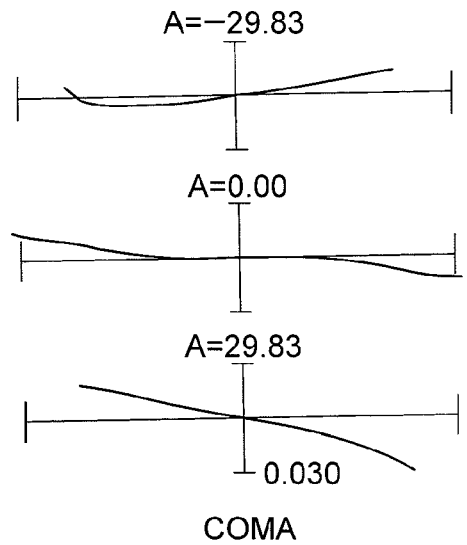
Figure 32B:
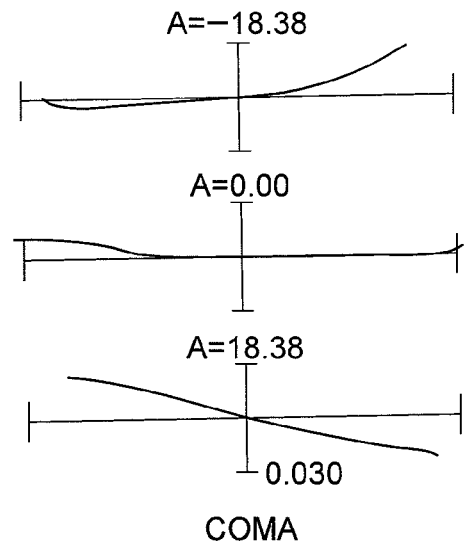
Figure 32C:
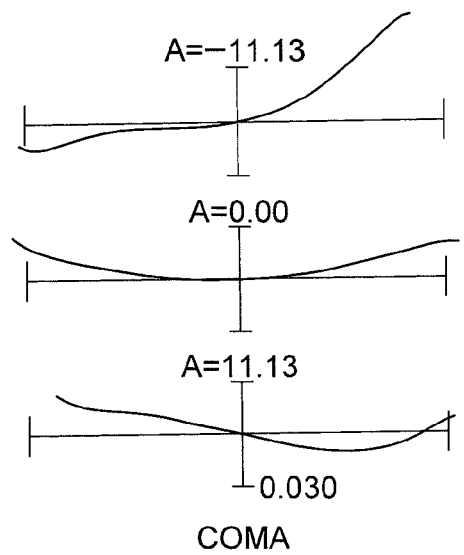

FIGS. 30A, 30B, and 30C are graphs showing various aberrations of the optical system according to Example 8 focusing on infinity, in which FIG. 30A is in a wide-angle end state, FIG. 30B is in an intermediate focal length state, and FIG. 30C is in a telephoto end state. FIGS. 31A, 31B, and 31C are graphs showing various aberrations of the optical system according to Example 8 focusing on a close object (shooting magnification is −0.01), in which FIG. 31A is in the wide-angle end state, FIG. 31B is in the intermediate focal length state, and FIG. 31C is in the telephoto end state. FIGS. 32A, 32B, and 32C are graphs showing coma of the optical system according to Example 8 upon shifting a decentering lens group (0.2 mm) focusing on infinity, in which FIG. 32A is in the wide-angle end state, FIG. 32B is in the intermediate focal length state, and FIG. 32C is in the telephoto end state.

As is apparent from the respective graphs, the optical system according to Example 8 shows superb optical performance as a result of good corrections to various aberrations in each focal length state from the wide-angle end state through the telephoto end state.

Example 9

Figure 33:
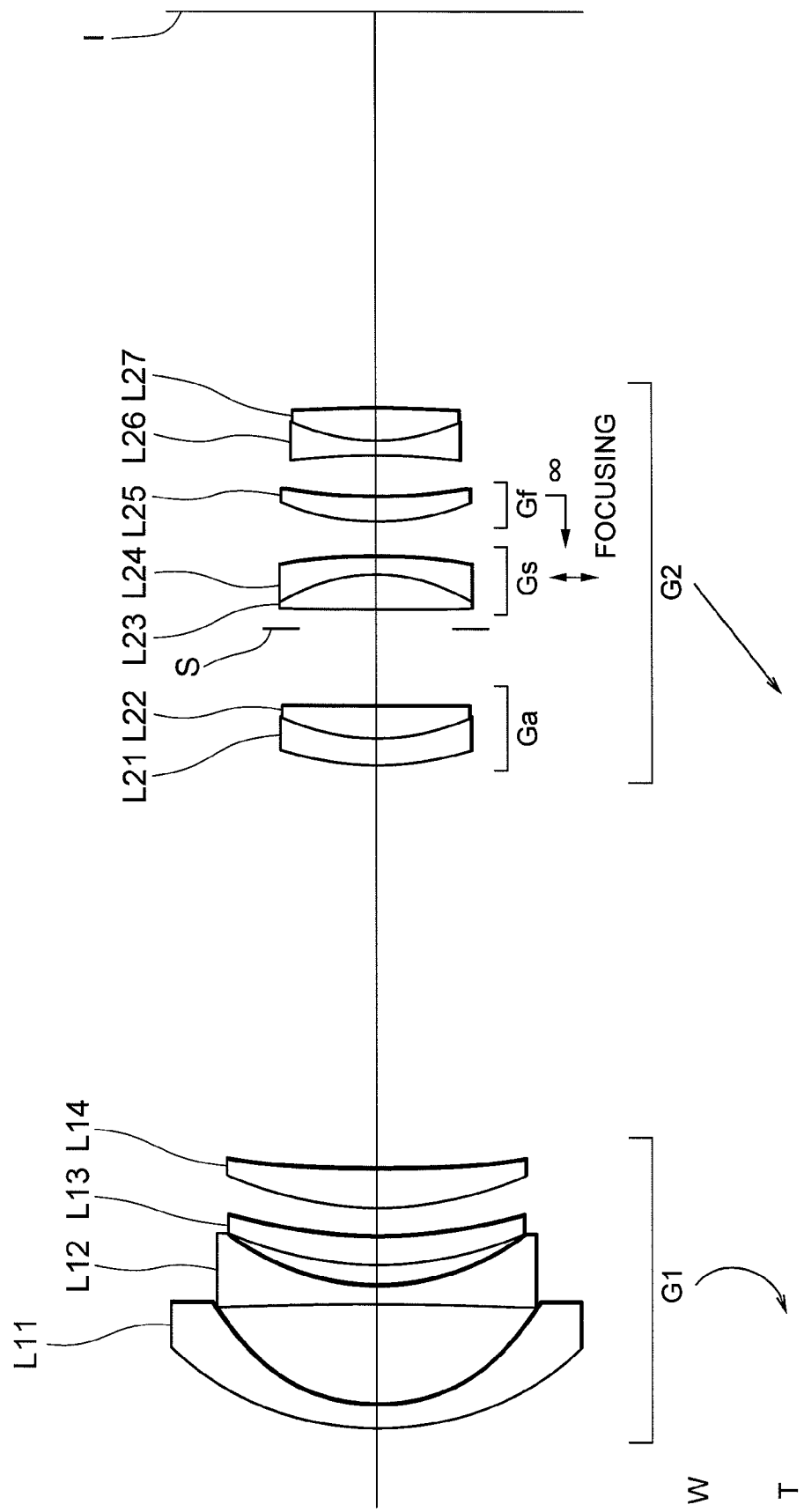
FIG. 33 is a sectional view showing a lens configuration of an optical system according to Example 9.

FIG. 33 is a sectional view showing a lens configuration of an optical system according to Example 9.

As shown in FIG. 33, the optical system according to Example 9 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a double concave negative lens L12, a positive meniscus lens L13 having a convex surface facing the object side, and a positive meniscus lens L14 having a convex surface facing the object side. The negative meniscus lens L11 disposed to the most object side in the first lens group G1 is an aspherical lens having an aspherical surface formed on the image plane I side surface.

The second lens group G2 is composed of, in order from the object side along the optical axis, a cemented positive lens constructed by a negative meniscus lens L21 having a convex surface facing the object side cemented with a positive meniscus lens L22 having a convex surface facing the object side, an aperture stop S, a cemented positive lens constructed by a double convex positive lens L23 cemented with a negative meniscus lens L24 having a concave surface facing the object side, a positive meniscus lens L25 having a convex surface facing the object side, and a cemented negative lens constructed by a double concave negative lens L26 cemented with a double convex positive lens. The negative meniscus lens L21 disposed to the most object side in the second lens group G2 is an aspherical lens having an aspherical surface formed on the object side surface. The positive meniscus lens L25 disposed to the image plane I side of the decentering lens group Gs in the second lens group G2 is an aspherical lens having an aspherical surface formed on the object side surface. The double convex positive lens L27 disposed to the most image plane I side of the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The positive meniscus lens L25 is a focusing lens group Gf, and with moving the focusing lens group Gf to the image plane I side, focusing from an infinity object to a close object is carried out.

The cemented positive lens constructed by the double convex positive lens L23 cemented with the negative meniscus lens L24 is a decentering lens group Gs, and with moving the decentering lens group Gs in a direction substantially perpendicular to the optical axis, vibration reduction is carried out.

The cemented positive lens constructed by the negative meniscus lens L21 cemented with the positive meniscus lens L22 is an auxiliary lens group Ga.

Various values associated with the optical system according to Example 9 are listed in Table 9.

TABLE 9

[Specifications]
Zoom Ratio: 2.825

|  | W | M | T |
|---|---|---|---|
| f = | 10.30 | 17.30 | 29.10 |
| FNO = | 3.51 | 4.14 | 5.77 |
| 2ω = | 78.05 | 49.64 | 30.55 |
| Y = | 7.96 | 7.96 | 7.96 |
| TL = | 74.56 | 70.81 | 77.93 |
| Bf = | 20.7334 | 9.3225 | 43.8013 |

[Lens Data]

| i | r | d | nd | νd |
|---|---|---|---|---|
| 1 | 16.2784 | 1.30 | 1.85135 | 40.10 |
| 2* | 8.9447 | 5.30 | | |
| 3 | −301.3986 | 1.00 | 1.88300 | 40.76 |
| 4 | 12.6615 | 1.06 | | |
| 5 | 18.9306 | 1.56 | 1.76346 | 26.38 |
| 6 | 27.0707 | 1.36 | | |
| 7 | 18.2904 | 2.18 | 1.86074 | 23.06 |
| 8 | 58.5517 | (d8) | | |
| 9* | 16.7318 | 1.39 | 1.85135 | 40.10 |
| 10 | 11.1081 | 1.81 | 1.58090 | 57.73 |
| 11 | 676.4968 | 4.01 | | |
| 12 | ∞ | 1.00 | Aperture Stop S | |
| 13 | 134.3575 | 1.83 | 1.75197 | 47.49 |
| 14 | −10.0350 | 1.00 | 1.83781 | 31.56 |
| 15 | −34.0385 | 1.80 | | |
| 16* | 13.9946 | 1.35 | 1.77377 | 47.17 |
| 17 | 24.7571 | 2.13 | | |
| 18 | −54.0166 | 0.80 | 1.89370 | 35.17 |
| 19 | 9.5527 | 1.80 | 1.73077 | 40.50 |
| 20* | −53.9739 | (Bf) | | |

[Aspherical Data]

Surface Number: 2

κ = 0.1601
A4 = 9.1340E−05
A6 = 4.5205E−07
A8 = 5.5818E−09
A10 = −2.4977E−11

Surface Number: 9

κ = −3.5386
A4 = 1.0402E−04
A6 = −8.0989E−07
A8 = 1.5095E−08
A10 = −1.1446E−10

Surface Number: 16

κ = −0.0568
A4 = 1.5624E−04
A6 = 1.5318E−06
A8 = 1.2547E−08
A10 = 0.0000E+00

Surface Number: 20

κ = 1.0000
A4 = 1.9868E−04
A6 = 1.8409E−06
A8 = 9.4693E−08
A10 = −1.4396E−09

|  | W | M | T |
|---|---|---|---|
| [Variable Distances upon Zooming] | | | |
| f = | 10.3000 | 17.3001 | 29.1002 |
| d8 = | 21.1546 | 8.8150 | 1.4524 |
| Bf = | 20.7334 | 9.3225 | 43.8013 |

TABLE 9-continued

[Moving Amount of Focusing Lens Group]

| f = | 10.3000 | 17.3001 | 29.1002 |
|---|---|---|---|
| ΔFx = | 0.0672 | 0.0808 | 0.0889 |

[Lens Group Data]

| Group | I | Focal Length |
|---|---|---|
| 1 | 1 | −16.0000 |
| 2 | 9 | 19.6321 |

[Values for Conditional Expressions]

fw = 10.3000
ft = 29.1002
ff = 39.4493
fs = 49.2923
fa = 37.5001
d12 = 5.2957
fyw = 1.5310
(1) fa/fs = 0.7608
(2) |fw/ff| = 0.2611
(3) |fyw| = 1.5310
(4) ff/fs = 0.8003
(5) (d12)/ft = 0.1820

Figure 34A:
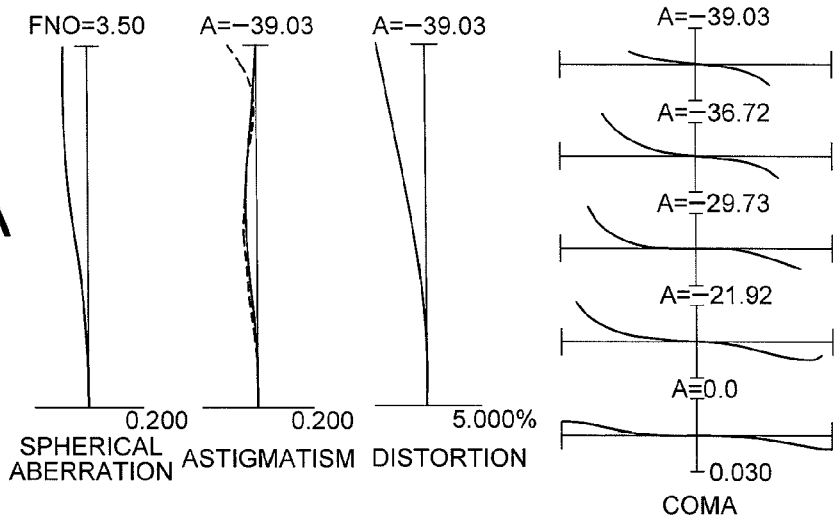
Figure 34B:
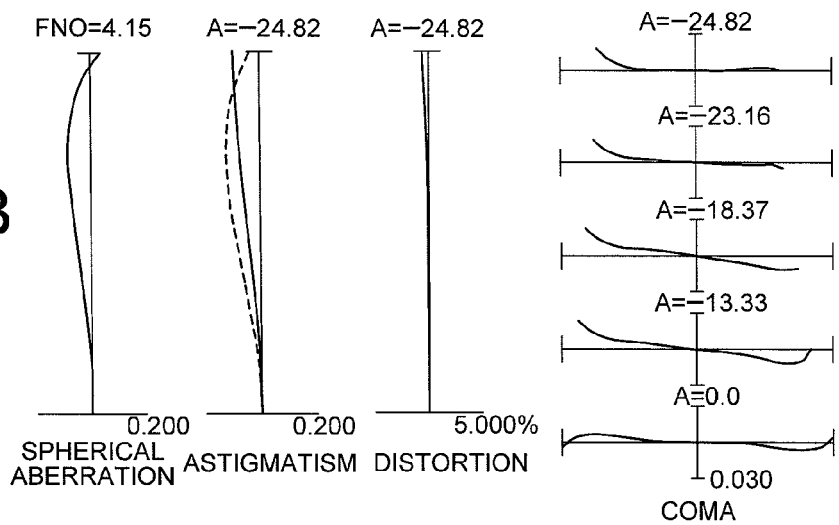
Figure 34C:
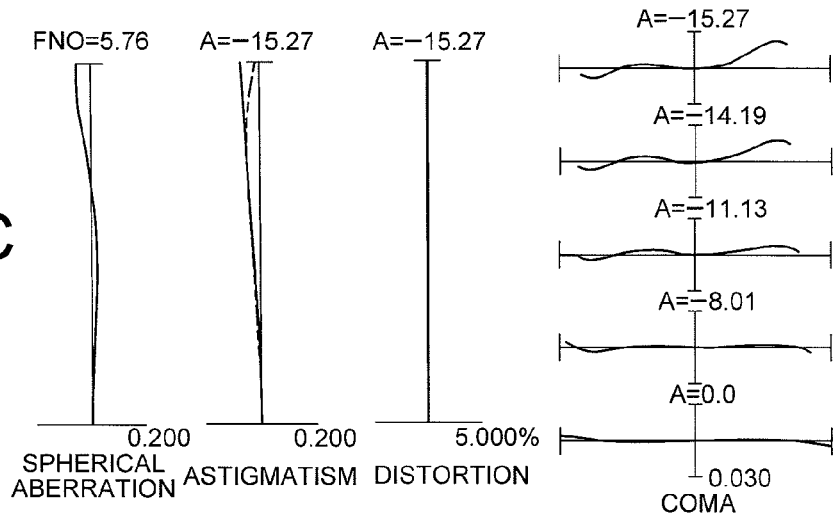
Figure 35A:
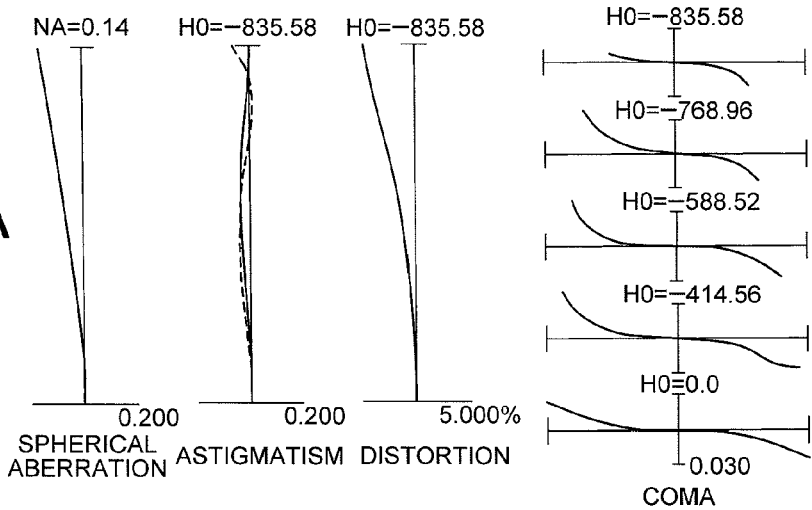
Figure 35B:
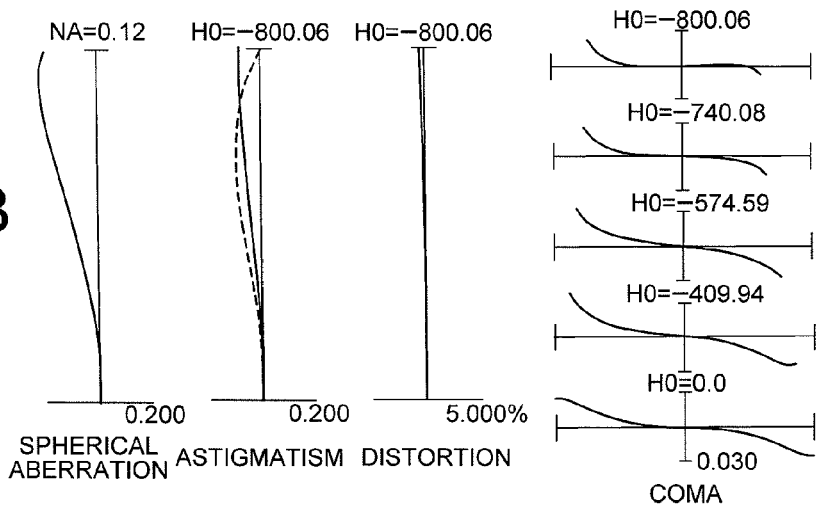
Figure 35C:
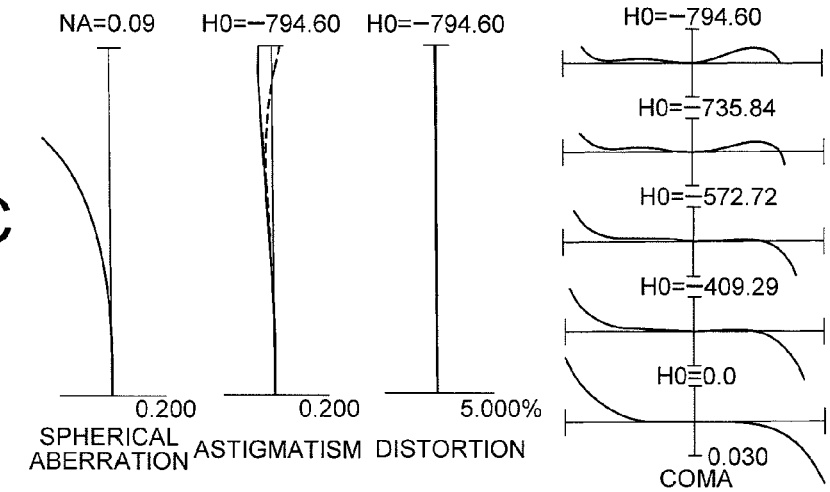
Figure 36A:
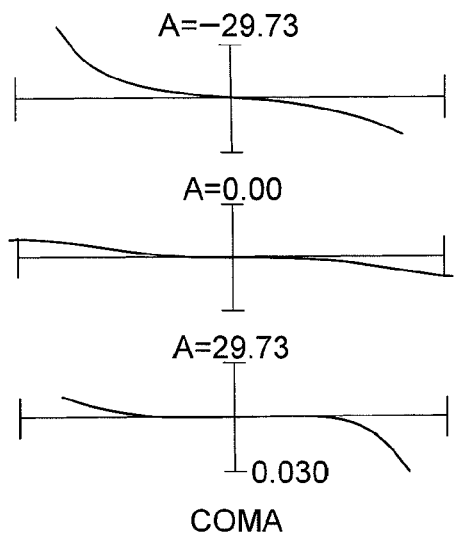
Figure 36B:
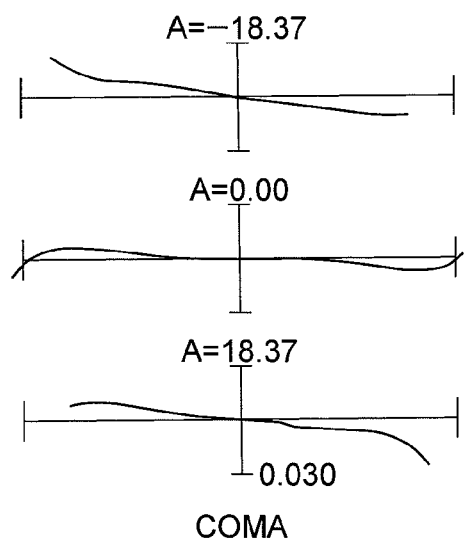
Figure 36C:
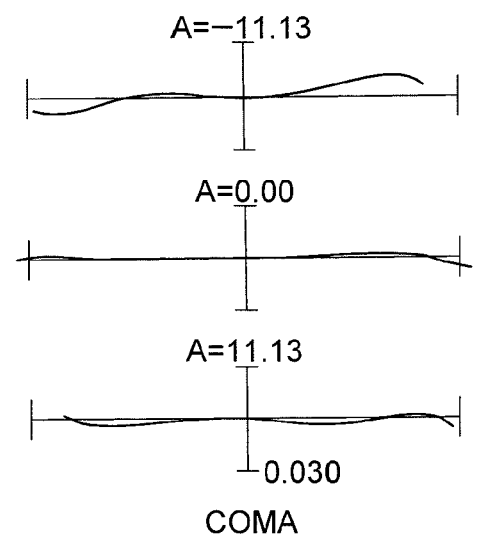

FIGS. 34A, 34B, and 34C are graphs showing various aberrations of the optical system according to Example 9 focusing on infinity, in which FIG. 34A is in a wide-angle end state, FIG. 34B is in an intermediate focal length state, and FIG. 34C is in a telephoto end state. FIGS. 35A, 35B, and 35C are graphs showing various aberrations of the optical system according to Example 9 focusing on a close object (shooting magnification is −0.01), in which FIG. 35A is in the wide-angle end state, FIG. 35B is in the intermediate focal length state, and FIG. 35C is in the telephoto end state. FIGS. 36A, 36B, and 36C are graphs showing coma of the optical system according to Example 9 upon shifting a decentering lens group (0.2 mm) focusing on infinity, in which FIG. 36A is in the wide-angle end state, FIG. 36B is in the intermediate focal length state, and FIG. 36C is in the telephoto end state.

As is apparent from the respective graphs, the optical system according to Example 9 shows superb optical performance as a result of good corrections to various aberrations in each focal length state from the wide-angle end state through the telephoto end state.

Example 10

Figure 37:
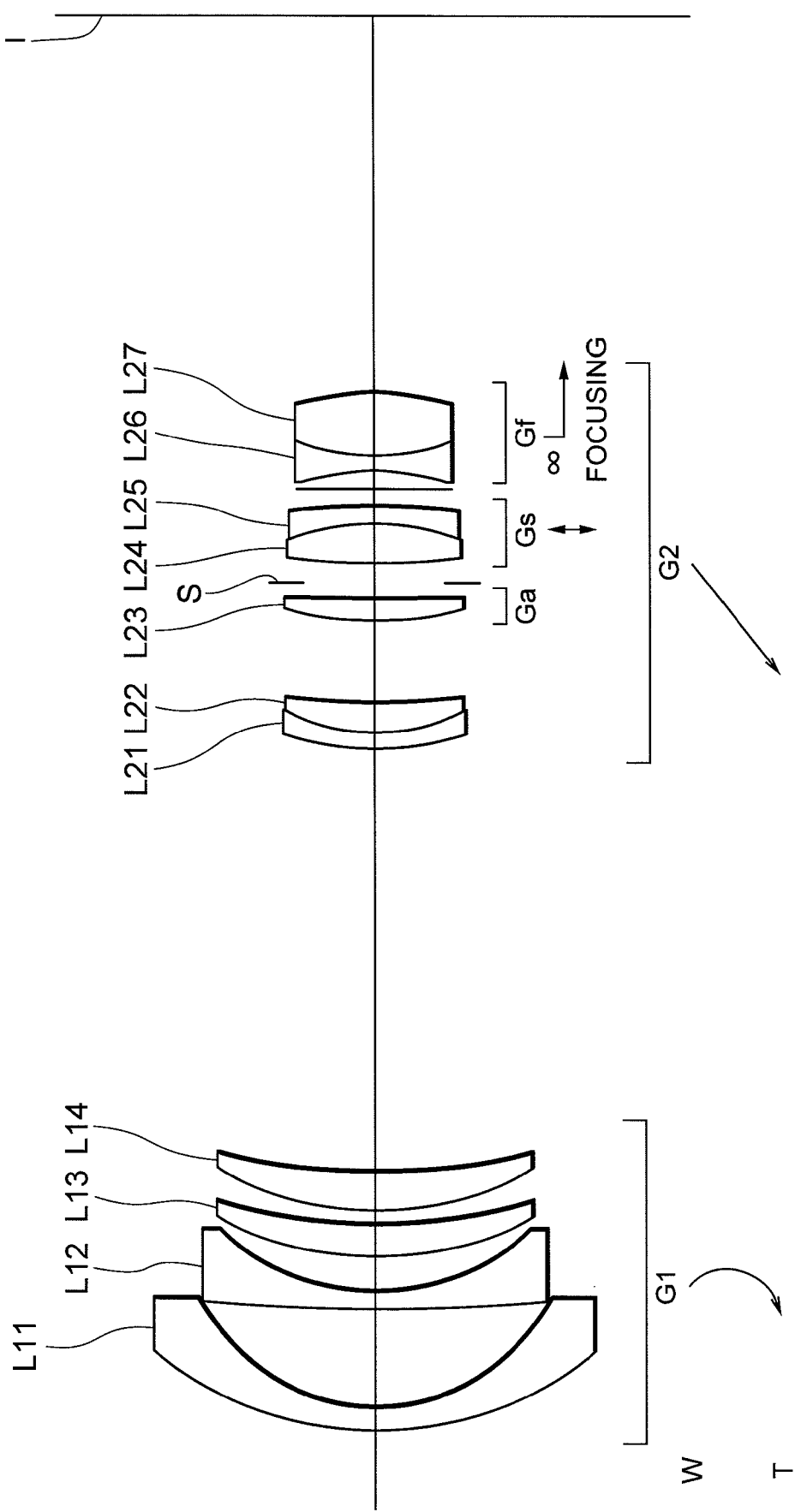
FIG. 37 is a sectional view showing a lens configuration of an optical system according to Example 10.

FIG. 37 is a sectional view showing a lens configuration of an optical system according to Example 10.

As shown in FIG. 37, the optical system according to Example 10 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a negative meniscus lens L12 having a convex surface facing the object side, a positive meniscus lens L13 having a convex surface facing the object side, and a positive meniscus lens L14 having a convex surface facing the object side. The negative meniscus lens L11 disposed to the most object side in the first lens group G1 is an aspherical lens having an aspherical surface formed on the image plane I side surface.

The second lens group G2 is composed of, in order from the object side along the optical axis, a cemented positive lens constructed by a negative meniscus lens L21 having a convex surface facing the object side cemented with a positive meniscus lens L22 having a convex surface facing the object side, a positive meniscus lens L23 having a convex surface facing the object side, aperture stop S, a cemented positive lens constructed by a double convex positive lens L24 cemented with a negative meniscus lens L25 having a concave surface facing the object side, and a cemented negative lens constructed by a double concave negative lens L26 cemented with a double convex positive lens L27. The negative meniscus lens L21 disposed to the most object side in the second lens group G2 is an aspherical lens having an aspherical surface facing the object side. The positive meniscus lens L23 disposed to the object side of the aperture stop S in the second lens group G2 is an aspherical lens having an aspherical surface formed on the object side. The double convex positive lens L27 disposed to the most image plane I side of the second lens group is an aspherical lens having an aspherical surface formed on the image plane I side.

The aperture stop S disposed in the second lens group G2 is moved to the object side in a body with the second lens group G2 upon zooming from a wide-angle end state W to a telephoto end stat T.

The cemented negative lens constructed by the double concave negative lens L26 cemented with the double convex positive lens L27 is a focusing lens group Gf, and with moving the focusing lens group Gf to the object side, focusing from an infinity object to a close object is carried out.

The cemented positive lens constructed by the double convex positive lens L24 cemented with the negative meniscus lens L25 is a decentering lens group Gs, and with moving the decentering lens group Gs in a direction substantially perpendicular to the optical axis, vibration reduction is carried out.

The positive meniscus lens L23 is an auxiliary lens group Ga.

Various values associated with the optical system according to Example 10 are listed in Table 10.

TABLE 10

[Specifications]
Zoom Ratio: 2.825

| | W | M | T |
|---|---|---|---|
| f = | 10.30 | 17.30 | 29.10 |
| FNO = | 3.57 | 4.27 | 5.80 |
| 2ω = | 77.45 | 49.72 | 30.58 |
| Y = | 7.96 | 7.96 | 7.96 |
| TL = | 74.59 | 69.93 | 76.27 |
| Bf = | 19.7396 | 28.1183 | 42.2423 |

[Lens Data]

| i | r | d | nd | vd |
|---|---|---|---|---|
| 1 | 18.4021 | 1.30 | 1.85135 | 40.10 |
| 2* | 9.4660 | 5.19 | | |
| 3 | 106.6621 | 1.00 | 1.88300 | 40.76 |
| 4 | 12.4920 | 1.75 | | |
| 5 | 18.3528 | 1.77 | 1.84666 | 23.78 |
| 6 | 28.9480 | 0.65 | | |
| 7 | 17.1399 | 2.08 | 1.80809 | 22.79 |
| 8 | 32.7787 | (d8) | | |
| 9* | 15.0062 | 0.80 | 1.83441 | 37.28 |
| 10 | 9.9310 | 1.70 | 1.74100 | 52.67 |
| 11 | 36.5917 | 4.24 | | |
| 12* | 20.2806 | 1.24 | 1.58913 | 61.25 |
| 13 | 519.9944 | 0.80 | | |
| 14 | ∞ | 1.00 | Aperture Stop S | |

TABLE 10-continued

| | | | | |
|---|---|---|---|---|
| 15 | 33.1718 | 2.09 | 1.61720 | 54.01 |
| 16 | −13.7000 | 1.00 | 1.74077 | 27.78 |
| 17 | −47.2996 | 0.81 | | |
| 18 | ∞ | 1.00 | | |
| 19 | −12.0144 | 0.80 | 1.83400 | 37.16 |
| 20 | 10.7146 | 3.37 | 1.73077 | 40.50 |
| 21* | −14.3627 | (Bf) | | |

[Aspherical Data]

Surface Number: 2

κ = −0.8688
A4 = 2.2426E−04
A6 = −1.1858E−07
A8 = 2.0865E−09
A10 = 0.0000E+00

Surface Number: 9

κ = 1.5382
A4 = −4.3414E−05
A6 = 1.8507E−08
A8 = −3.1873E−08
A10 = 9.2225E−10

Surface Number: 12

κ = 1.0000
A4 = 6.9511E−05
A6 = 8.0932E−07
A8 = −2.7525E−09
A10 = 0.0000E+00

Surface Number: 21

κ = 1.0000
A4 = 7.5377E−05
A6 = 6.6313E−07
A8 = 0.0000E+00
A10 = 0.0000E+00

| W | M | T |
|---|---|---|
| [Variable Distances upon Zooming] | | |
| f = 10.3000 | 17.3001 | 29.1002 |
| d8 = 22.2705 | 9.2305 | 1.4500 |
| Bf = 19.7396 | 28.1183 | 42.2423 |
| [Moving Amount of Focusing Lens Group] | | |
| f = 10.3000 | 17.3001 | 29.1002 |
| ΔFx = −0.07189 | −0.0883 | −0.0984 |

[Lens Group Data]

| Group | I | Focal Length |
|---|---|---|
| 1 | 1 | −16.6530 |
| 2 | 9 | 19.9329 |

[Values for Conditional Expressions]

fw = 10.3000
ft = 29.0999
ff = −52.4471
fs = 40.0000
fa = 35.7888
d12 = 5.1881
fγw = −1.4369
(1) fa/fs = 0.8947
(2) |fw/ff| = 0.1964
(3) |fγw| = 1.4369
(4) ff/fs = −1.3112
(5) (d12)/ft = 0.178

Figure 38A:
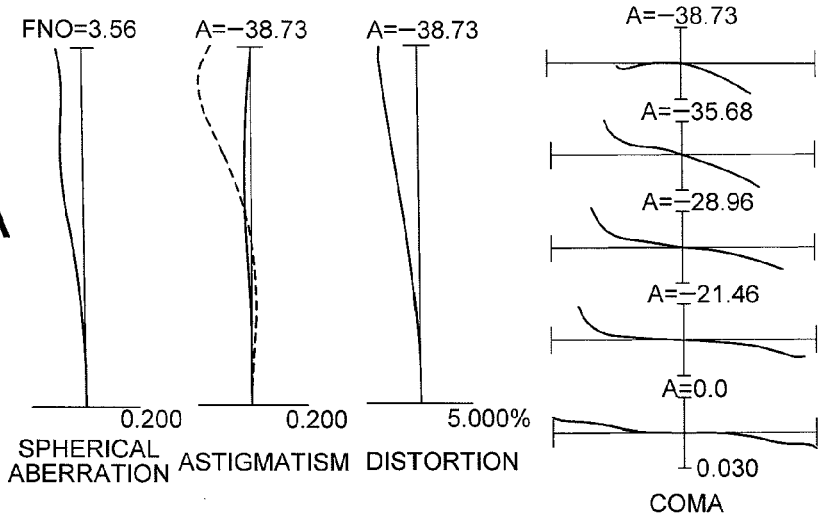
Figure 38B:
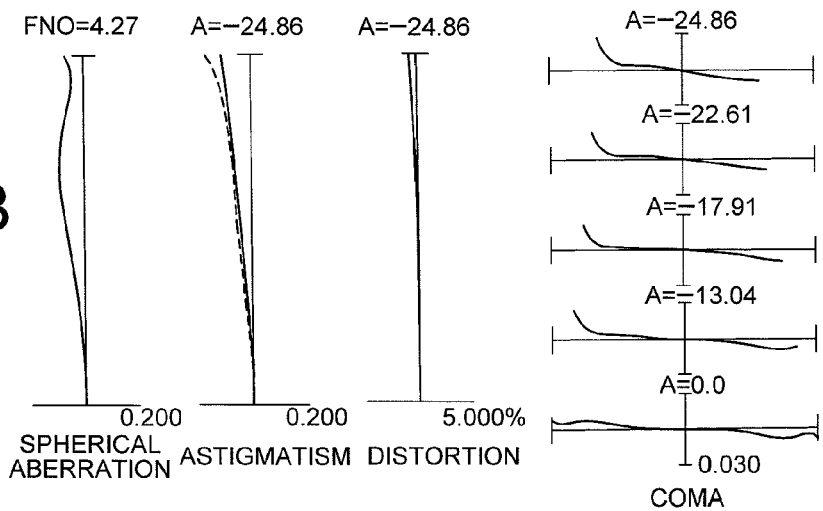
Figure 38C:
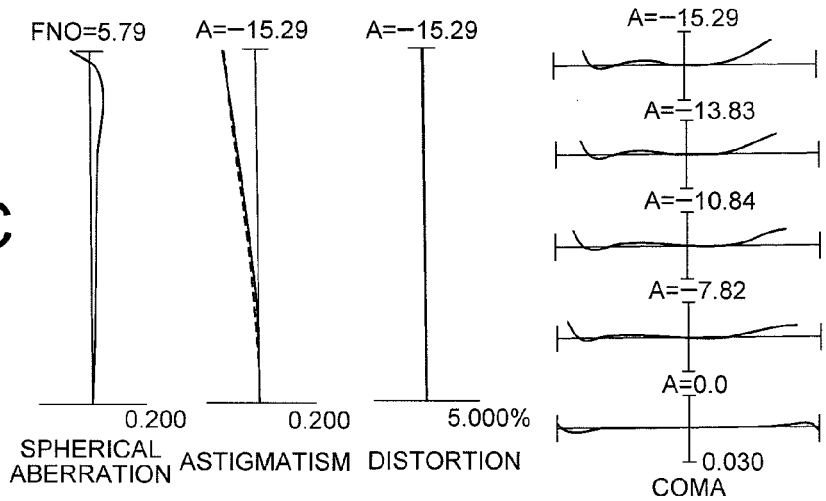
Figure 39A:
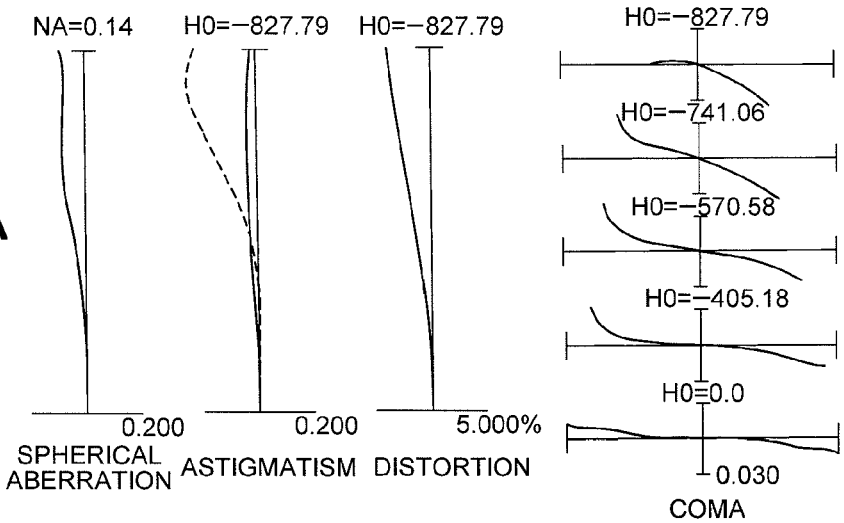
Figure 39B:
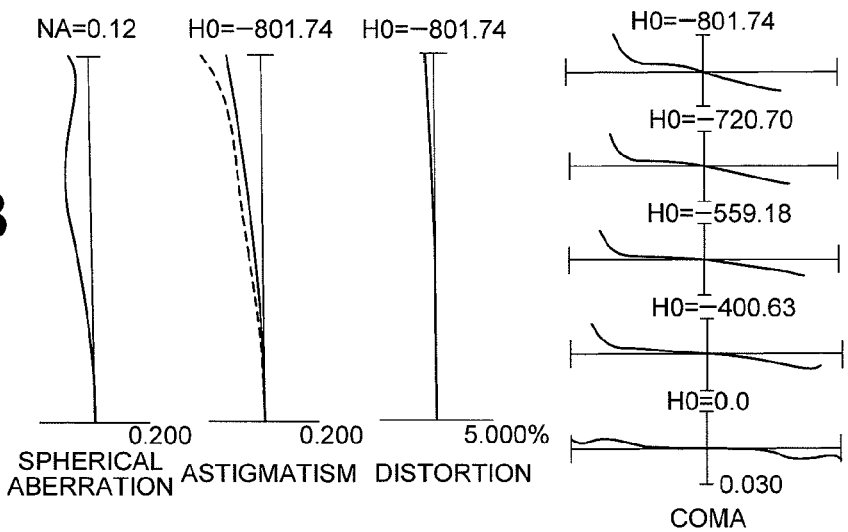
Figure 39C:
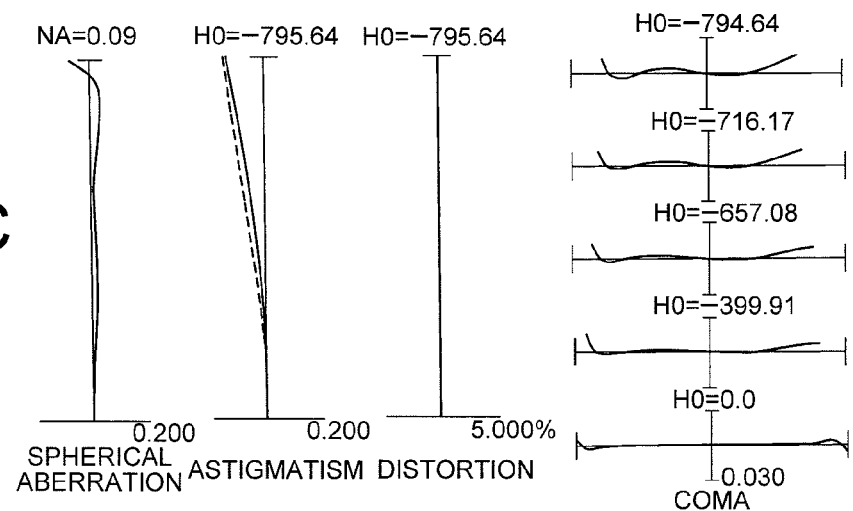
Figure 40A:
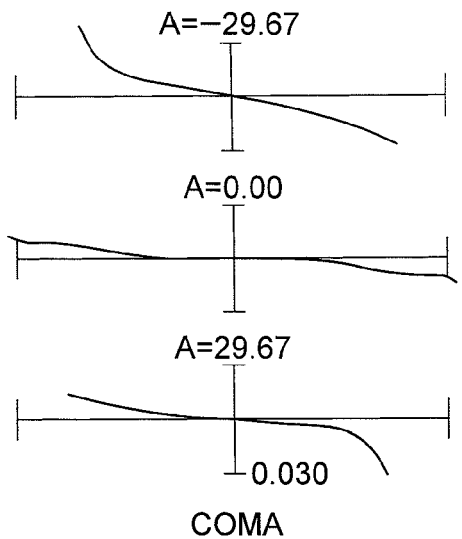
Figure 40B:
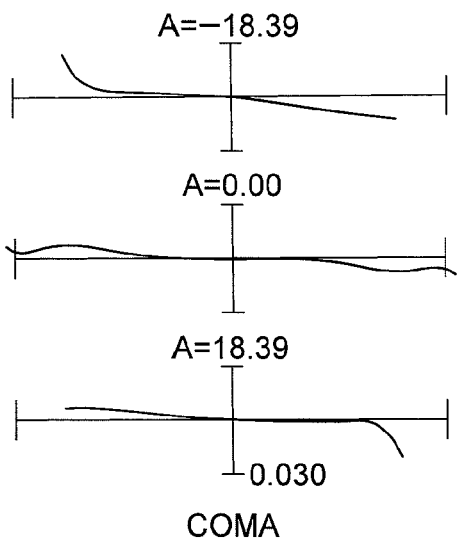
Figure 40C:
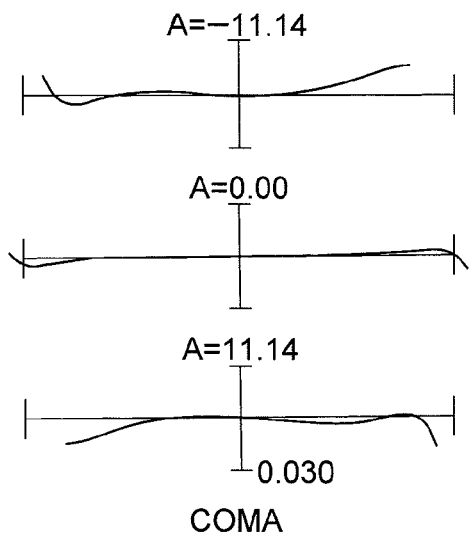

FIGS. 38A, 38B, and 38C are graphs showing various aberrations of the optical system according to Example 10 focusing on infinity, in which FIG. 38A is in a wide-angle end state, FIG. 383 is in an intermediate focal length state, and FIG. 38C is in a telephoto end state. FIGS. 39A, 39B, and 39C are graphs showing various aberrations of the optical system according to Example 10 focusing on a close object (shooting magnification is −0.01), in which FIG. 39A is in the wide-angle end state, FIG. 39B is in the intermediate focal length state, and FIG. 39C is in the telephoto end state. FIGS. 40A, 40B, and 40C are graphs showing coma of the optical system according to Example 10 upon shifting a decentering lens group (0.2 mm) focusing on infinity, in which FIG. 40A is in the wide-angle end state, FIG. 40B is in the intermediate focal length state, and FIG. 40C is in the telephoto end state.

As is apparent from the respective graphs, the optical system according to Example 10 shows superb optical performance as a result of good corrections to various aberrations in each focal length state from the wide-angle end state through the telephoto end state.

Example 11

Figure 41:
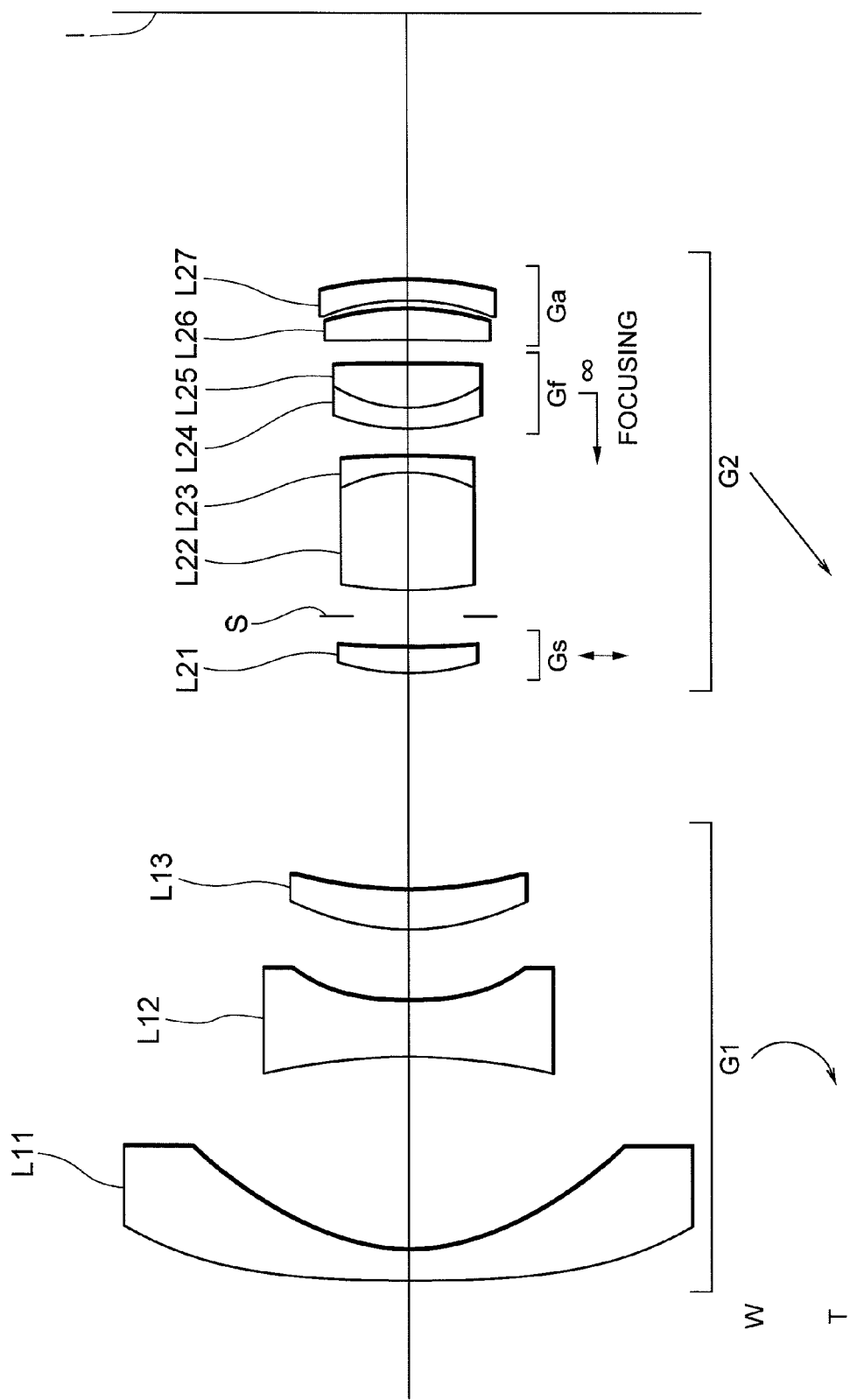
FIG. 41 is a sectional view showing a lens configuration of an optical system according to Example 11.

FIG. 41 is a sectional view showing a lens configuration of an optical system according to Example 11.

As shown in FIG. 41, the optical system according to Example 11 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a double concave negative lens L12, and a positive meniscus lens L13 having a convex surface facing the object side. The negative meniscus lens L11 disposed to the most object side in the first lens group G1 is an aspherical lens having aspherical surfaces formed on both sides. The double concave negative lens L12 in the first lens group G1 is an aspherical lens having an aspherical surface formed on the image plane I side.

The second lens group G2 is composed of, in order from the object side along the optical axis, a positive meniscus lens L21 having a convex surface facing the object side, an aperture stop S, a cemented positive lens constructed by a double convex positive lens L22 cemented with a negative meniscus lens L23 having a concave surface facing the object side, a cemented positive lens constructed by a negative meniscus lens L24 having a convex surface facing the object side cemented with a double convex positive lens L25, a positive meniscus lens L26 having a convex surface facing the image plane I side, and a negative meniscus lens L27 having a convex surface facing the image plane I side. The negative meniscus lens L27 disposed to the most image plane I side in the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The cemented positive lens constructed by the negative meniscus lens L24 cemented with the double convex positive lens L25 is a focusing lens group Gf, and with moving the focusing lens group Gf to the object side, focusing from an infinity object to a close object is carried out.

The positive meniscus lens L21 is a decentering lens group Gs, and with moving the decentering lens group Gs in a direction substantially perpendicular to the optical axis, vibration reduction is carried out.

The positive meniscus lens L26 and the negative meniscus lens L27 are an auxiliary lens group Ga having positive refractive power.

Various values associated with the optical system according to Example 11 are listed in Table 11.

TABLE 11

[Specifications]
Zoom Ratio: 1.828

| | W | M | T |
|---|---|---|---|
| f = | 6.90 | 9.50 | 12.61 |
| FNO = | 3.62 | 4.52 | 5.77 |
| 2ω = | 98.83 | 79.61 | 63.97 |
| Y = | 7.96 | 7.96 | 7.962 |
| TL = | 70.23 | 68.58 | 69.98 |
| Bf = | 14.6644 | 19.2561 | 24.7483 |

[Lens Data]

| i | r | d | nd | vd |
|---|---|---|---|---|
| 1* | 65.6582 | 1.80 | 1.76802 | 49.23 |
| 2* | 11.1606 | 10.60 | | |
| 3 | −41.8065 | 3.20 | 1.76802 | 49.23 |
| 4* | 17.5136 | 3.80 | | |
| 5 | 14.4408 | 2.30 | 1.92286 | 20.88 |
| 6 | 23.0940 | (d6) | | |
| 7 | 13.2190 | 1.50 | 1.75500 | 52.32 |
| 8 | 37.9290 | 1.60 | | |
| 9 | ∞ | 1.50 | | |
| 10 | 21.6826 | 6.50 | 1.49782 | 82.56 |
| 11 | −9.3713 | 1.00 | 1.88300 | 40.77 |
| 12 | −50.0183 | 1.42 | | |
| 13 | 11.9486 | 1.20 | 1.90366 | 31.31 |
| 14 | 7.9899 | 2.50 | 1.49782 | 82.56 |
| 15 | −409.7597 | 1.25 | | |
| 16 | −5817.7134 | 1.80 | 1.49782 | 82.56 |
| 17 | −17.3100 | 0.40 | | |
| 18 | −13.7854 | 1.20 | 1.76802 | 49.23 |
| 19* | −21.3255 | (Bf) | | |

[Aspherical Data]

Surface Number: 1

$\kappa$ = 11.2695
A4 = 6.5208E−08
A6 = 4.5111E−09
A8 = 0.0000E+00
A10 = 0.0000E+00

Surface Number: 2

$\kappa$ = −0.6591
A4 = 0.0000E+00
A6 = 0.0000E+00
A8 = 0.0000E+00
A10 = 0.0000E+00

Surface Number: 4

$\kappa$ = 2.7380
A4 = 1.5432E−04
A6 = 3.8186E−07
A8 = 0.0000E+00
A10 = 0.0000E+00

Surface Number: 19

$\kappa$ = −21.6774
A4 = −1.3542E−04
A6 = 5.0739E−06
A8 = −6.2280E−08
A10 = 0.0000E+00

TABLE 11-continued

| | W | M | T |
|---|---|---|---|
| [Variable Distances upon Zooming] | | | |
| f = | 6.9000 | 9.5000 | 12.6100 |
| d6 = | 11.9986 | 5.7487 | 1.6581 |
| Bf = | 14.6644 | 19.2561 | 24.7483 |
| [Moving Amount of Focusing Lens Group] | | | |
| f = | 6.9000 | 9.5000 | 12.6100 |
| ΔFx = | 0.1039 | 0.1452 | 0.2194 |

[Lens Group Data]

| Group | I | Focal Length |
|---|---|---|
| 1 | 1 | −9.4458 |
| 2 | 7 | 16.6813 |

[Values for Conditional Expressions]

fw = 6.9000
ft = 12.6100
ff = 35.2637
fs = 26.1912
fa = 101.5495
d12 = 10.6000
fyw = 0.6637
(1) fa/fs = 3.8772
(2) |fw/ff| = 0.1957
(3) |fyw| = 0.6637
(4) ff/fs = 1.3464
(5) (d12)/ft = 0.8406

Figure 42A:
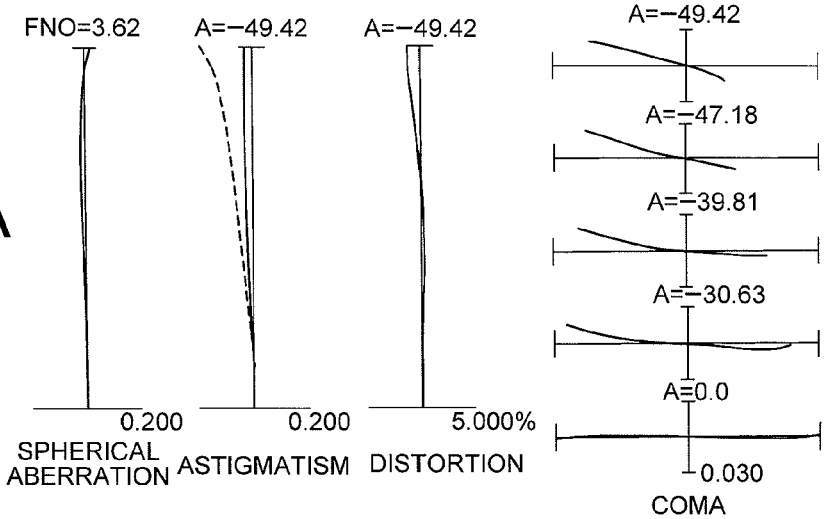
Figure 42B:
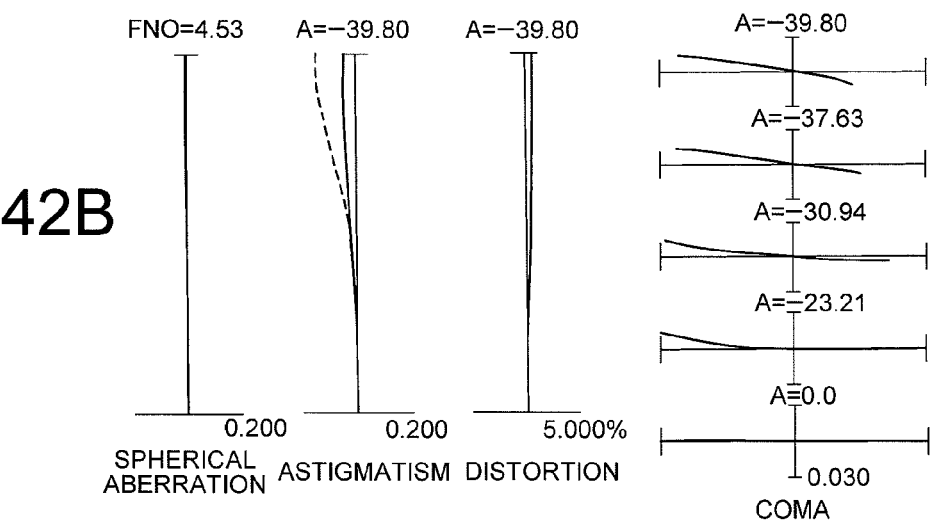
Figure 42C:
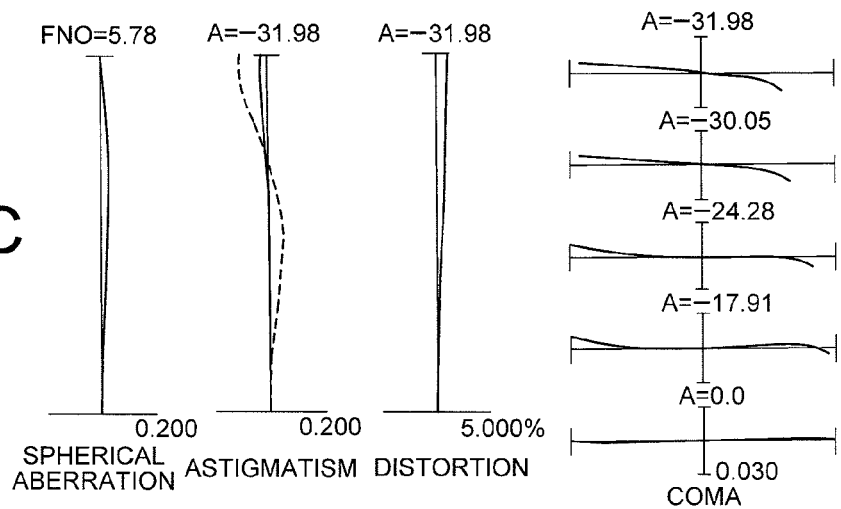
Figure 43A:
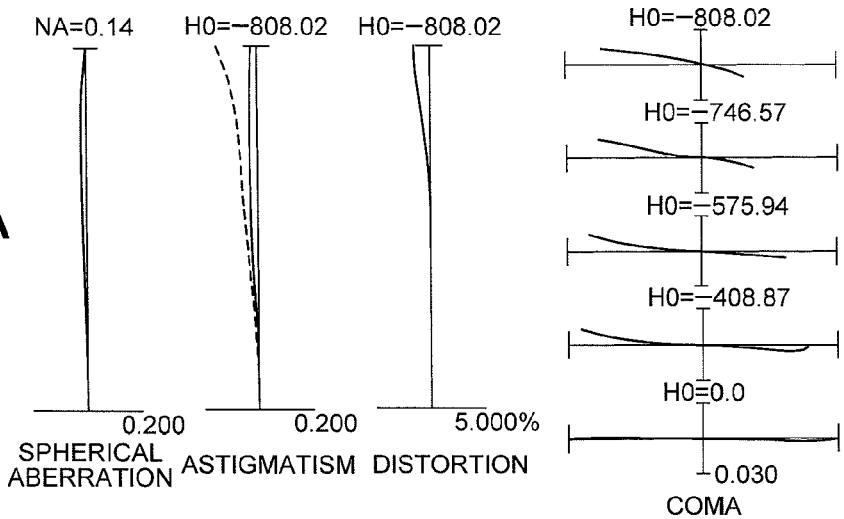
Figure 43B:
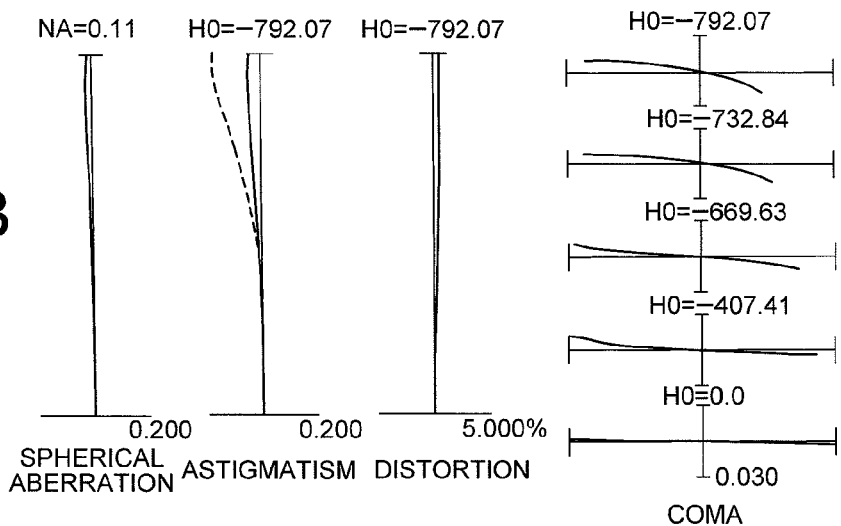
Figure 43C:
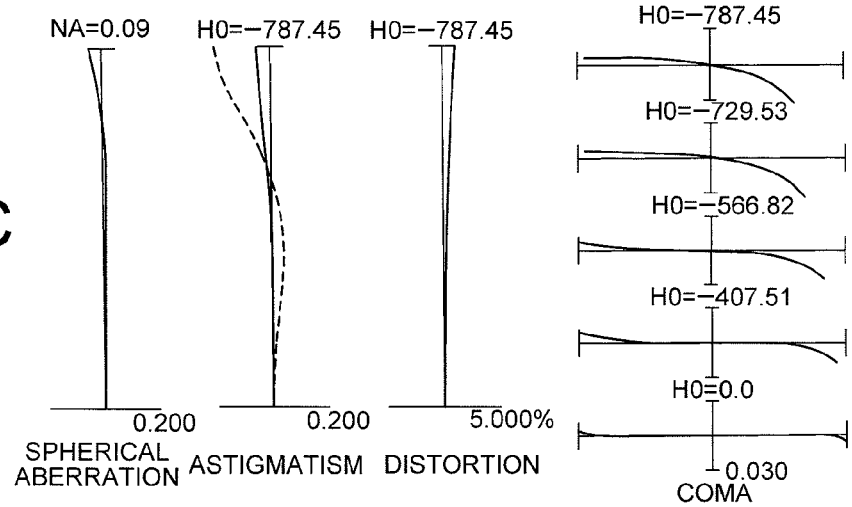
Figure 44A:
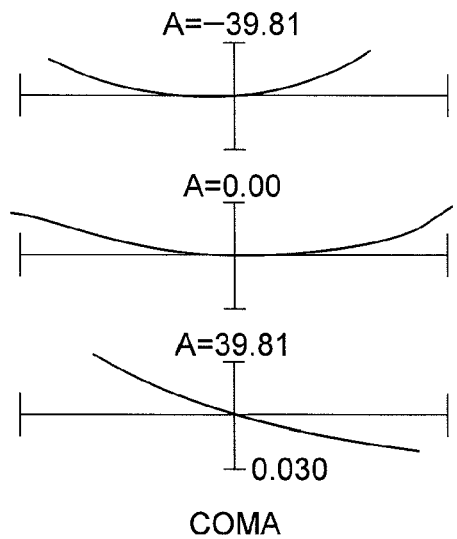
Figure 44B:
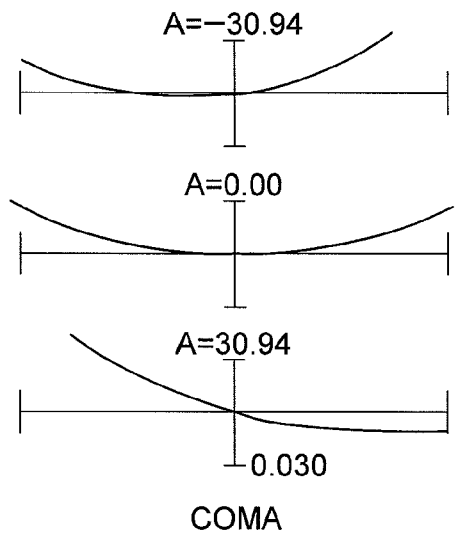
Figure 44C:
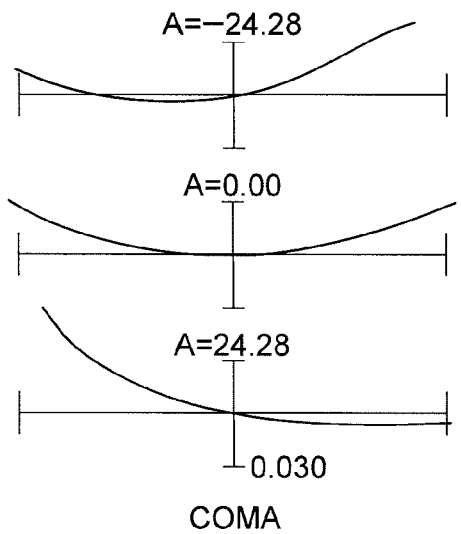

FIGS. 42A, 42B, and 42C are graphs showing various aberrations of the optical system according to Example 11 focusing on infinity, in which FIG. 42A is in a wide-angle end state, FIG. 42B is in an intermediate focal length state, and FIG. 42C is in a telephoto end state. FIGS. 43A, 43B, and 43C are graphs showing various aberrations of the optical system according to Example 11 focusing on a close object (shooting magnification is −0.01), in which FIG. 43A is in the wide-angle end state, FIG. 43B is in the intermediate focal length state, and FIG. 43C is in the telephoto end state. FIGS. 44A, 44B, and 44C are graphs showing coma of the optical system according to Example 11 upon shifting a decentering lens group (0.2 mm) focusing on infinity, in which FIG. 44A is in the wide-angle end state, FIG. 44B is in the intermediate focal length state, and FIG. 44C is in the telephoto end state.

As is apparent from the respective graphs, the optical system according to Example 11 shows superb optical performance as a result of good corrections to various aberrations in each focal length state from the wide-angle end state through the telephoto end state.

Example 12

Figure 45:
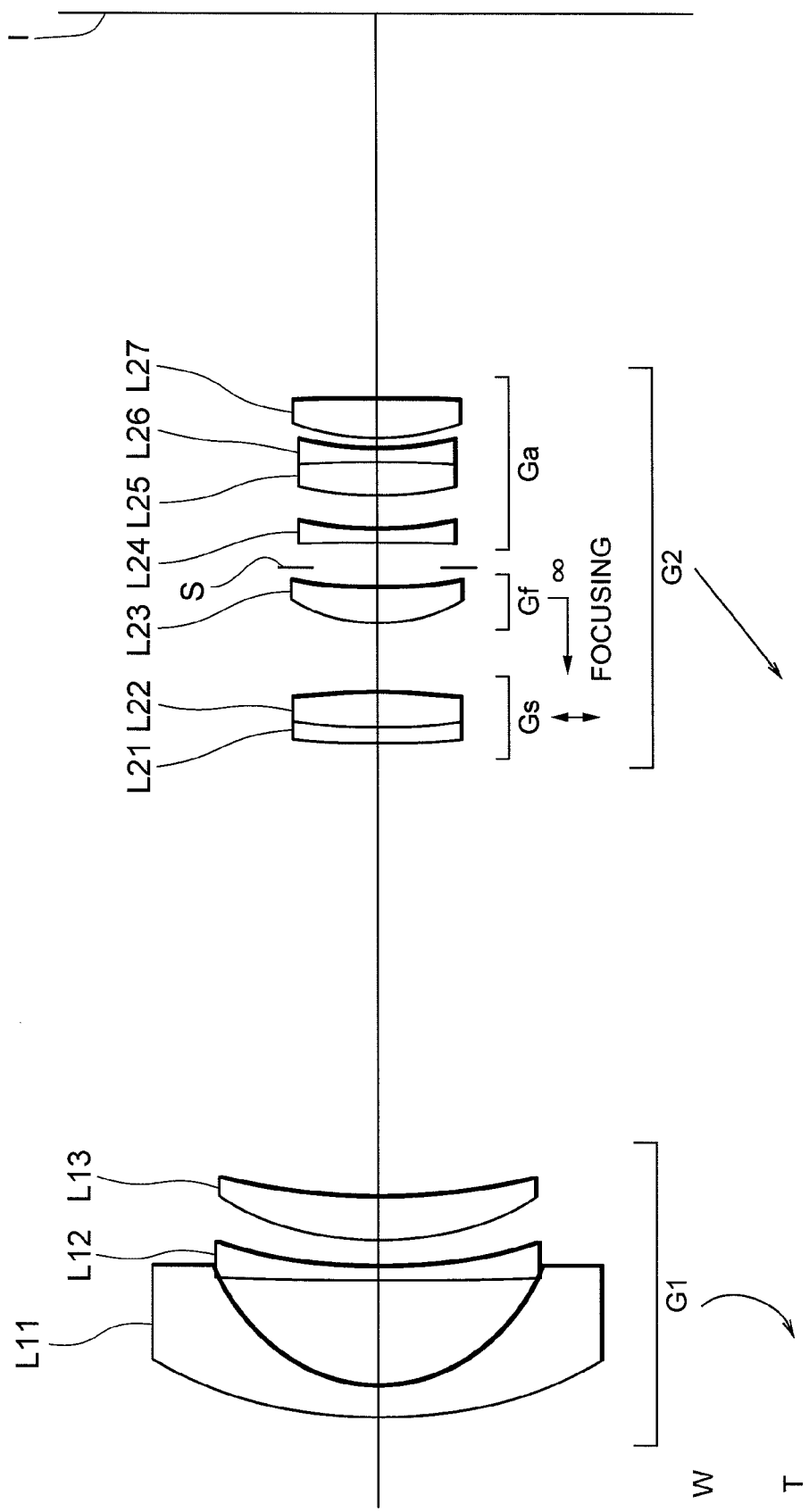
FIG. 45 is a sectional view showing a lens configuration of an optical system according to Example 12.

FIG. 45 is a sectional view showing a lens configuration of an optical system according to Example 12.

As shown in FIG. 45, the optical system according to Example 12 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a negative meniscus lens L12 having a convex surface facing the object side, and a positive meniscus lens L13 having a convex surface facing the object side. The negative meniscus lens L11 disposed to the most object side in the first lens group G1 is an aspherical lens having an aspherical surface formed on an image plane I side.

The second lens group G2 is composed of, in order from the object side along the optical axis, a cemented positive lens constructed by a negative meniscus lens L21 having a convex surface facing the object side cemented with a double convex positive lens L22, a positive meniscus lens L23 having a convex surface facing the object side, an aperture stop S, a double concave negative lens L24, a cemented negative lens constructed by a double convex positive lens L25 cemented with a double concave negative lens L26, and a double convex positive lens L27. The double concave negative lens L24 disposed in the second lens group G2 is an aspherical lens having an aspherical surface formed on the image plane I side. The double concave negative lens L27 disposed to the most image plane I side of the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The positive meniscus lens L23 is a focusing lens group Gf, and with moving the focusing lens group Gf to the object side, focusing from an infinity object to a close object is carried out.

The cemented positive lens constructed by the negative meniscus lens L21 cemented with the double convex positive lens L22 is a decentering lens group Gs, and with moving the decentering lens group Gs in a direction substantially perpendicular to the optical axis, vibration reduction is carried out.

The double concave negative lens L24, the cemented negative lens constructed by the double convex positive lens L25 cemented with the double concave negative lens L26, and the double convex positive lens L27 are an auxiliary lens group Ga having positive refractive power.

Various values associated with the optical system according to Example 12 are listed in Table 12.

TABLE 12

[Specifications]
Zoom Ratio: 2.825

|  | W | M | T |
|---|---|---|---|
| f = | 10.30 | 18.75 | 29.10 |
| FNO = | 3.64 | 4.59 | 5.86 |
| 2ω = | 78.83 | 46.51 | 30.69 |
| Y = | 7.96 | 7.96 | 7.96 |
| TL = | 73.78 | 67.23 | 71.78 |
| Bf = | 20.0062 | 29.3544 | 40.8045 |

[Lens Data]

| i | r | d | nd | νd |
|---|---|---|---|---|
| 1 | 25.0000 | 1.80 | 1.77377 | 47.17 |
| 2* | 8.2000 | 5.44 | | |
| 3 | 195.9606 | 0.80 | 1.75500 | 52.32 |
| 4 | 27.4972 | 1.32 | | |
| 5 | 16.4792 | 2.39 | 1.84666 | 23.78 |
| 6 | 33.0474 | (d6) | | |
| 7 | 48.1225 | 0.80 | 1.80810 | 22.76 |
| 8 | 29.9061 | 1.89 | 1.65160 | 58.55 |
| 9 | −48.2389 | 2.96 | | |
| 10 | 9.6847 | 1.93 | 1.60300 | 65.44 |
| 11 | 26.0017 | 1.00 | | |
| 12 | ∞ | 1.30 | Aperture Stop S | |
| 13 | −34215.1520 | 0.80 | 1.82080 | 42.71 |

TABLE 12-continued

| 14* | 16.7358 | 1.76 | | |
|---|---|---|---|---|
| 15 | 20.3058 | 1.72 | 1.49700 | 81.54 |
| 16 | −90.6802 | 0.80 | 1.83400 | 37.16 |
| 17 | 17.5527 | 0.44 | | |
| 18 | 12.3817 | 2.16 | 1.66910 | 55.42 |
| 19* | −74.1839 | (Bf) | | |

[Aspherical Data]

Surface Number: 2

κ = 0.6129
A4 = 1.9233E−05
A6 = 1.4470E−07
A8 = 1.3914E−09
A10 = 1.5950E−12

Surface Number: 14

κ = 0.1365
A4 = −3.4023E−05
A6 = 1.6026E−06
A8 = −2.1064E−07
A10 = 7.1553E−09

Surface Number: 19

κ = −8.5088
A4 = 2.4559E−04
A6 = 2.7667E−06
A8 = −3.1696E−08
A10 = 4.6513E−10

|  | W | M | T |
|---|---|---|---|
| [Variable Distances upon Zooming] | | | |
| f = | 10.3000 | 18.7500 | 29.1000 |
| d6 = | 23.7984 | 7.8948 | 1.0000 |
| Bf = | 20.0062 | 29.3544 | 40.8045 |
| [Moving Amount of Focusing Lens Group] | | | |
| f = | 10.3000 | 18.7500 | 29.1000 |
| ΔFx = | 0.0603 | 0.0996 | 0.1542 |

[Lens Group Data]

| Group | I | Focal Length |
|---|---|---|
| 1 | 1 | −18.1260 |
| 2 | 7 | 20.0528 |

[Values for Conditional Expressions]

fw = 10.3000
ft = 29.1000
ff = 24.5020
fs = 40.2798
fa = −149.0129
d12 = 5.4400
ffw = 1.7079
(1) fa/fs = −3.6994
(2) |fw/ff| = 0.4204
(3) |ffw| = 1.7079
(4) ff/fs = 0.6083
(5) (d12)/ft = 0.1869

Figure 46A:
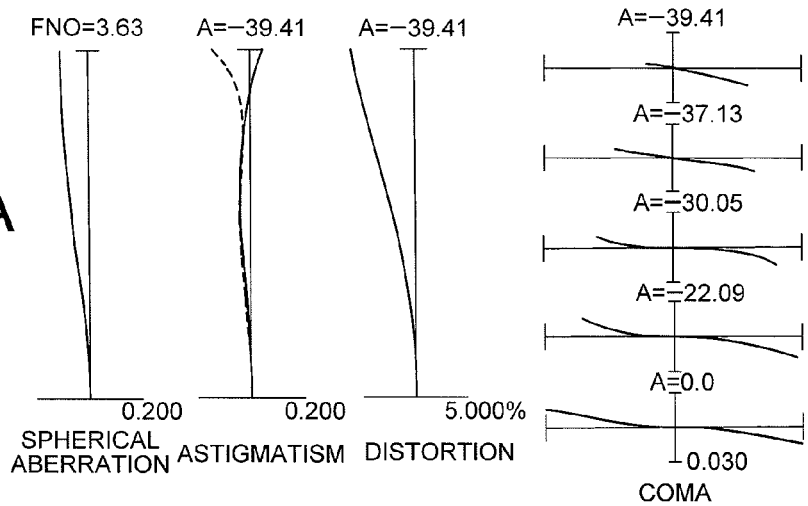
Figure 46B:
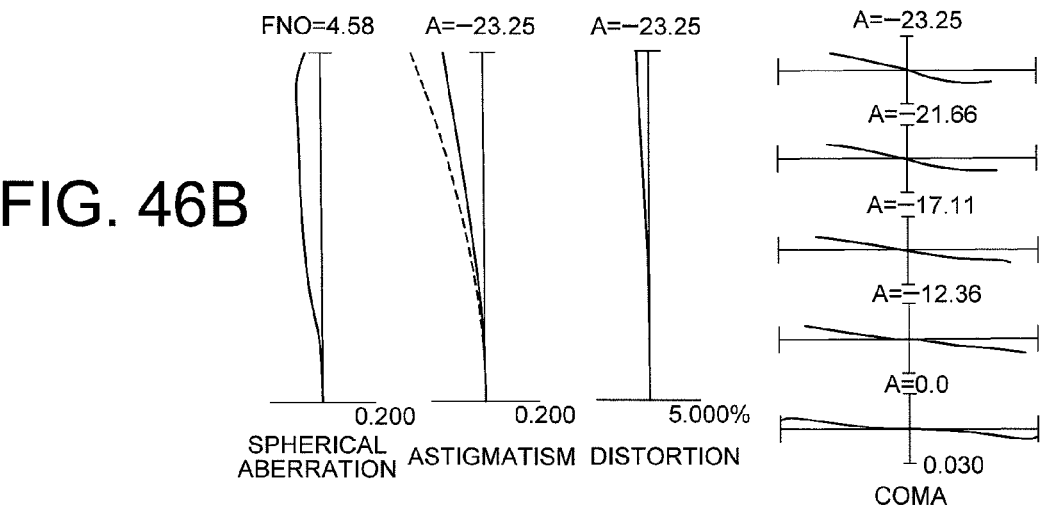
Figure 46C:
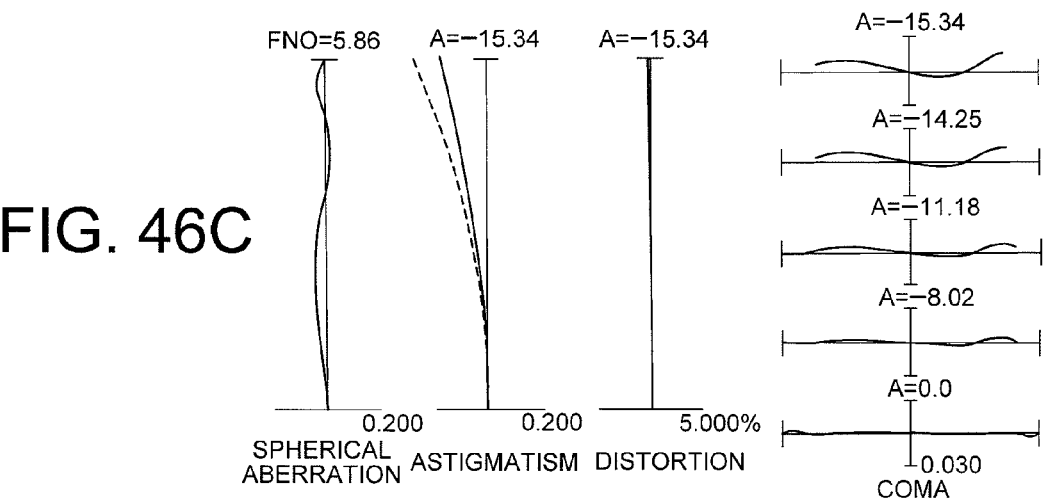
Figure 47A:
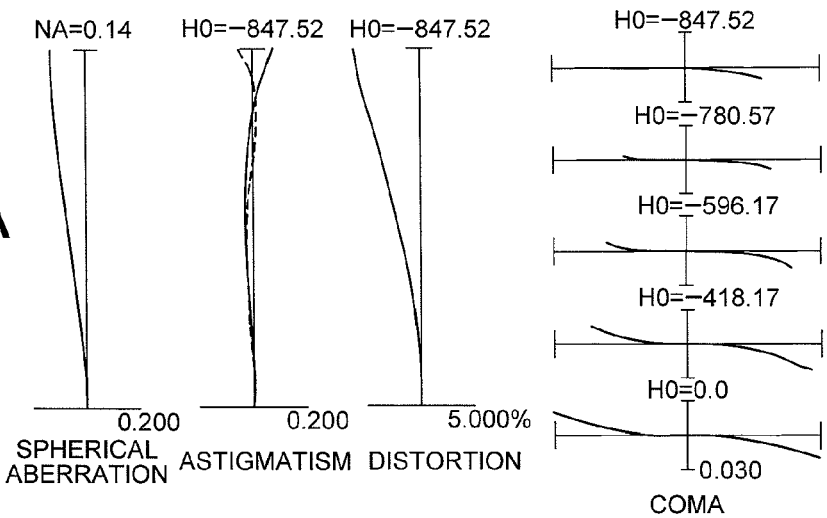
Figure 47B:
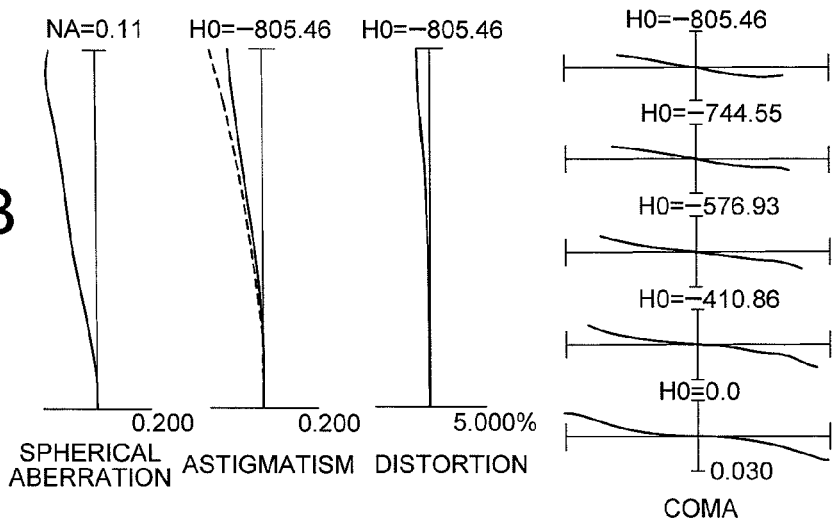
Figure 47C:
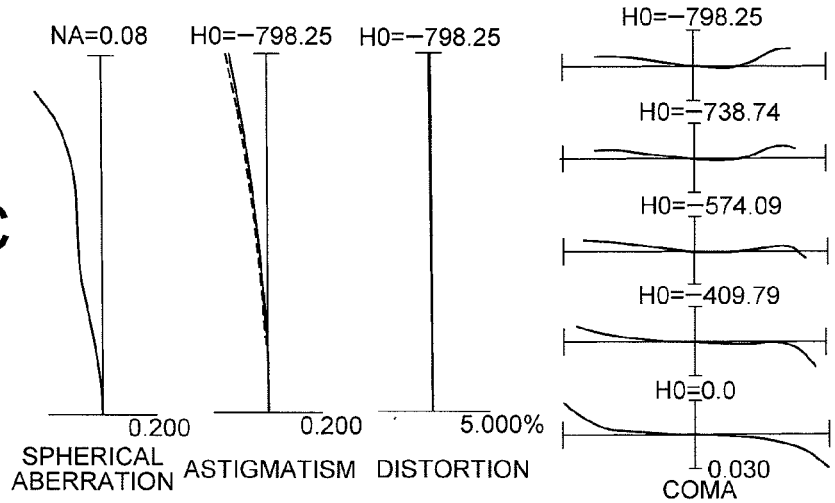
Figure 48A:
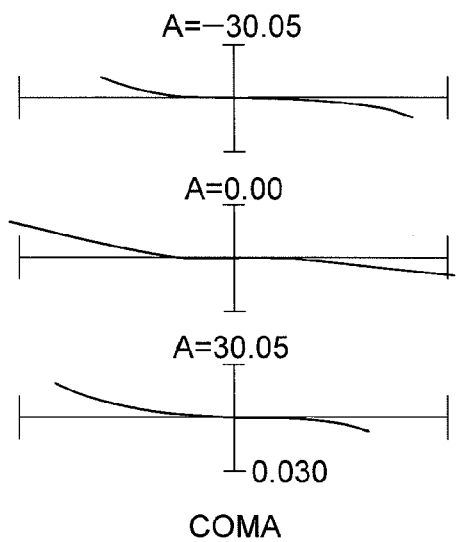
Figure 48B:
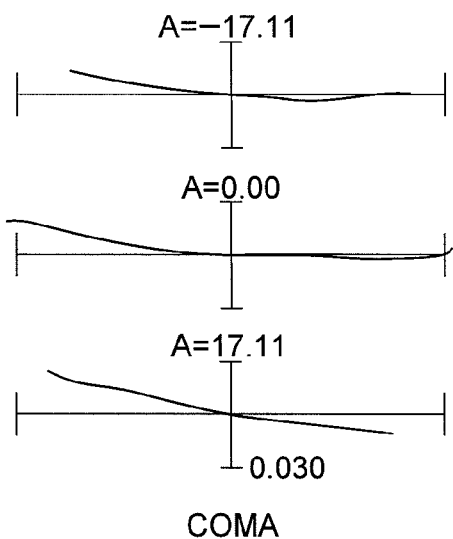
Figure 48C:
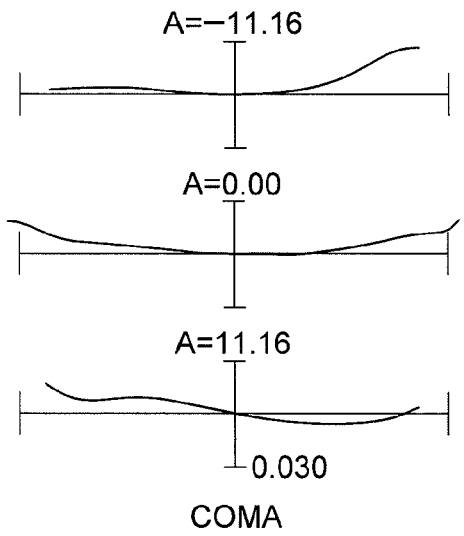

FIGS. 46A, 46B, and 46C are graphs showing various aberrations of the optical system according to Example 12 focusing on infinity, in which FIG. 46A is in a wide-angle end state, FIG. 46B is in an intermediate focal length state, and FIG. 46C is in a telephoto end state. FIGS. 47A, 47B, and 47C are graphs showing various aberrations of the optical system according to Example 12 focusing on a close object (shooting magnification is −0.01), in which FIG. 47A is in the wide-angle end state, FIG. 47B is in the intermediate focal length state, and FIG. 47C is in the telephoto end state. FIGS. 48A, 48B, and 48C are graphs showing coma of the optical system according to Example 12 upon shifting a decentering lens group (0.2 mm) focusing on infinity, in which FIG. 48A is in the wide-angle end state, FIG. 48B is in the intermediate focal length state, and FIG. 48C is in the telephoto end state.

As is apparent from the respective graphs, the optical system according to Example 12 shows superb optical performance as a result of good corrections to various aberrations in each focal length state from the wide-angle end state through the telephoto end state.

Example 13

FIG. 49 is a sectional view showing a lens configuration of an optical system according to Example 13.

As shown in FIG. 49, the optical system according to Example 13 is composed of, in order from an object side along an optical axis, a first lens group G1 having negative refractive power, and a second lens group G2 having positive refractive power. Upon zooming from a wide-angle end state W to a telephoto end state T, the first lens group G1 and the second lens group G2 move such that a distance between the first lens group G1 and the second lens group G2 decreases.

The first lens group G1 is composed of, in order from the object side along the optical axis, a negative meniscus lens L11 having a convex surface facing the object side, a double concave negative lens L12, a positive meniscus lens L13 having a convex surface facing the object side, and a positive meniscus lens L14 having a convex surface facing the object side. The negative meniscus lens L11 disposed to the most object side in the first lens group G1 is an aspherical lens having an aspherical surface facing the image plane I side.

The second lens group G2 is composed of, in order from the object side along the optical axis, a cemented positive lens constructed by a negative meniscus lens L21 having a convex surface facing the object side cemented with a double convex positive lens L22, an aperture stop S, a positive meniscus lens L23 having a convex surface facing the object side, a positive meniscus lens L24 having a convex surface facing the object side, a cemented negative lens constructed by a positive meniscus lens L25 having a concave surface facing the object side cemented with a double concave negative lens L26, and a double convex positive lens L27. The positive meniscus lens L24 in the second lens group G2 is an aspherical lens having an aspherical surface formed on the image plane I side. The double convex positive lens L27 disposed to the most image plane I side in the second lens group G2 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The positive meniscus lens L24 is a focusing lens group Gf, and with moving the focusing lens group Gf to the object side, focusing from an infinity object to a close object is carried out.

The cemented positive lens constructed by the negative meniscus lens L21 cemented with the double convex positive lens L22 is a decentering lens group Gs, and with moving the decentering lens group Gs in a direction substantially perpendicular to the optical axis, vibration reduction is carried out.

The positive meniscus lens L23 is an auxiliary lens group Ga.

Various values associated with the optical system according to Example 13 are listed in Table 13.

TABLE 13

| [Specifications] | | | |
|---|---|---|---|
| Zoom Ratio: 2.825 | | | |
| | W | M | T |
| f = | 10.30 | 18.75 | 29.10 |
| FNO = | 3.64 | 4.57 | 5.86 |
| 2ω = | 78.82 | 46.27 | 30.58 |
| Y = | 7.96 | 7.96 | 7.96 |
| TL = | 75.78 | 69.22 | 73.78 |
| Bf = | 18.4425 | 27.8042 | 39.2710 |

| [Lens Data] | | | | |
|---|---|---|---|---|
| i | r | d | nd | νd |
| 1 | 21.5900 | 1.80 | 1.77377 | 47.17 |
| 2* | 8.3834 | 5.81 | | |
| 3 | −330.2204 | 0.80 | 1.75500 | 52.32 |
| 4 | 20.4287 | 0.90 | | |
| 5 | 34.6426 | 1.58 | 1.69895 | 30.13 |
| 6 | 56.8065 | 0.20 | | |
| 7 | 17.3398 | 2.42 | 1.80518 | 25.42 |
| 8 | 40.5926 | (d8) | | |
| 9 | 38.9358 | 0.80 | 1.84666 | 23.78 |
| 10 | 20.3696 | 2.02 | 1.64000 | 60.08 |
| 11 | −52.1553 | 3.41 | | |
| 12 | ∞ | 0.40 | Aperture Stop S | |
| 13 | 8.7558 | 2.14 | 1.60300 | 65.44 |
| 14 | 11.3294 | 2.22 | | |
| 15 | 25.7295 | 1.53 | 1.77377 | 47.17 |
| 16* | 836.1941 | 1.70 | | |
| 17 | −63.5509 | 1.90 | 1.49700 | 81.54 |
| 18 | −10.3135 | 0.80 | 1.83481 | 42.71 |
| 19 | 12.9668 | 0.50 | | |
| 20 | 13.3652 | 2.59 | 1.66910 | 55.42 |
| 21* | −20.7258 | (Bf) | | |

| [Aspherical Data] |
|---|
| Surface Number: 2 |
| κ = 0.6895 |
| A4 = 2.9268E−06 |
| A6 = 5.0186E−08 |
| A8 = 2.0720E−09 |
| A10 = −2.1936E−11 |
| Surface Number: 16 |
| κ = 11.0000 |
| A4 = 1.1167E−05 |
| A6 = 1.2804E−06 |
| A8 = −9.7386E−08 |
| A10 = 2.7299E−09 |
| Surface Number: 21 |
| κ = 3.1942 |
| A4 = 1.5565E−04 |
| A6 = 1.5752E−06 |
| A8 = 1.9610E−08 |
| A10 = 9.0671E−11 |

| | W | M | T |
|---|---|---|---|
| [Variable Distances upon Zooming] | | | |
| f = | 10.3000 | 18.7500 | 29.1000 |
| d8 = | 23.8288 | 7.9040 | 1.0000 |
| Bf = | 18.4425 | 27.8042 | 39.2710 |
| [Moving Amount of Focusing Lens Group] | | | |
| f = | 10.3000 | 18.7500 | 29.1000 |
| ΔFx = | 0.0661 | 0.0871 | 0.1004 |

TABLE 13-continued

[Lens Group Data]

| Group | I | Focal Length |
|---|---|---|
| 1 | 1 | −18.1250 |
| 2 | 9 | 20.0807 |

[Values for Conditional Expressions]

fw = 10.3000
ft = 29.1000
ff = 34.2797
fs = 42.2410
fa = 48.6750
d12 = 5.8071
fγw = 1.5555
(1) fa/fs = 1.1523
(2) |fw/ff| = 0.3005
(3) |fγw| = 1.5555
(4) ff/fs = 0.8115
(5) (d12)/ft = 0.1996

Figure 50A:
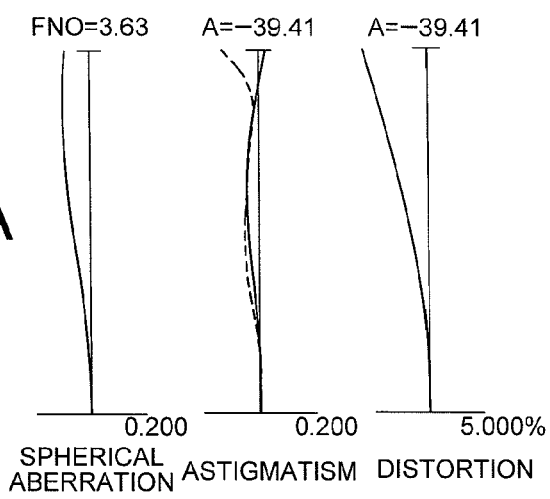
Figure 50B:
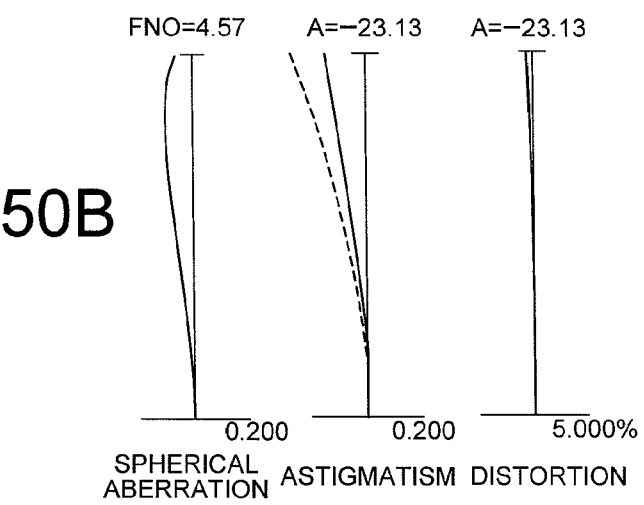
Figure 50C:
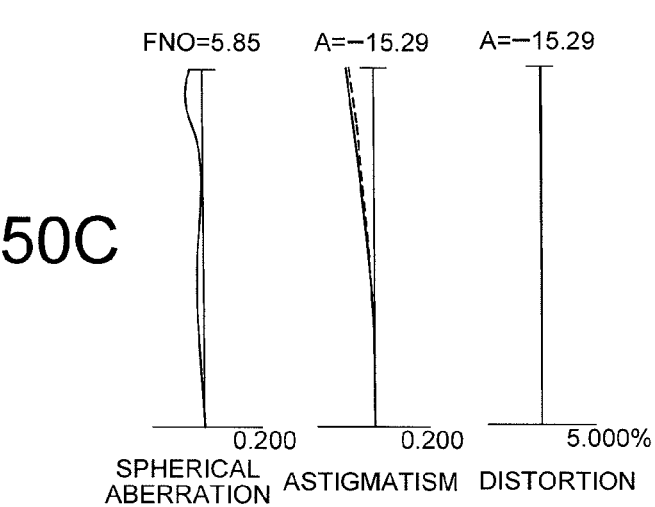
Figure 51A:
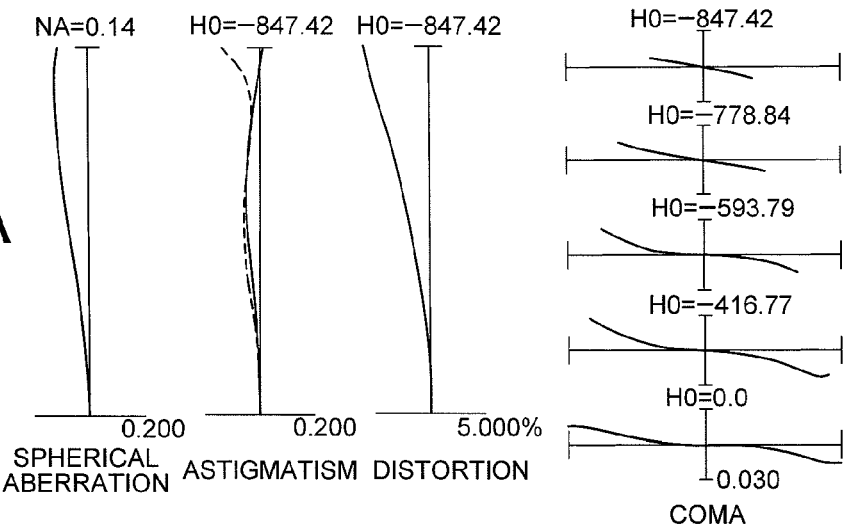
Figure 51B:
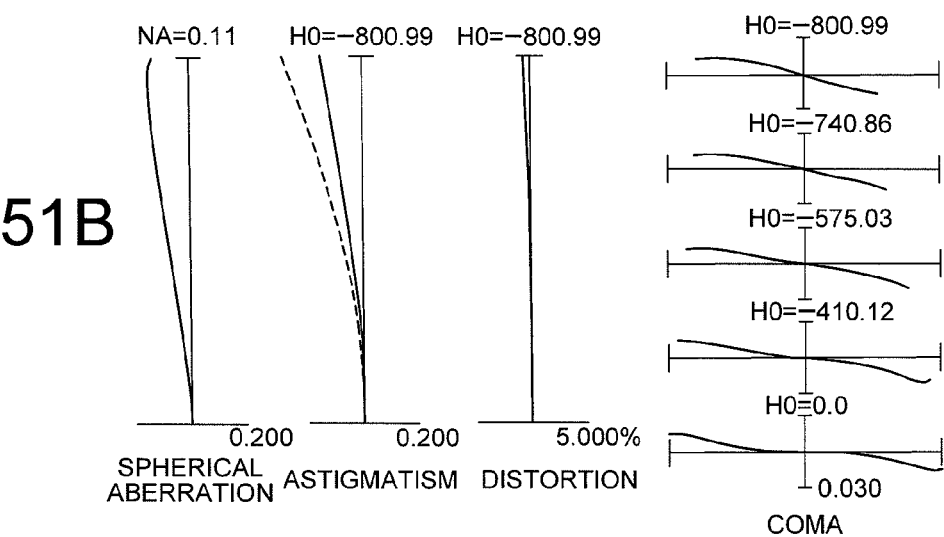
Figure 51C:
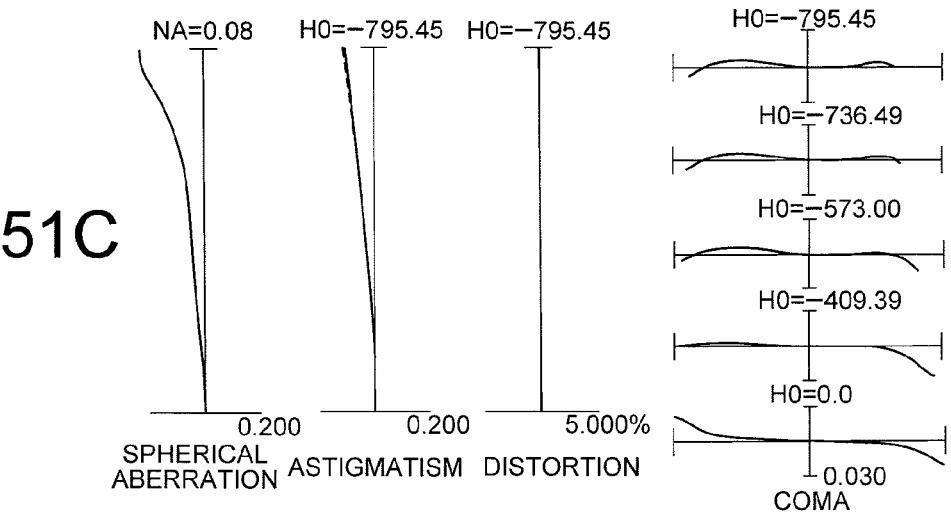
FIG. 51C is in the telephoto end state.
Figure 52A:
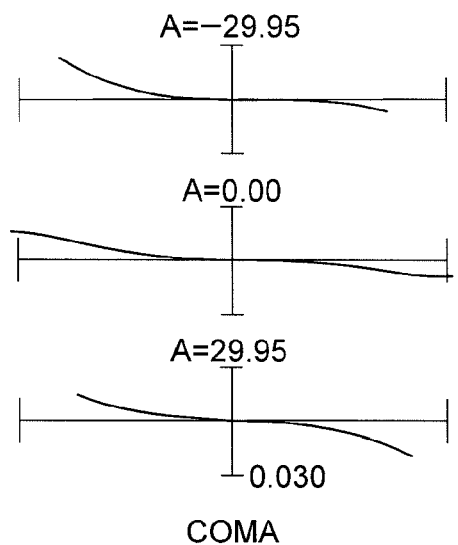
Figure 52B:
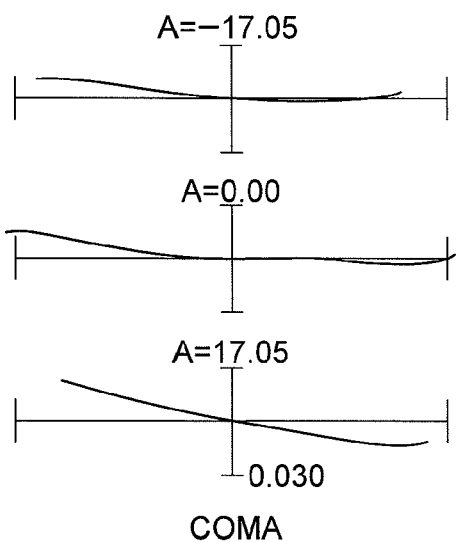
Figure 52C:
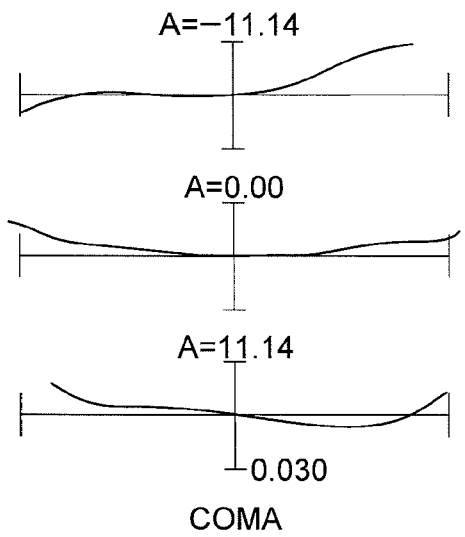

FIGS. 50A, 50B, and 50C are graphs showing various aberrations of the optical system according to Example 13 focusing on infinity, in which FIG. 50A is in a wide-angle end state, FIG. 50B is in an intermediate focal length state, and FIG. 50C is in a telephoto end state. FIGS. 51A, 51B, and 510 are graphs showing various aberrations of the optical system according to Example 13 focusing on a close object (shooting magnification is −0.01), in which FIG. 51A is in the wide-angle end state, FIG. 51B is in the intermediate focal length state, and FIG. 51C is in the telephoto end state. FIGS. 52A, 52B, and 52C are graphs showing coma of the optical system according to Example 13 upon shifting a decentering lens group (0.2 mm) focusing on infinity, in which FIG. 52A is in the wide-angle end state, FIG. 52B is in the intermediate focal length state, and FIG. 52C is in the telephoto end state.

As is apparent from the respective graphs, the optical system according to Example 13 shows superb optical performance as a result of good corrections to various aberrations in each focal length state from the wide-angle end state through the telephoto end state.

Example 14

Figure 53:
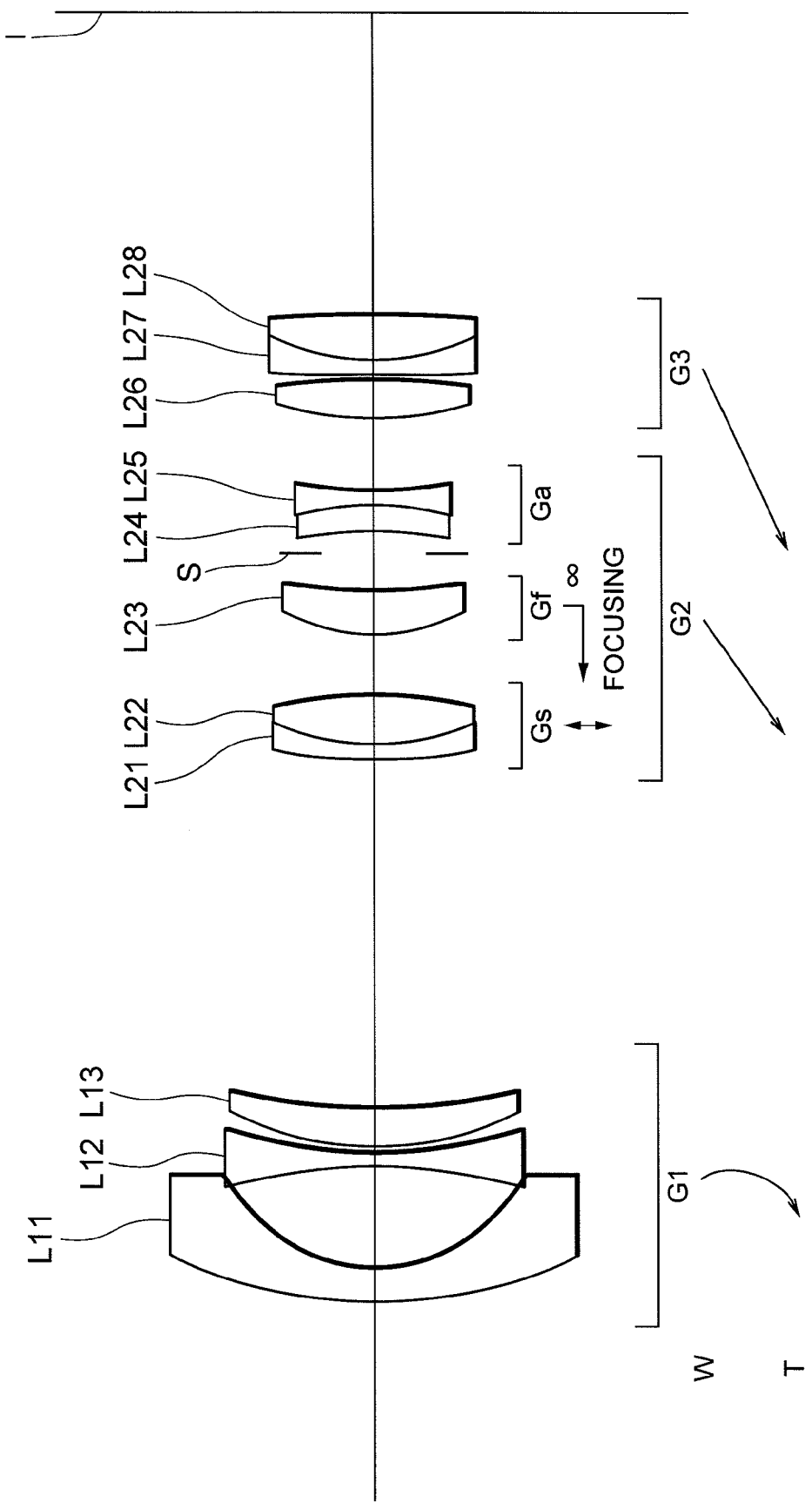
FIG. 53 is a sectional view showing a lens configuration of an optical system according to Example 14.

FIG. 53 is a sectional view showing a lens configuration of an optical system according to Example 14.

As shown in FIG. 53, the optical system according to Example 14 is composed of, in order from an object side along an optical axis, a first lens group G1 having negative refractive power, a second lens group G2 having positive refractive power, and a third lens group having positive refractive power. Upon zooming from a wide-angle end state W to a telephoto end state T, the first lens group G1, the second lens group G2, and the third lens group G3 move such that a distance between the first lens group G1 and the second lens group G2 decreases, and a distance between the second lens group G2 and the third lens group G3 decreases.

The first lens group G1 is composed of, in order from the object side along the optical axis, a negative meniscus lens L11 having a convex surface facing the object side, a double concave negative lens L12, and a positive meniscus lens L13 having a convex surface facing the object side. The negative meniscus lens L11 disposed to the most object side in the first lens group G1 is an aspherical lens having an aspherical surface facing the image plane I side.

The second lens group G2 is composed of, in order from the object side along the optical axis, a cemented positive lens constructed by a negative meniscus lens L21 having a convex surface facing the object side cemented with a double convex positive lens L22, a positive meniscus lens L23 having a convex surface facing the object side, an aperture stop S, and a cemented negative lens constructed by a positive meniscus lens L24 having a concave surface facing the object side cemented with a double concave negative lens L25. The positive meniscus lens L24 in the second lens group G2 is an aspherical lens having an aspherical surface formed on the object side.

The third lens group G3 is composed of, in order from the object side along the optical axis, a double convex positive lens L31, and a cemented negative lens constructed by a negative meniscus lens L32 having a convex surface facing the object side cemented with a double convex positive lens L33. The double convex positive lens L31 in the third lens group G3 is an aspherical lens having an aspherical surface formed on the image plane I side.

The aperture stop S disposed in the second lens group G2 is moved to the object side in a body with the second lens group G2 upon zooming from a wide-angle end state W to a telephoto end state T.

The positive meniscus lens L23 is a focusing lens group Gf, and with moving the focusing lens group Gf to the image plane I side, focusing from an infinity object to a close object is carried out.

The cemented positive lens constructed by the negative meniscus lens L21 cemented with the double convex positive lens L22 is a decentering lens group Gs, and with moving the decentering lens group Gs in a direction substantially perpendicular to the optical axis, vibration reduction is carried out.

The cemented negative lens constructed by the positive meniscus lens L24 cemented with the double concave negative lens L25 is an auxiliary lens group Ga.

Various values associated with the optical system according to Example 14 are listed in Table 14.

TABLE 14

[Specifications]
Zoom Ratio: 2.825

| | W | M | T |
|---|---|---|---|
| f = | 10.30 | 18.75 | 29.10 |
| FNO = | 3.64 | 4.23 | 5.86 |
| 2ω = | 78.78 | 46.56 | 30.67 |
| Y = | 7.96 | 7.96 | 7.96 |
| TL = | 66.55 | 62.74 | 68.78 |
| Bf = | 15.4801 | 25.2812 | 36.7848 |

[Lens Data]

| i | r | d | nd | vd |
|---|---|---|---|---|
| 1 | 25.0000 | 1.80 | 1.74330 | 49.32 |
| 2* | 8.5722 | 5.23 | | |
| 3 | −31.9974 | 0.80 | 1.49700 | 81.54 |
| 4 | 25.7099 | 0.15 | | |
| 5 | 16.2678 | 2.16 | 1.84666 | 23.78 |
| 6 | 33.0579 | (d6) | | |
| 7 | 27.3560 | 0.80 | 1.79504 | 28.69 |
| 8 | 12.7778 | 2.62 | 1.60300 | 65.44 |
| 9 | −27.7840 | 3.04 | | |
| 10 | 10.6214 | 2.34 | 1.60300 | 65.44 |
| 11 | 28.5797 | 1.86 | | |
| 12 | ∞ | 1.10 | Aperture Stop S | |
| 13* | −27.4165 | 1.37 | 1.82115 | 24.06 |
| 14 | −17.0648 | 0.80 | 1.75500 | 52.32 |
| 15 | 21.3149 | (d15) | | |

TABLE 14-continued

| | | | | |
|---|---|---|---|---|
| 16 | 18.9858 | 2.05 | 1.67790 | 54.89 |
| 17* | −30.4460 | 0.15 | | |
| 18 | 155.5536 | 0.80 | 1.85026 | 32.35 |
| 19 | 12.8042 | 2.38 | 1.60300 | 65.44 |
| 20 | −74.1840 | (Bf) | | |

[Aspherical Data]

Surface Number: 2

$\kappa = 0.8028$
$A4 = -2.1183E-06$
$A6 = -2.6605E-09$
$A8 = 1.1966E-09$
$A10 = -3.0855E-11$ Surface Number: 13

$\kappa = -7.4148$
$A4 = 2.7745E-05$
$A6 = -2.0384E-06$
$A8 = -2.7176E-07$
$A10 = -9.6003E-09$ Surface Number: 17

$\kappa = 0.2983$
$A4 = 1.5880E-04$
$A6 = 1.8851E-06$
$A8 = -5.0971E-08$
$A10 = 8.8426E-10$

| | W | M | T |
|---|---|---|---|
| [Variable Distances upon Zooming] | | | |
| f = | 10.3000 | 18.7500 | 29.1000 |
| d6 = | 17.8651 | 5.8489 | 1.0000 |
| d15 = | 3.7597 | 2.1640 | 1.5500 |
| Bf = | 15.4801 | 25.2812 | 36.7848 |
| [Moving Amount of Focusing Lens Group] | | | |
| f = | 10.3000 | 18.7500 | 29.1000 |
| ΔFx = | 0.0719 | 0.1246 | 0.1964 |

[Lens Group Data]

| Group | I | Focal Length |
|---|---|---|
| 1 | 1 | −15.3542 |
| 2 | 7 | 26.5552 |
| 3 | 16 | 19.4757 |

[Values for Conditional Expressions]

fw = 10.3000
ft = 29.1000
ff = 26.7219
fs = 28.4536
fa = −15.9679
d12 = 5.2284
fγw = 1.4308
(1) fa/fs = −0.5612
(2) |fw/ff| = 0.3855
(3) |fγw| = 1.4308
(4) ff/fs = 0.9391
(5) (d12)/ft = 0.1797

Figure 54A:
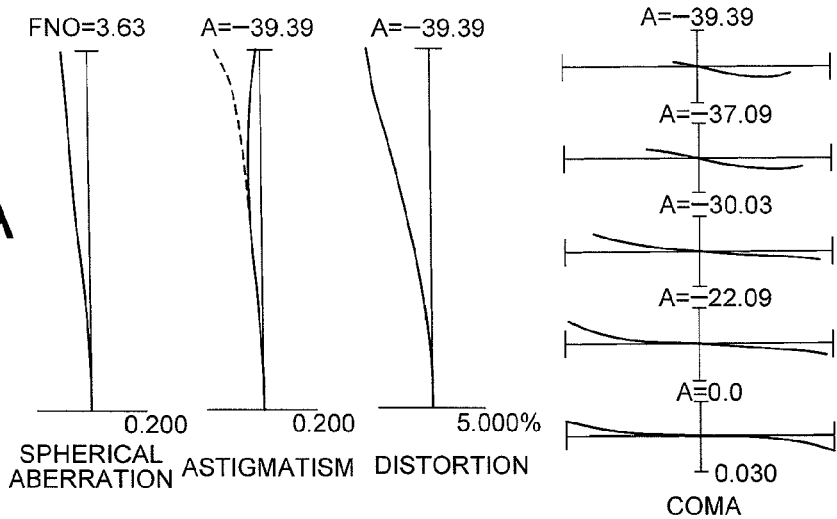
Figure 54B:
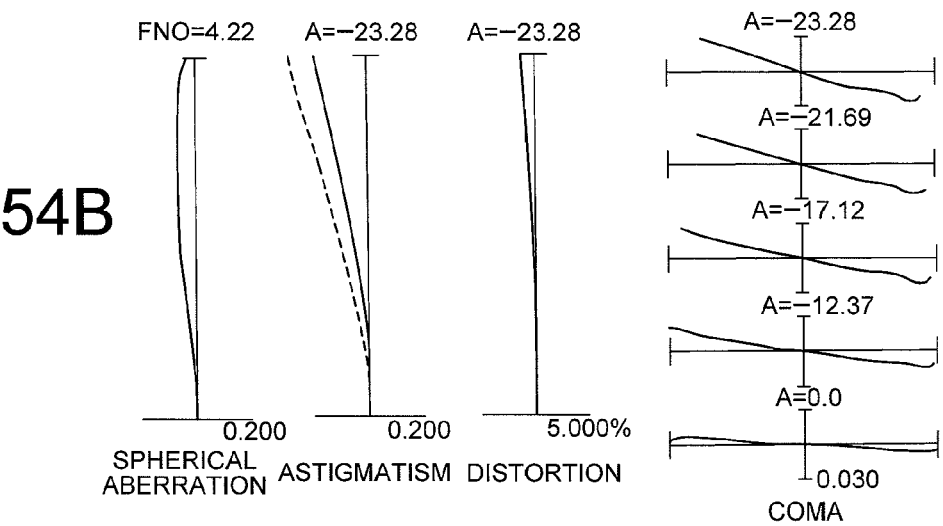
Figure 54C:
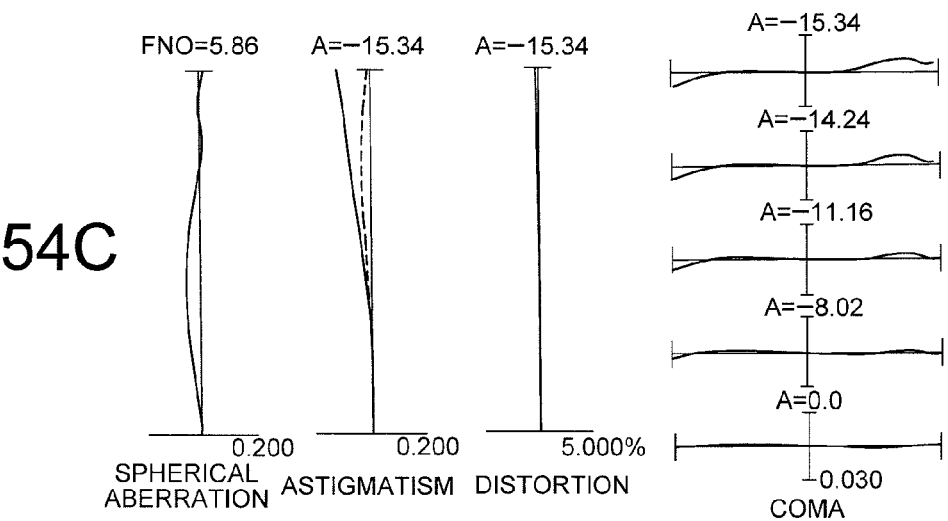
Figure 55A:
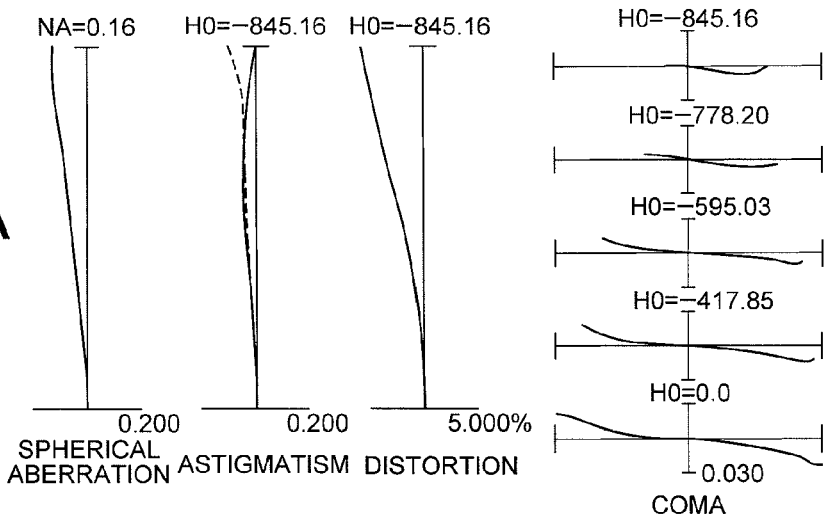
Figure 55B:
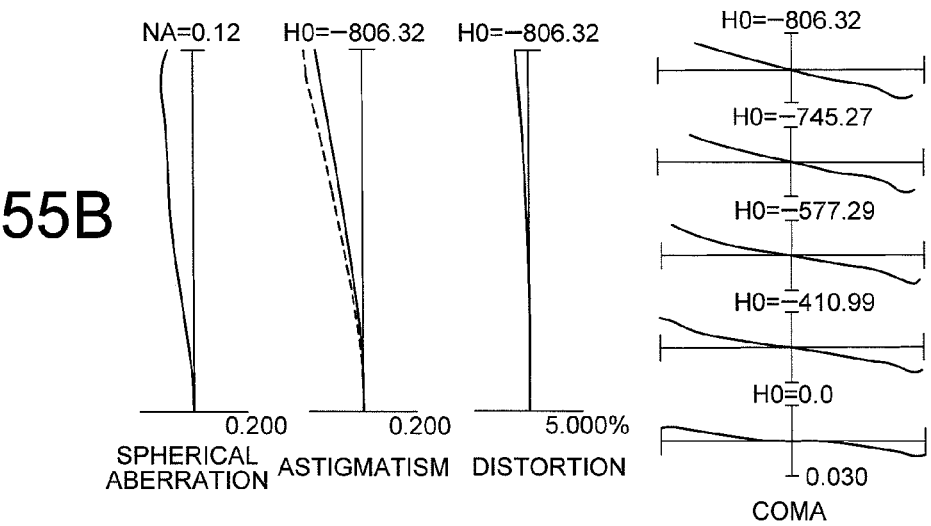
Figure 55C:
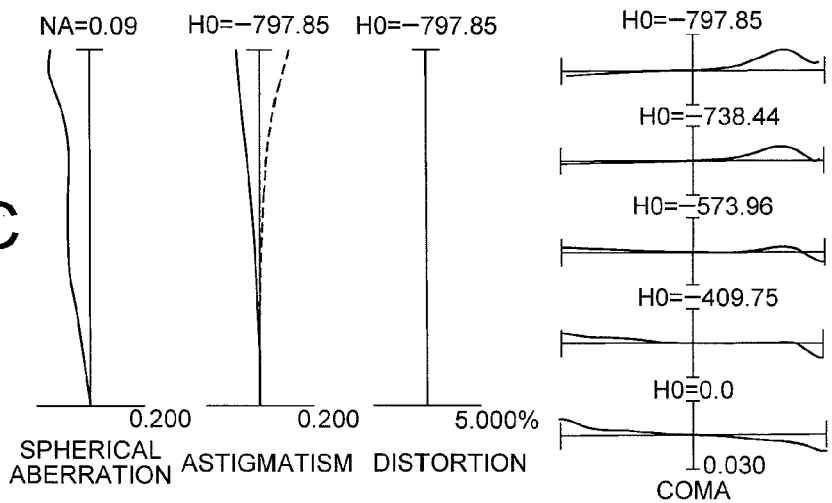
Figure 56A:
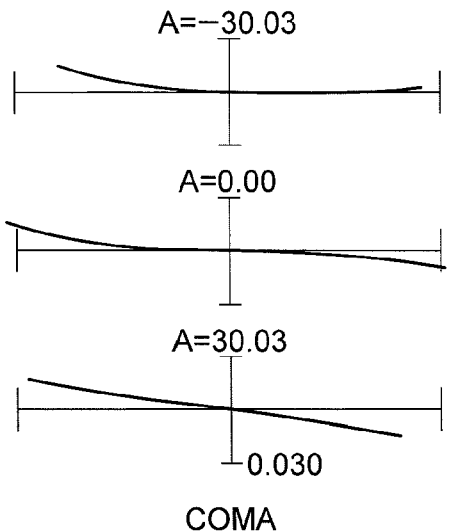
Figure 56B:
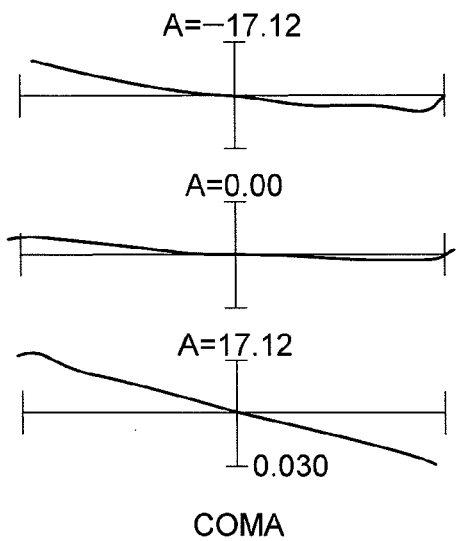
Figure 56C:
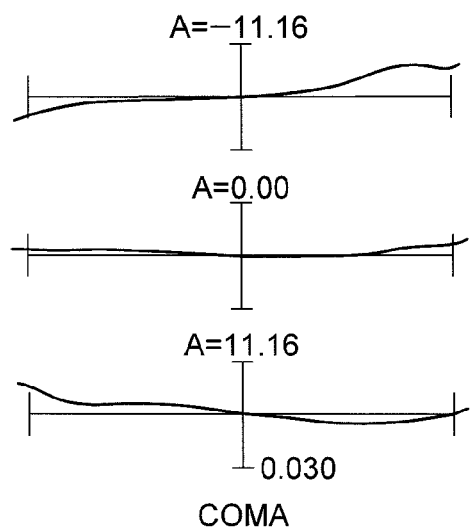

FIGS. 54A, 54B, and 54C are graphs showing various aberrations of the optical system according to Example 14 focusing on infinity, in which FIG. 54A is in a wide-angle end state, FIG. 54B is in an intermediate focal length state, and FIG. 54C is in a telephoto end state. FIGS. 55A, 55B, and 55C are graphs showing various aberrations of the optical system according to Example 14 focusing on a close object (shooting magnification is −0.01), in which FIG. 55A is in the wide-angle end state, FIG. 55B is in the intermediate focal length state, and FIG. 55C is in the telephoto end state. FIGS. 56A, 56B, and 56C are graphs showing coma of the optical system according to Example 14 upon shifting a decentering lens group (0.2 mm) focusing on infinity, in which FIG. 56A is in the wide-angle end state, FIG. 56B is in the intermediate focal length state, and FIG. 56C is in the telephoto end state.

As is apparent from the respective graphs, the optical system according to Example 14 shows superb optical performance as a result of good corrections to various aberrations in each focal length state from the wide-angle end state through the telephoto end state.

Example 15

Figure 57:
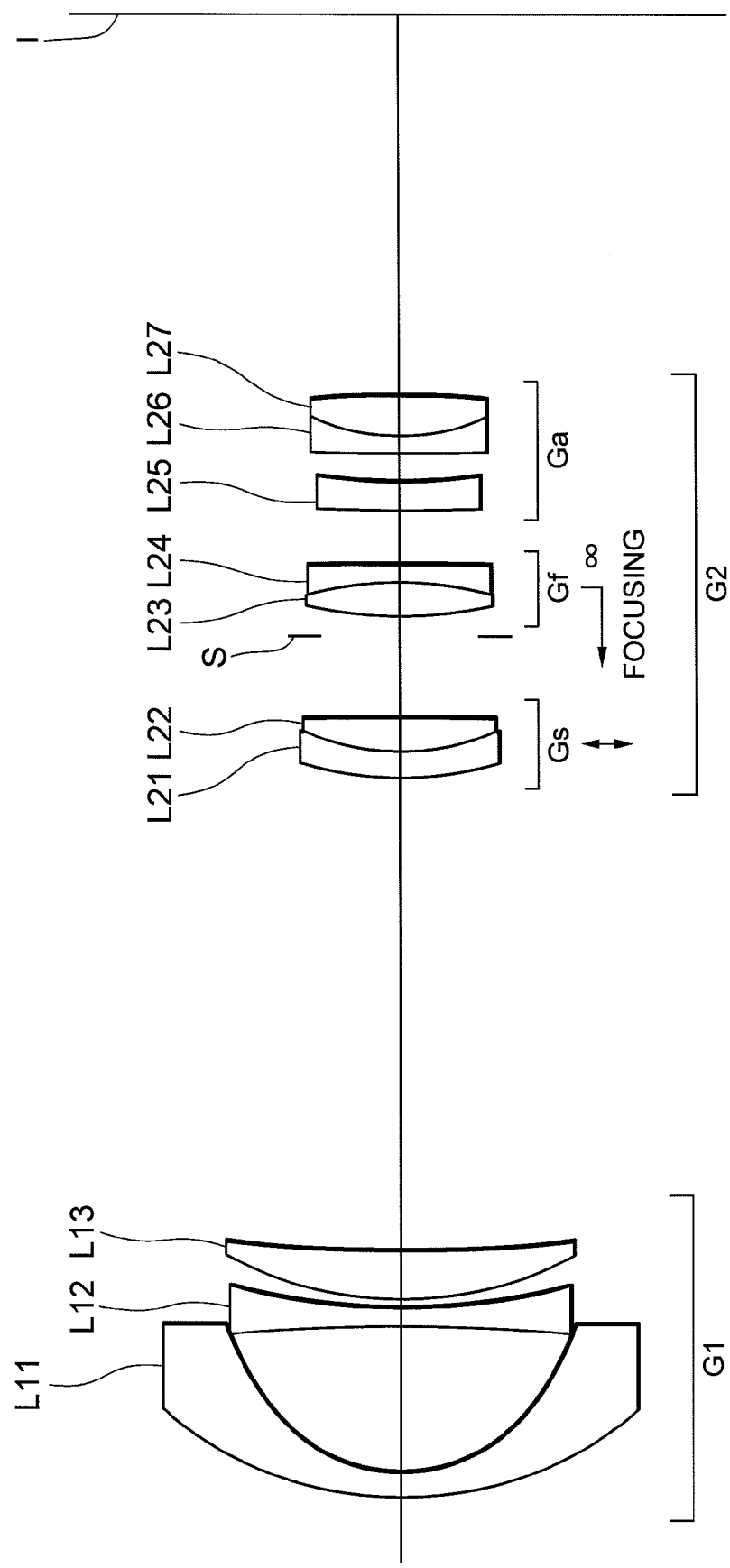
FIG. 57 is a sectional view showing a lens configuration of an optical system according to Example 15.

FIG. 57 is a sectional view showing a lens configuration of an optical system according to Example 15.

As shown in FIG. 57, the optical system according to Example 15 is a single focal length lens composed of, in order from an object side along an optical axis, a first lens group G1 having negative refractive power, and a second lens group G2 having positive refractive power. Upon zooming from a wide-angle end state W to a telephoto end state T, the first lens group G1, and the second lens group G2 move such that a distance between the first lens group G1 and the second lens group G2 decreases.

The first lens group G1 is composed of, in order from the object side along the optical axis, a negative meniscus lens L11 having a convex surface facing the object side, a double concave negative lens L12, and a positive meniscus lens L13 having a convex surface facing the object side. The negative meniscus lens L11 disposed to the most object side in the first lens group G1 is an aspherical lens having an aspherical surface facing the image plane I side.

The second lens group G2 is composed of, in order from the object side, a cemented positive lens constructed by a negative meniscus lens L21 having a convex surface facing the object side cemented with a double convex positive lens L22, an aperture stop S, a cemented positive lens constructed by a double convex positive lens L23 cemented with a negative meniscus lens L24 having a concave surface facing the object side, a negative meniscus lens L25 having a convex surface facing the object side, and a cemented positive lens constructed by a negative meniscus lens L26 having a convex surface facing the object side cemented with a double convex positive lens L27. The negative meniscus lens L21 disposed to the most object side in the second lens group G2 is an aspherical lens having an aspherical surface formed on the object side surface. The double convex positive lens L27 disposed to the most image plane I side in the second lens group G2 is an aspherical lens having an aspherical surface formed on the image plane I side.

The cemented positive lens constructed by the double convex positive lens L23 cemented with the negative meniscus lens L24 is a focusing lens group Gf, and with moving the focusing lens group Gf to the object side, focusing from an infinity object to a close object is carried out.

The cemented positive lens constructed by the negative meniscus lens L21 cemented with the double convex positive lens L22 is a decentering lens group Gs, and with moving the decentering lens group Gs in a direction substantially perpendicular to the optical axis, vibration reduction is carried out.

The negative meniscus lens L25 and the cemented positive lens constructed by the negative meniscus lens L26 cemented with the double convex positive lens L27 are an auxiliary lens group Ga having negative refractive power.

Various values associated with the optical system according to Example 15 are listed in Table 15.

TABLE 15

[Specifications]

f = 10.30
FNO = 3.31
2ω = 77.59
Y = 7.96
TL = 73.80
Bf = 18.73

[Lens Data]

| i | r | d | nd | vd |
|---|---|---|---|---|
| 1 | 18.6779 | 1.30 | 1.85135 | 40.10 |
| 2* | 7.8525 | 7.25 | | |
| 3 | −94.6821 | 1.00 | 1.83481 | 42.72 |
| 4 | 34.1506 | 0.31 | | |
| 5 | 18.6651 | 2.51 | 1.86074 | 23.06 |
| 6* | 78.9142 | 23.50 | | |
| 7* | 18.1125 | 1.30 | 1.83441 | 37.28 |
| 8 | 12.2772 | 1.76 | 1.59319 | 67.87 |
| 9 | −2494.0282 | 3.99 | | |
| 10 | ∞ | 1.00 | Aperture Stop S | |
| 11 | 23.3375 | 1.67 | 1.74400 | 44.78 |
| 12 | −19.5626 | 1.00 | 1.67270 | 32.11 |
| 13 | −219.6865 | 2.59 | | |
| 14 | 106.9379 | 1.53 | 1.80486 | 24.73 |
| 15 | 28.0039 | 1.36 | | |
| 16 | 352.0524 | 0.83 | 1.79952 | 42.24 |
| 17 | 10.0128 | 2.17 | 1.69350 | 53.20 |
| 18* | −38.1016 | 18.73 | | |

[Aspherical Data]

Surface Number: 2

κ = 0.6460
A4 = 1.2719E−05
A6 = 5.3251E−07
A8 = −4.7392E−09
A10 = 4.5963E−11

Surface Number: 7

κ = −1.0893
A4 = 3.0467E−05
A6 = 9.8555E−08
A8 = −1.0556E−08
A10 = 2.2926E−10

Surface Number: 18

κ = 1.0000
A4 = 6.6102E−05
A6 = 5.9125E−08
A8 = 3.8159E−08
A10 = −1.1681E−09

[Moving Amount of Focusing Lens Group]

f = 10.3000
ΔFx = 0.0669

[Values for Conditional Expressions]

f = 10.3000
ff = 26.0978
fs = 36.6504
fa = −98.3425
d12 = 7.2500
fγ = 1.5400
(1) fa/fs = −2.6833
(4) ff/fs = 0.7121
(5) (d12)/ff = 0.7039
(8) |f/ff| = 0.3947
(9) |fγ| = 1.5400

Figure 58:
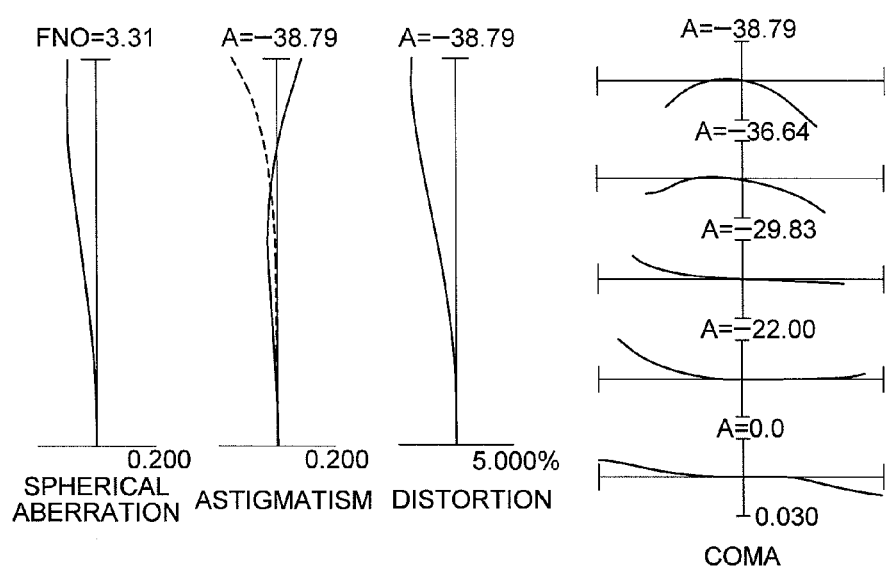
FIG. 58 is graphs showing various aberrations of the optical system according to Example 15 focusing on infinity.
Figure 59:
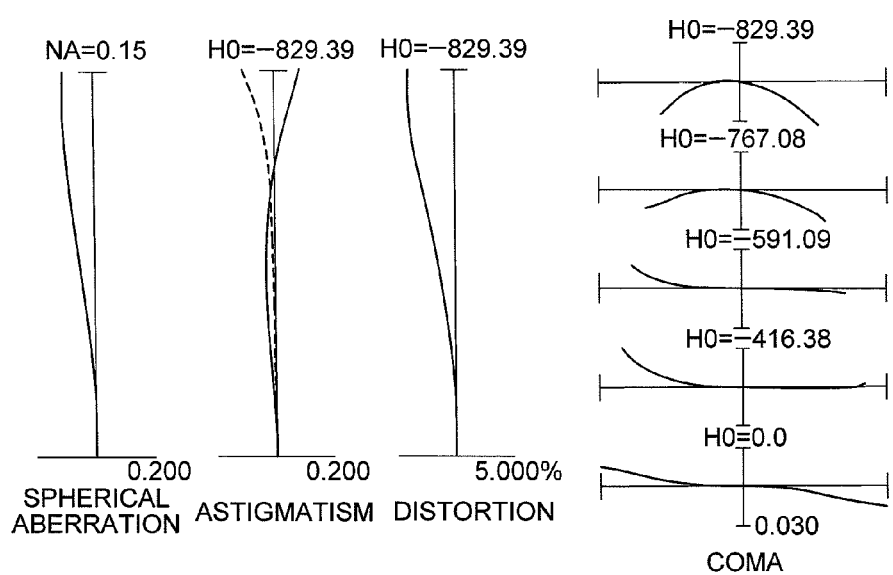
FIG. 59 is graphs showing various aberrations of the optical system according to Example 15 focusing on a close object (shooting magnification is −0.01).
Figure 60:
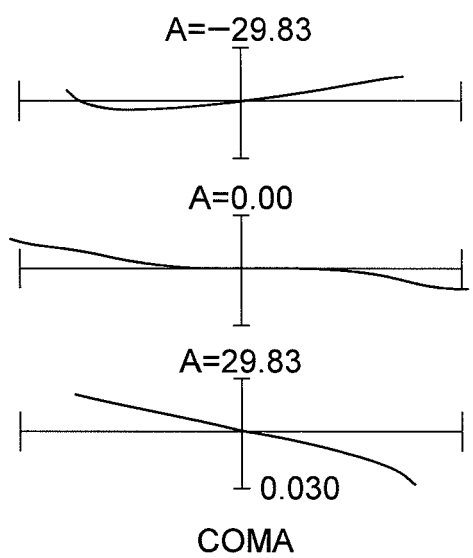
FIG. 60 is graphs showing coma of the optical system according to Example 15 upon shifting a decentering lens group (0.2 mm) focusing on infinity.

FIG. 58 is graphs showing various aberrations of the optical system according to Example 15 focusing on infinity. FIG. 59 is graphs showing various aberrations of the optical system according to Example 15 focusing on a close object (shooting magnification is −0.01). FIG. 60 is graphs showing coma of the optical system according to Example 15 upon shifting a decentering lens group (0.2 mm) focusing on infinity.

As is apparent from the respective graphs, the optical system according to Example 15 shows superb optical performance as a result of good corrections to various aberrations.

As described above, the present embodiment makes it possible to provide an optical system capable of establishing both of an internal focusing system and a decentering lens group with obtaining compactness, a wide-angle of view and excellent optical performance.

Then, a camera equipped with an optical system according to the present embodiment is explained. Although a case that the optical system according to Example 1 is installed in a camera is explained, the same goes in the other Examples.

Figure 61:
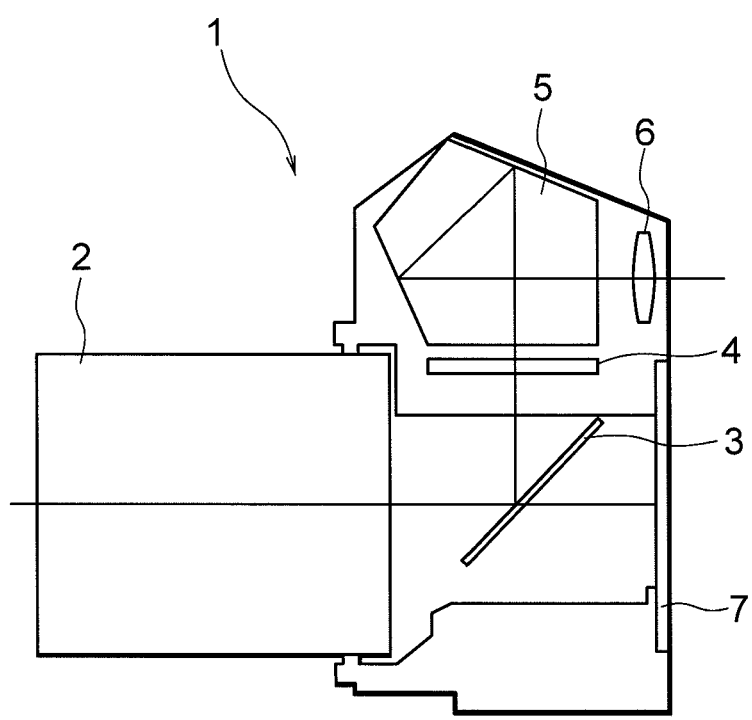
FIG. 61 is a sectional view showing a camera equipped with the optical system according to Example 1.

FIG. 61 is a sectional view showing a camera equipped with the optical system according to Example 1.

In FIG. 61, the camera 1 a single-lens reflex digital camera equipped with the optical system according to Example 1 as an imaging lens 2. In the camera 1, light coming out from an object (not shown) is converged by an imaging lens 2, reflected by a quick return mirror 3, and focused on a focusing screen 4. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses a release button (not shown) all the way down, the quick return mirror 3 is retracted from the optical path, the light from the object forms an object image on an imaging device 7. Accordingly, the light from the object is captured by the imaging device 7, and a photographed image is stored in a memory (not shown). In this manner, the photographer can take an image of an object by the camera 1.

With installing the optical system according to Example 1 as an imaging lens 2 into the camera 1, it becomes possible to realize a camera having high optical performance.

Incidentally, the following description may suitably be applied within limits that do not deteriorate optical performance.

In the above described Examples, although optical systems having a two-lens-group configuration or a three-lens-group configuration has been shown, the above described lens configuration can be applied to other lens configurations such as a four-lens-group configuration and the like. Moreover, a lens configuration in which a lens or a lens group is added to the most object side, and a lens configuration in which a lens or a lens group is added to the most image side may be possible. Incidentally, a lens group is defined as a portion having at least one lens that is separated from the other portions by air spaces that vary upon zooming.

In order to vary focusing from an infinity object to a close object, a single lens group, a plurality of lens groups, or a sub-lens group may be moved along the optical axis. In this case, the focusing lens group can be used for auto focus, and suitable for being driven by a motor such as an ultrasonic motor. It is particularly preferable that at least a portion of the second lens group is used as the focusing lens group.

A lens group or a portion of a lens group may be moved in a direction having a component perpendicular to the optical axis, or swayed in a direction including an optical axis for making it as a decentering lens group that corrects an image blur caused by a camera shake. It is particularly preferable that at lest a portion of the second lens group is made to be a decentering lens group.

Moreover, any lens surface may be formed as a spherical surface, a plane surface or an aspherical surface. When a lens surface is a spherical surface or a plane surface, processing and assembling become easy, so that deterioration of optical performance caused by errors upon processing and assembling can be prevented. Even if the image plane is shifted, deterioration in optical performance is small, so that it is desirable.

When the lens surface is an aspherical surface, the aspherical surface may be fabricated by a fine grinding process, a glass molding process that a glass material is formed into an aspherical shape by a mold, or a compound type process that a resin material is formed into an aspherical shape on a glass surface. Any lens surface may be a diffractive optical surface. Any lens may be a graded index lens (GRIN lens), or a plastic lens.

Although an aperture stop S is preferably disposed in the second lens group, the function may be substituted by a lens frame without disposing a member as an aperture stop.

An antireflection coating having high transmittance over a broad wavelength range may be applied to each lens surface to reduce flare or ghost images, so that high optical performance with a high contrast can be attained.

The zoom ration of the optical system according to the preset embodiment is about two to five.

In an optical system according to the present embodiment, it is preferable that the first lens group includes one positive lens component and two negative lens components, or two positive lens components and two negative lens components. Moreover, it is preferable that the first lens group disposes lens components, in order from the object side, negative-negative-positive or negative-negative-positive-positive with an air space in between.

In an optical system according to the present embodiment, it is preferable that the second lens group includes at least one positive lens component and one negative lens component.

In an optical system (either a zoom lens or a single focal length lens) according to the present embodiment, it is preferable that a distance along the optical axis (a back focal length) between the image side surface of a lens component disposed to the most image side and the image plane is about 10 mm to 30 mm.

In an optical system (either a zoom lens or a single focal length lens) according to the present embodiment, the image height is preferably 5 mm to 12.5 mm, and further preferably 5 mm to 9.5 mm.

The present embodiment only shows a specific example for the purpose of better understanding of the present application. Accordingly, it is needless to say that the application in its broader aspect is not limited to the specific details and representative devices.

What is claimed is:

1. A zoom optical system composed of a plurality of lens groups comprising:
   a first lens group that is a most object side lens group; and
   a second lens group that is a lens group having positive refractive power disposed to an image side of the most object side lens group;
   the second lens group including a focusing lens group that carries out focusing from an infinity object to a close object, and a decentering lens group that is movable in a direction having a component perpendicular to an optical axis; and
   upon zooming from a wide-angle end state to a telephoto end state, a distance between the first lens group and the second lens group varies and an interval in the optical-axis direction between the focusing lens group and the decentering lens group is fixed;
   wherein the first lens group has negative refractive power, upon said zooming the second lens group moves; and
   wherein the following conditional expression is satisfied:

$$2.00<|\beta G2ft|$$

where $\beta G2ft$ denotes an imaging magnification of the focusing lens group in a telephoto end state.

2. The optical system according to claim 1, wherein the focusing lens group is disposed to the object side of the decentering lens group.

3. The optical system according to claim 1, wherein an auxiliary lens group is disposed to an image side of the decentering lens group.

4. The optical system according to claim 3, wherein the auxiliary lens group is included in the second lens group.

5. The optical system according to claim 3, wherein the auxiliary lens group is moved in a body with the focusing lens group and the decentering lens group upon zooming.

6. The optical system according to claim 3, wherein the auxiliary lens group has negative refractive power.

7. The optical system according to claim 3, wherein the auxiliary lens group has positive refractive power.

8. The optical system according to claim 3, wherein the following conditional expression is satisfied:

$$-7.20<fa/fs<6.35$$

where fa denotes a focal length of the auxiliary lens group, and fs denotes a focal length of the decentering lens group.

9. The optical system according to claim 3, wherein the most object side in the auxiliary lens group has an aspherical surface.

10. The optical system according to claim 1, wherein an aperture stop is disposed between the focusing lens group and the decentering lens group.

11. The optical system according to claim 1, wherein a lens component is disposed between the focusing lens group and the decentering lens group.

12. The optical system according to claim 11, wherein the second lens group is constructed by, in order from the object side, the focusing lens group, the lens component, an aperture stop, the decentering lens group, and an auxiliary lens group.

13. The optical system according to claim 11, wherein the second lens group is constructed by, in order from the object side, the focusing lens group, an aperture stop, the lens component, the decentering lens group, and an auxiliary lens group.

14. The optical system according to claim 11, wherein the lens component includes an aspherical surface.

15. The optical system according to claim 1, wherein the following conditional expression is satisfied:

$$0.15<|fw/ff|<0.45$$

where fw denotes a focal length of the optical system in a wide-angle end state, and ff denotes a focal length of the focusing lens group.

16. The optical system according to claim 1, wherein the following conditional expression is satisfied:

$$0.15<|f\gamma w|<0.60$$

where $f\gamma w$ denotes an image plane moving coefficient of the focusing lens group in a wide-angle end state.

17. The optical system according to claim 1, wherein the following conditional expression is satisfied:

$$-3.70 < ff/fs < 3.10$$

where ff denotes a focal length of the focusing lens group, fs denotes a focal length of the decentering lens group.

18. The optical system according to claim 1, wherein the most object side lens in the first lens group has an aspherical surface.

19. The optical system according to claim 1, wherein the following conditional expression is satisfied:

$$0.00 < (d12)/ft < 1.20$$

where d12 denotes a distance along the optical axis between an image side lens surface of the most object side lens in the first lens group and an object side lens surface of a lens right behind the most object side lens, and ft denotes a focal length of the optical system in the telephoto end state.

20. The optical system according to claim 1, wherein the most object side lens in the optical system has an aspherical surface.

21. The optical system according to claim 1, wherein the focusing lens group includes an aspherical surface.

22. The optical system according to claim 1, wherein the decentering lens group includes an aspherical surface.

23. The optical system according to claim 1, wherein the focusing lens group has positive refractive power.

24. The optical system according to claim 1, wherein the decentering lens group has positive refractive power.

25. The optical system according to claim 1, wherein the decentering lens group is constructed by a cemented lens.

26. The optical system according to claim 1, wherein the decentering lens group is constructed by a single lens.

27. The optical system according to claim 1, wherein the following conditional expression is satisfied:

$$2.00 < |\beta G2fw|$$

where βG2fw denotes an imaging magnification of the focusing lens group in a wide-angle end state.

28. An optical apparatus equipped with the optical system according to claim 1.

29. An optical system composed of a plurality of lens groups comprising:
a most object side lens group; and
a lens group having positive refractive power disposed to an image side of the most object side lens group;
the lens group disposed to the image side of the most object side lens group including a focusing lens group that carries out focusing from an infinity object to a close object, and a decentering lens group that is movable in a direction having a component perpendicular to an optical axis; and
the focusing lens group being disposed to the image side of the decentering lens group,
wherein the following conditional expression is satisfied:

$$0.05 < |f/ff| < 0.65$$

where f denotes a focal length of the optical system, and ff denotes a focal length of the focusing lens group.

30. The optical system according to claim 29, wherein upon zooming from a wide-angle end state to a telephoto end state, a distance between the most object side lens group and the lens group disposed to the image side of the most object side lens group varies, and the lens group disposed to the image side of the most object side lens group moves to the object side.

31. The optical system according to claim 30, wherein the following conditional expression is satisfied:

$$0.05 < |fw/ff| < 0.65$$

where f denotes a focal length of the optical system in a wide-angle end state, and ff denotes a focal length of the focusing lens group.

32. The optical system according to claim 30, wherein the following conditional expression is satisfied:

$$0.05 < |f\gamma w| < 2.75$$

where fγw denotes an image plane moving coefficient of the focusing lens group in a wide-angle end state.

33. The optical system according to claim 30, wherein the following conditional expression is satisfied:

$$0.00 < (d12)/ft < 1.50$$

where d12 denotes a distance along the optical axis between an image side lens surface of the most object side lens in the optical system and an object side lens surface of a lens right behind the most object side lens, and ft denotes a focal length of the optical system in a telephoto end state.

34. The optical system according to claim 29, wherein the most object side lens group has negative refractive power.

35. The optical system according to claim 29, wherein the most object side lens group and the lens group disposed to the image side of the most object side lens group are adjacent to each other.

36. The optical system according to claim 29, wherein an aperture stop is disposed between the focusing lens group and the decentering lens group.

37. The optical system according to claim 29, wherein an auxiliary lens group is disposed at least at one of the object side and the image side of the decentering lens group.

38. The optical system according to claim 37, wherein the following conditional expression is satisfied:

$$-11.00 < fa/fs < 11.00$$

where fa denotes a focal length of the auxiliary lens group, and fs denotes a focal length of the decentering lens group.

39. The optical system according to claim 29, wherein the following conditional expression is satisfied:

$$0.05 < |f\gamma| < 2.75$$

where fγ denotes an image plane moving coefficient of the focusing lens group.

40. The optical system according to claim 29, wherein the following conditional expression is satisfied:

$$-4.00 < ff/fs < 4.00$$

where ff denotes a focal length of the focusing lens group, and fs denotes a focal length of the decentering lens group.

41. The optical system according to claim 29, wherein the decentering lens group includes an aspherical surface.

42. An optical apparatus equipped with the optical system according to claim 29.

43. A method for manufacturing a zoom optical system including a first lens group that is a most object side lens group and a second lens group that is a lens group disposed to an image side of the most object side lens group having positive refractive power, the method comprising steps of:
disposing the first lens group and the second lens group such that a distance therebetween is variable upon zooming; and disposing in the second lens group a focusing lens group that carries out focusing from an infinity object to a close object and a decentering lens group that is movable in a direction having a component perpendicular to the optical axis such that an interval in the optical-axis direction between the focusing lens group and the decentering group is fixed upon zooming;

wherein the first lens group has negative refractive power, upon said zooming the second lens group moves; and wherein the following conditional expression is satisfied:

$$2.00 < |\beta G2ft|$$

where βG2ft denotes an imaging magnification of the focusing lens group in a telephoto end state.

44. The method according to claim 43, further comprising a step of:

moving a second lens group that is the lens group disposed to the image side of the most object side lens group and varying a distance between a first lens group that is the most object side lens group having negative refractive power and the second lens group upon zooming from a wide-angle end state to a telephoto end state.

45. The method according to claim 44, further comprising a step of:

disposing the focusing lens group to the object side of the decentering lens group.

46. The method according to claim 44, further comprising a step of:

satisfying the following conditional expression:

$$0.15 < |fw/ff| < 0.45$$

where fw denotes a focal length of the optical system in a wide-angle end state, and ff denotes a focal length of the focusing lens group.

47. The method according to claim 44, further comprising a step of:

satisfying the following conditional expression:

$$-3.70 < ff/fs < 3.10$$

where ff denotes a focal length of the focusing lens group, fs denotes a focal length of the decentering lens group.

48. A method for manufacturing an optical system including a most object side lens group and a lens group disposed to an image side of the most object side lens group having positive refractive power, the method comprising steps of:

disposing a decentering lens group that is movable in a direction having a component perpendicular to the optical axis in the lens group disposed to the image side of the most object side lens group; and disposing a focusing lens group that carries out focusing from an infinity object to a close object to the image side of the decentering lens group, wherein the following conditional expression is satisfied:

$$0.05 < |f/ff| < 0.65$$

where f denotes a focal length of the optical system, and ff denotes a focal length of the focusing lens group.

49. The method according to claim 48, further comprising a step of:

varying a distance between the most object side lens group and the lens group disposed to the image side of the most object side lens group varies, and moving the lens group disposed to the image side of the most object side lens group to the object side, upon zooming from a wide-angle end state to a telephoto end state.

50. The method according to claim 48, further comprising a step of:

providing the most object side lens group with negative refractive power.

51. The method according to claim 48, further comprising a step of:

satisfying the following conditional expression:

$$0.05 < |fw/ff| < 0.65$$

where f denotes a focal length of the optical system in a wide-angle end state, and ff denotes a focal length of the focusing lens group.

52. The method according to claim 48, further comprising a step of:

satisfying the following conditional expression:

$$-4.00 < ff/fs < 4.00$$

where ff denotes a focal length of the focusing lens group, and fs denotes a focal length of the decentering lens group.

53. A zoom optical system composed of a plurality of lens groups comprising:

a first lens group that is a most object side lens group; and a second lens group that is a lens group having positive refractive power disposed to an image side of the most object side lens group;

the second lens group including a focusing lens group that carries out focusing from an infinity object to a close object, and a decentering lens group that is movable in a direction having a component perpendicular to an optical axis; and upon zooming from a wide-angle end state to a telephoto end state, a distance between the first lens group and the second lens group varies and an interval in the optical-axis direction between the focusing lens group and the decentering lens group is fixed, wherein the first lens group has negative refractive power, and upon zooming the second lens group moves; and wherein the following conditional expression is satisfied:

$$2.00 < |\beta G2fw|$$

where βG2fw denotes an imaging magnification of the focusing lens group in a wide-angle end state.

54. A method for manufacturing a zoom optical system including a first lens group that is a most object side lens group and a second lens group that is a lens group disposed to an image side of the most object side lens group having positive refractive power, the method comprising steps of:

disposing the first lens group and the second lens group such that a distance therebetween may be variable upon zooming;

disposing in the second lens group a focusing lens group that carries out focusing from an infinity object to a close object and a decentering lens group that is movable in a direction having a component perpendicular to the optical axis such that an interval in the optical-axis direction between the focusing lens group and the decentering group may be fixed upon zooming, wherein the first lens group has negative refractive power, and upon zooming the second lens group moves; and wherein the following conditional expression is satisfied:

$$2.00 < |\beta G2ft|$$

where βG2ft denotes an imaging magnification of the focusing lens group in a telephoto end state.

* * * * *